(12) United States Patent
Dawson et al.

(10) Patent No.: US 12,136,500 B2
(45) Date of Patent: *Nov. 5, 2024

(54) ELECTRICAL BUSBAR AND METHOD OF FABRICATING THE SAME

(71) Applicant: Eaton Intelligent Power Limited, Dublin (IE)

(72) Inventors: James Dawson, Carol Stream, IL (US); Jason Degen, Carol Stream, IL (US); Neal Devine, Carol Stream, IL (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 17/699,033

(22) Filed: Mar. 18, 2022

(65) Prior Publication Data

US 2023/0058367 A1 Feb. 23, 2023

Related U.S. Application Data

(60) Provisional application No. 63/234,320, filed on Aug. 18, 2021.

(51) Int. Cl.
*H01B 5/02* (2006.01)
(52) U.S. Cl.
CPC ..................................... *H01B 5/02* (2013.01)
(58) Field of Classification Search
CPC . H01B 1/026; H01B 5/02; H01B 7/04; H01B 7/009; H01B 13/003; H01B 13/14;
(Continued)

(56) References Cited

U.S. PATENT DOCUMENTS

| 3,706,955 A | 12/1972 | Bunnell |
| 4,593,464 A | 6/1986 | Williams |

(Continued)

FOREIGN PATENT DOCUMENTS

| CN | 101997241 A | 3/2011 |
| CN | 203193080 | 9/2013 |

(Continued)

OTHER PUBLICATIONS

DW07 Series High-current Busbar Connector Product Information Module; Japan Aviation Electronics Industry, Ltd.; 2016 (14 pages).

(Continued)

*Primary Examiner* — William H. Mayo, III
(74) *Attorney, Agent, or Firm* — Meunier Carlin & Curfman LLC

(57) ABSTRACT

A busbar for electrically connecting components in a power distribution system. The busbar includes a plurality of conductors formed from a first material and having a first end, a second end, and an intermediate portion. The first end, the second end, and the intermediate portion can be integrally formed with one another and stacked to provide the busbar with a first geometry. The intermediate portion includes a handling section with a rigidity that is less than a rigidity of a corresponding section of a reference busbar that has (a) a geometry that substantially matches the first geometry and (b) has a single conductor formed from a material substantially similar to the first material. The handling section is formed using an edge-based fusion process that fuses a portion of the conductors together to form a single consolidated conductor in that section of the busbar.

27 Claims, 67 Drawing Sheets

(58) Field of Classification Search
CPC .. H01B 5/00; H01M 50/505; H01M 2220/20; H01R 13/05
USPC .............................. 174/74 R, 78, 84 R, 84 C
See application file for complete search history.

(56) References Cited

U.S. PATENT DOCUMENTS

| | | | |
|---|---|---|---|
| 4,922,068 A | 5/1990 | Bangs | |
| 4,973,370 A | 11/1990 | Kreinberg | |
| 5,102,752 A | 4/1992 | Hope | |
| 5,393,951 A | 2/1995 | Kasper | |
| 5,541,380 A | 7/1996 | Ogden | |
| 6,264,510 B1 | 7/2001 | Onizuka | |
| 6,390,830 B1 | 5/2002 | Onizuka | |
| 6,402,543 B1 * | 6/2002 | Abe ....................... | H01R 4/185 439/877 |
| 6,468,116 B2 * | 10/2002 | Koide ................... | H01R 4/184 439/867 |
| 6,646,222 B1 | 11/2003 | Burlingame | |
| 6,722,926 B2 | 4/2004 | Chevassus-More | |
| 7,175,488 B2 | 2/2007 | Pavlovic | |
| 7,503,776 B1 | 3/2009 | Pavlovic | |
| 7,568,921 B2 | 8/2009 | Pavlovic | |
| 7,595,715 B2 | 9/2009 | Pavlovic | |
| 7,613,003 B2 | 11/2009 | Pavlovic | |
| 7,651,344 B2 | 1/2010 | Wu | |
| 7,713,096 B2 | 5/2010 | Pavlovic | |
| 7,766,706 B2 | 8/2010 | Kawamura | |
| 7,876,193 B2 | 1/2011 | Pavlovic | |
| 7,892,050 B2 | 2/2011 | Pavlovic | |
| 8,202,124 B1 | 6/2012 | Natter | |
| 8,366,497 B2 | 2/2013 | Glick | |
| 8,388,389 B2 | 3/2013 | Costello | |
| 8,475,220 B2 | 7/2013 | Glick | |
| 8,859,897 B2 | 10/2014 | Hadi | |
| 8,911,250 B2 | 12/2014 | Ehlen | |
| 8,956,190 B2 | 2/2015 | Natter | |
| 9,033,748 B2 | 5/2015 | Ramey | |
| 9,077,114 B2 | 7/2015 | Oh | |
| 9,105,912 B2 | 8/2015 | Zhao | |
| 9,190,756 B2 | 11/2015 | Glick | |
| 9,225,116 B2 | 12/2015 | McKibben | |
| 9,257,804 B1 | 2/2016 | Beck | |
| 9,300,069 B2 | 3/2016 | Morello | |
| 9,318,734 B2 | 4/2016 | Zhao | |
| 9,356,394 B2 | 5/2016 | Kennedy | |
| 9,368,904 B2 | 6/2016 | Natter | |
| 9,379,489 B2 | 6/2016 | Ebisawa | |
| 9,437,974 B2 | 9/2016 | Glick | |
| 9,502,783 B2 | 11/2016 | Martin | |
| 9,525,254 B2 | 12/2016 | Chen | |
| 9,608,369 B1 | 3/2017 | Brandt | |
| 9,853,435 B1 | 12/2017 | Burkman | |
| 9,905,953 B1 | 2/2018 | Pavlovic | |
| 9,948,044 B2 | 4/2018 | Harris, III | |
| 9,989,579 B2 | 6/2018 | Douglass et al. | |
| 10,003,112 B1 | 6/2018 | Boor | |
| 10,044,126 B2 | 8/2018 | Krebs | |
| 10,122,004 B2 | 11/2018 | De Souza | |
| 10,122,117 B2 | 11/2018 | Miller | |
| 10,135,168 B2 | 11/2018 | Pavlovic | |
| 10,164,366 B2 | 12/2018 | Kataoka | |
| 10,374,521 B2 | 8/2019 | Böhmer et al. | |
| 10,395,793 B2 | 8/2019 | Satou | |
| 10,515,739 B2 | 12/2019 | Satou | |
| 10,693,252 B2 | 6/2020 | Pavlovic | |
| 10,821,554 B2 | 11/2020 | Satou | |
| 11,223,150 B2 | 1/2022 | Pavlovic | |
| 11,271,330 B2 | 3/2022 | Dawson | |
| 11,488,742 B2 | 11/2022 | Dawson | |
| 2002/0081888 A1 | 6/2002 | Regnier | |
| 2002/0180272 A1 | 12/2002 | Yuasa et al. | |
| 2005/0056445 A1 | 3/2005 | Orui et al. | |
| 2007/0149050 A1 | 6/2007 | Oka | |
| 2010/0139733 A1 | 6/2010 | Jonczyk et al. | |
| 2015/0004852 A1 | 1/2015 | Hildebrand et al. | |
| 2015/0079825 A1 * | 3/2015 | Miyamoto ............... | H01R 4/62 439/152 |
| 2015/0079859 A1 | 3/2015 | Glick | |
| 2015/0162706 A1 | 6/2015 | Kennedy | |
| 2015/0255912 A1 | 9/2015 | Natter | |
| 2016/0308187 A1 | 10/2016 | Subramanian | |
| 2016/0308455 A1 | 10/2016 | Ratadiya et al. | |
| 2018/0138601 A1 * | 5/2018 | Hamada ................ | H01R 4/185 |
| 2018/0145428 A1 | 5/2018 | Meyer et al. | |
| 2018/0175535 A1 | 6/2018 | Sato et al. | |
| 2018/0191095 A1 | 7/2018 | Pavlovic | |
| 2018/0219305 A1 | 8/2018 | Wavering et al. | |
| 2018/0269454 A1 | 9/2018 | De Souza et al. | |
| 2019/0006652 A1 | 1/2019 | Kim | |
| 2019/0044120 A1 | 2/2019 | Ota | |
| 2019/0044197 A1 | 2/2019 | Ota et al. | |
| 2021/0351523 A1 | 11/2021 | Dawson | |

FOREIGN PATENT DOCUMENTS

| | | | |
|---|---|---|---|
| CN | 2015100485492 | 5/2015 | |
| CN | 107863610 | 3/2018 | |
| CN | 108370652 A | 8/2018 | |
| CN | 108923007 | 11/2018 | |
| CN | 109313229 A | 2/2019 | |
| DE | 19817924 | 10/1999 | |
| EP | 2535965 | 12/2012 | |
| EP | 2871695 | 5/2015 | |
| JP | H06140020 | 5/1994 | |
| JP | 2012-119186 A * | 6/2012 | ............... H01R 4/18 |
| JP | 2017-091860 A * | 5/2017 | ............... H01B 5/12 |
| JP | 2017-091861 A * | 5/2017 | ............... H01B 5/12 |

OTHER PUBLICATIONS

Busbar Connectivity Quick Reference Guide; TE Connectivity Ltd.; 2017 (7 pages).
International Search Report and Written Opinion issued in PCT/US20/50016, dated Nov. 30, 2020, 14 pages.
International Search Report and Written Opinion issued in PCT/US20/50018, dated Nov. 30, 2020, 14 pages.
International Search Report and Written Opinion issued in PCT/US20/14484, dated Mar. 31, 2020, 7 pages.
International Search Report and Written Opinion issued in PCT/IB2022/057772, dated Jan. 30, 2023, 26 pages.
English translation of First Office Action for Chinese Application No. 202080069942.9 dated Apr. 17, 2024, 25 pages.
Non-Final Office Action for U.S. Appl. No. 18/501,118 dated Jun. 5, 2024, 15 pages.

* cited by examiner

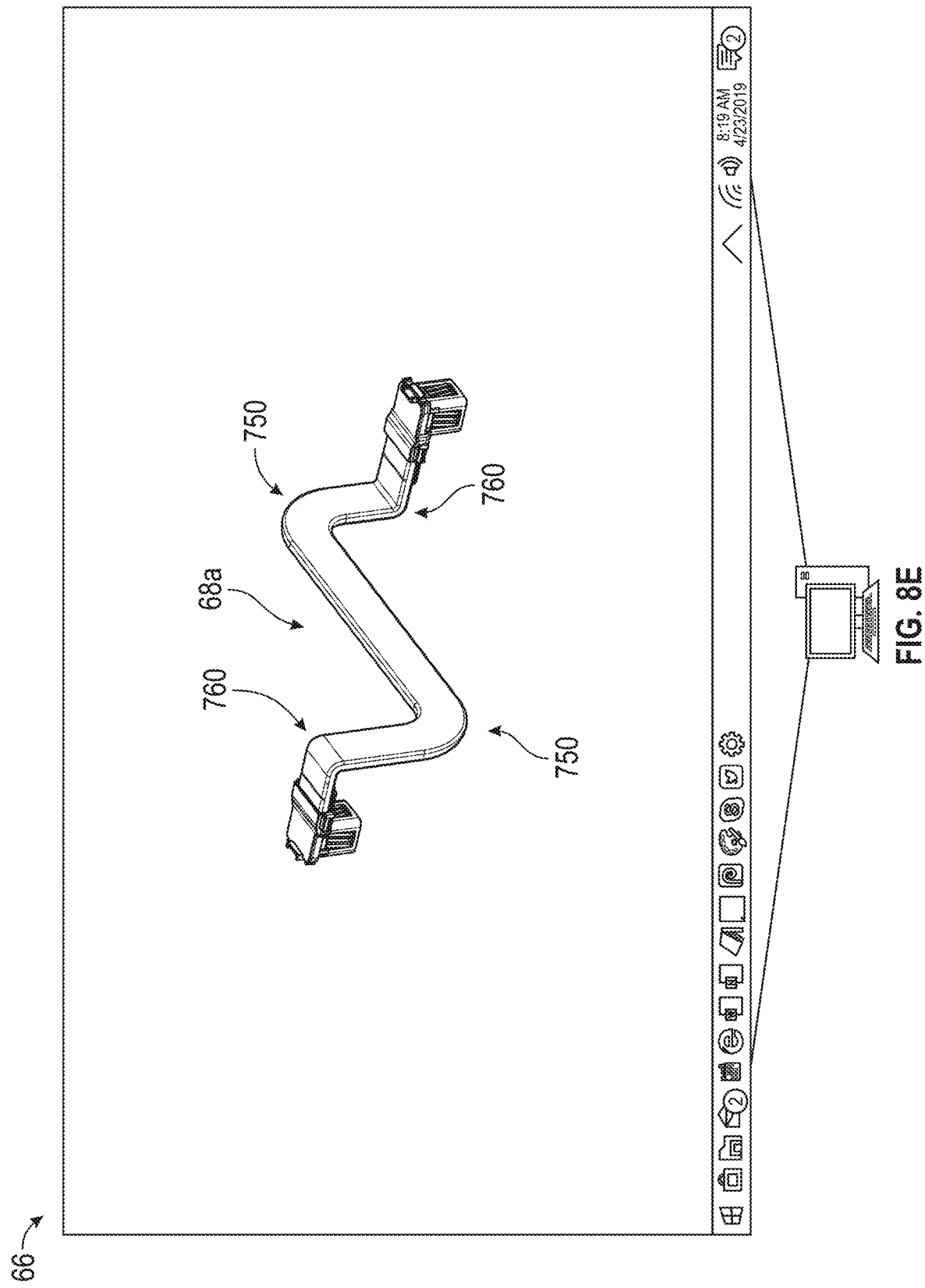

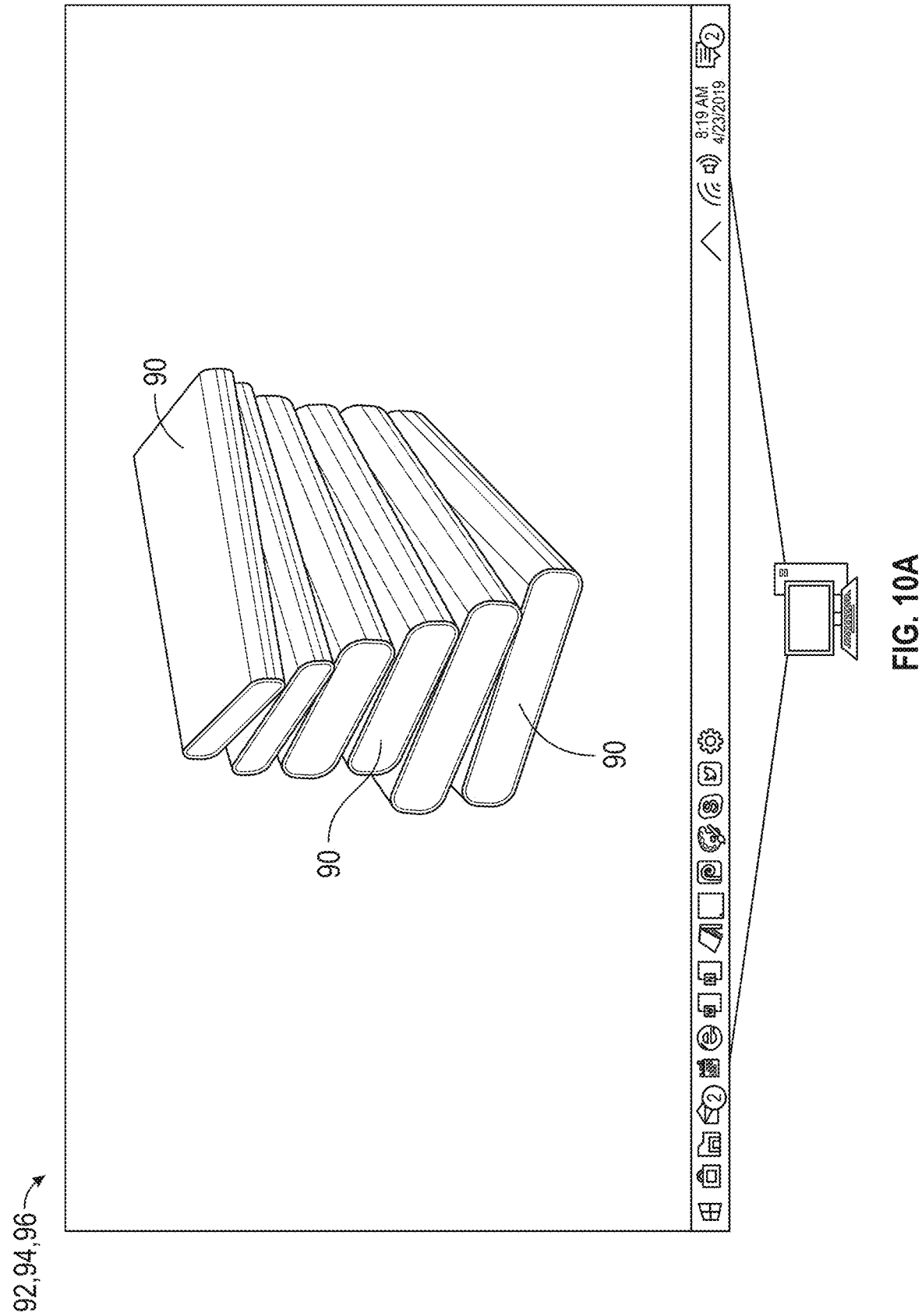

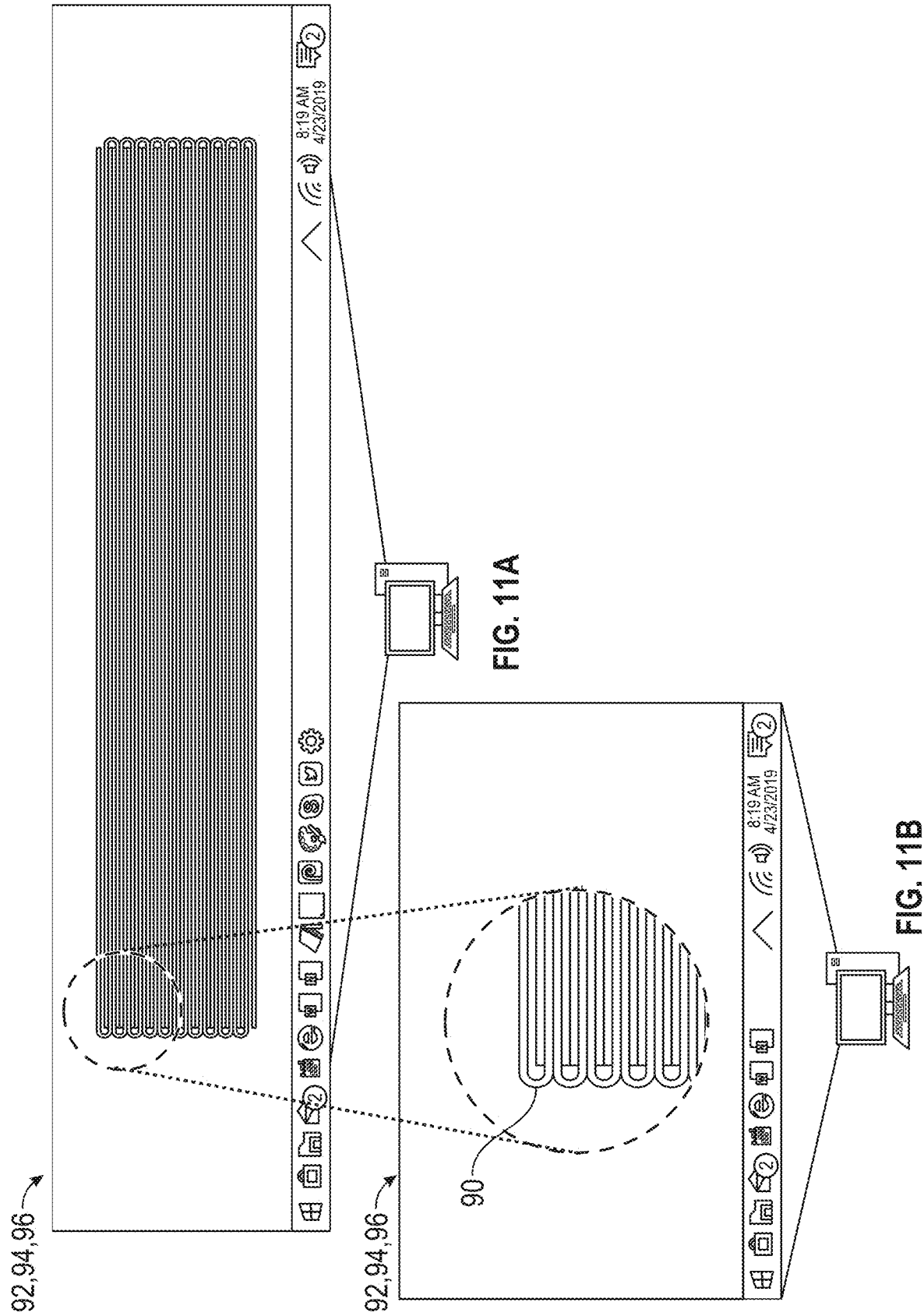

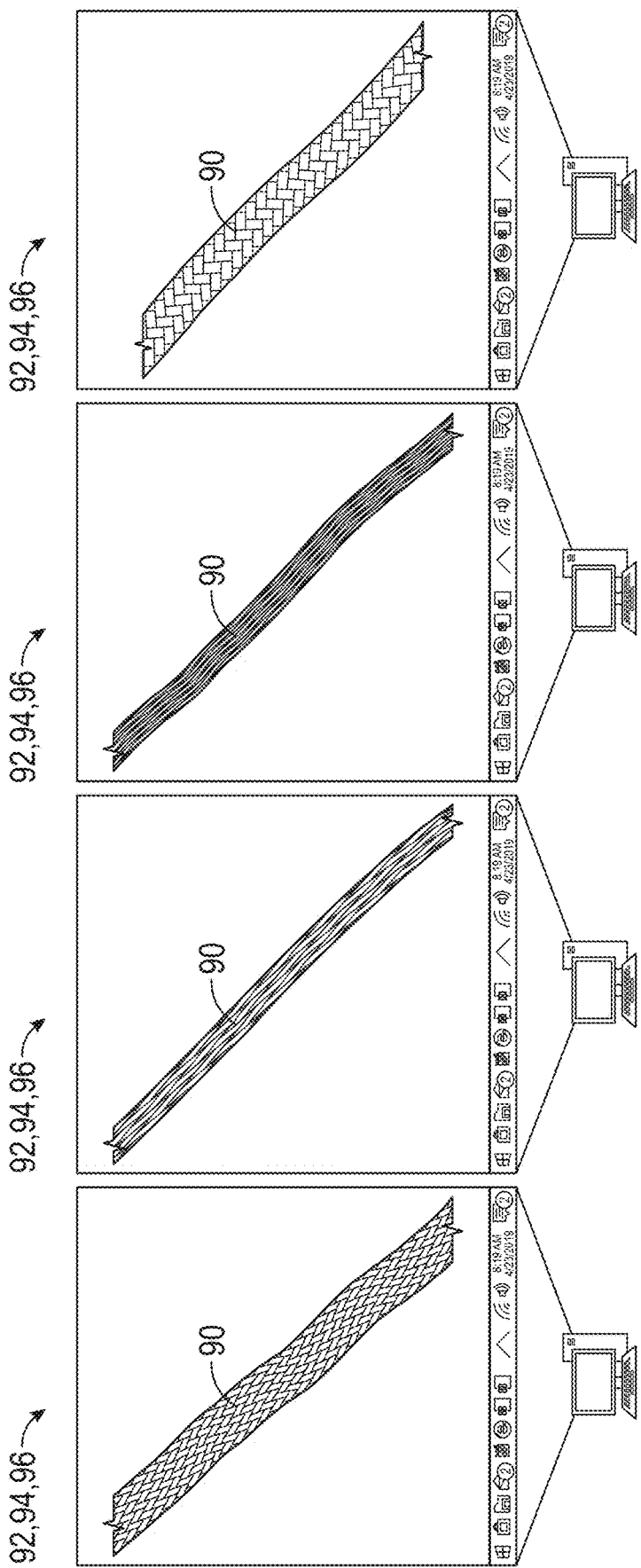

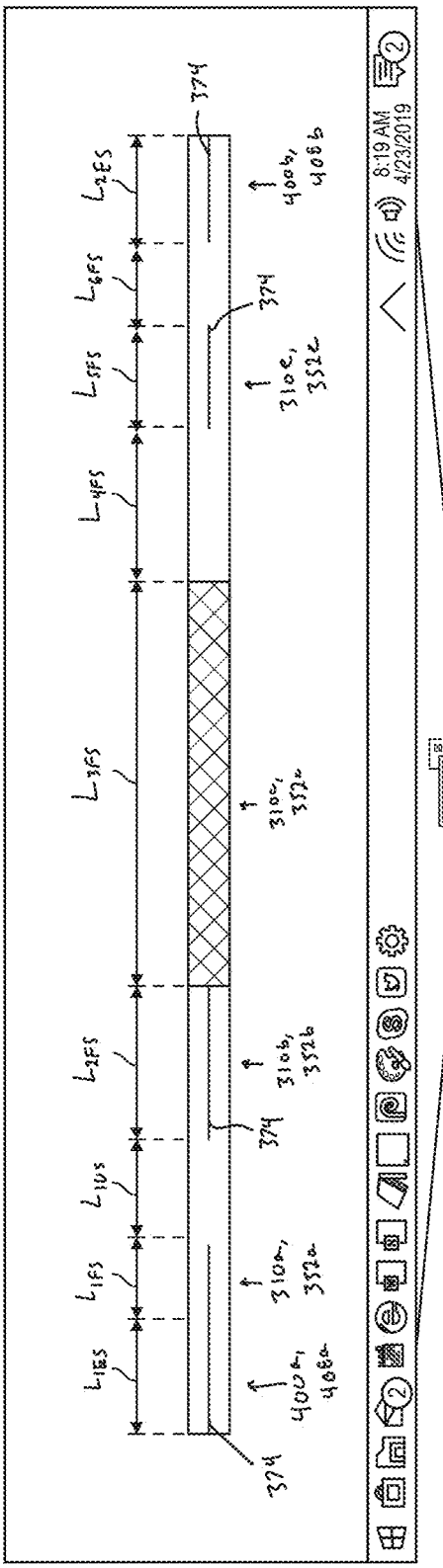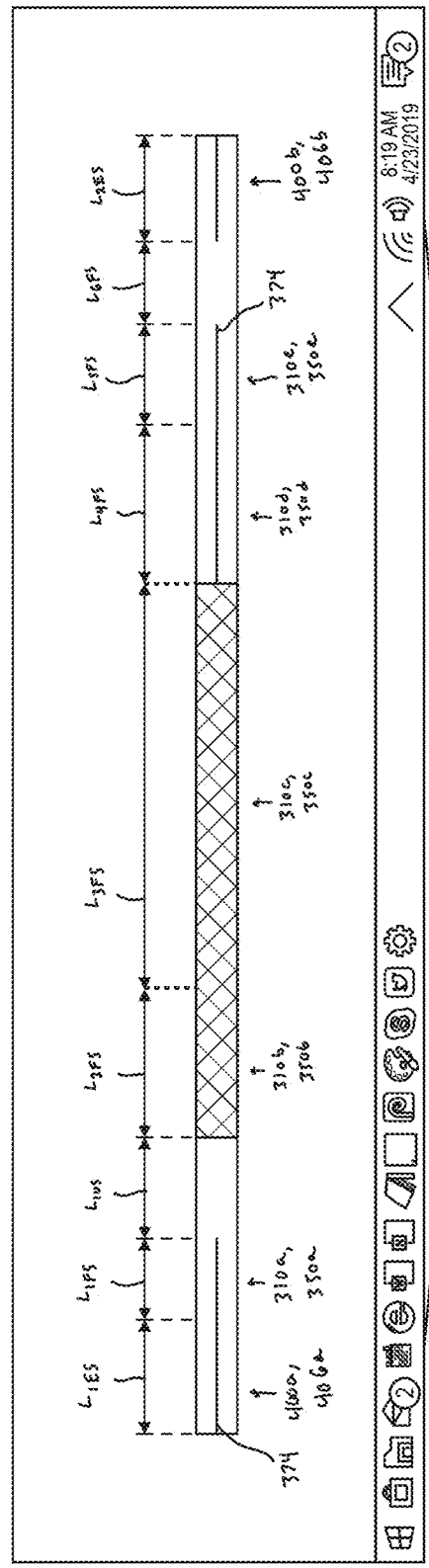

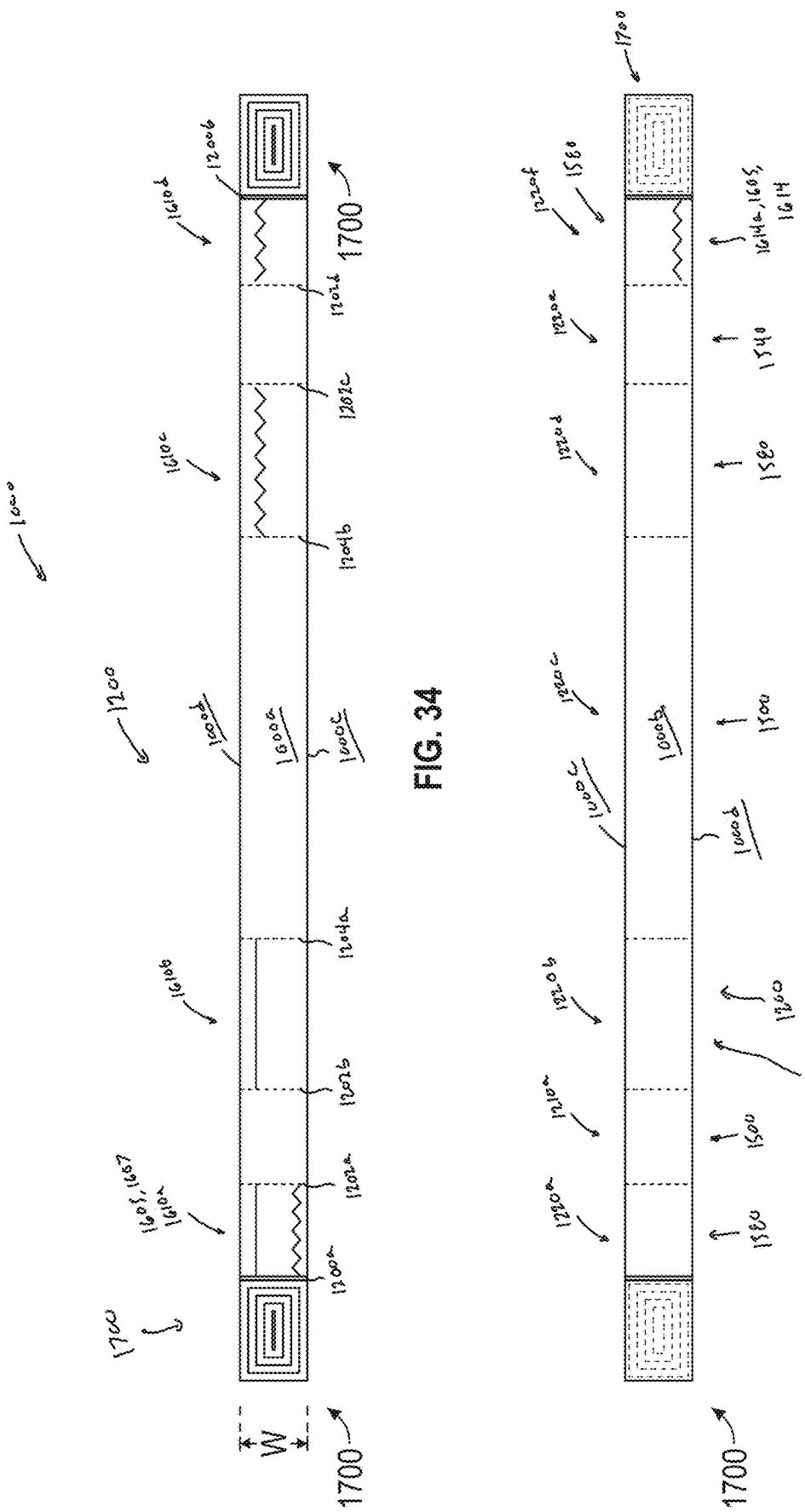

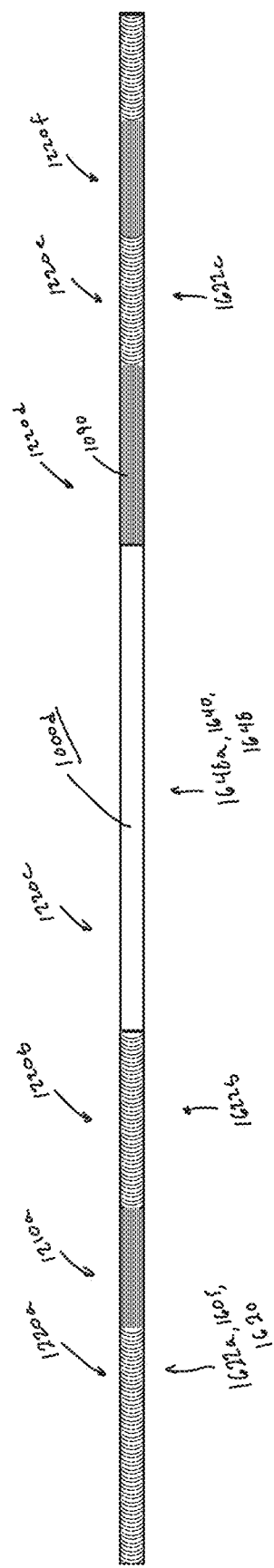
FIG. 36
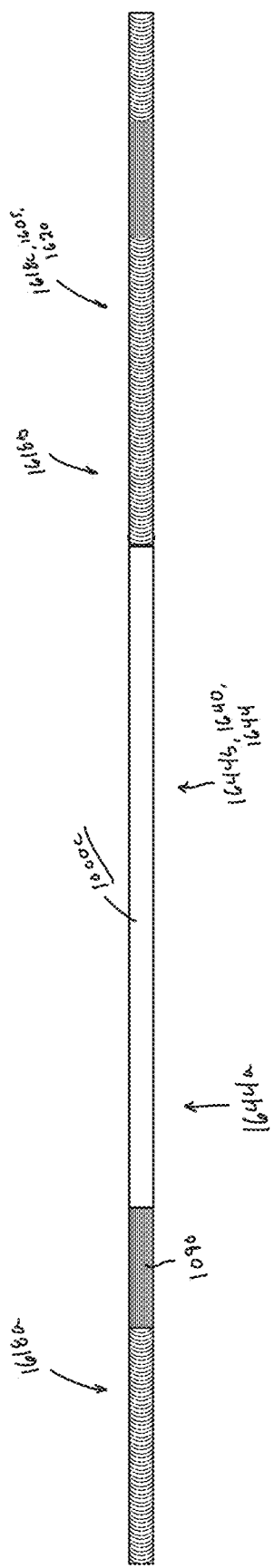
FIG. 37
FIG. 38
FIG. 39

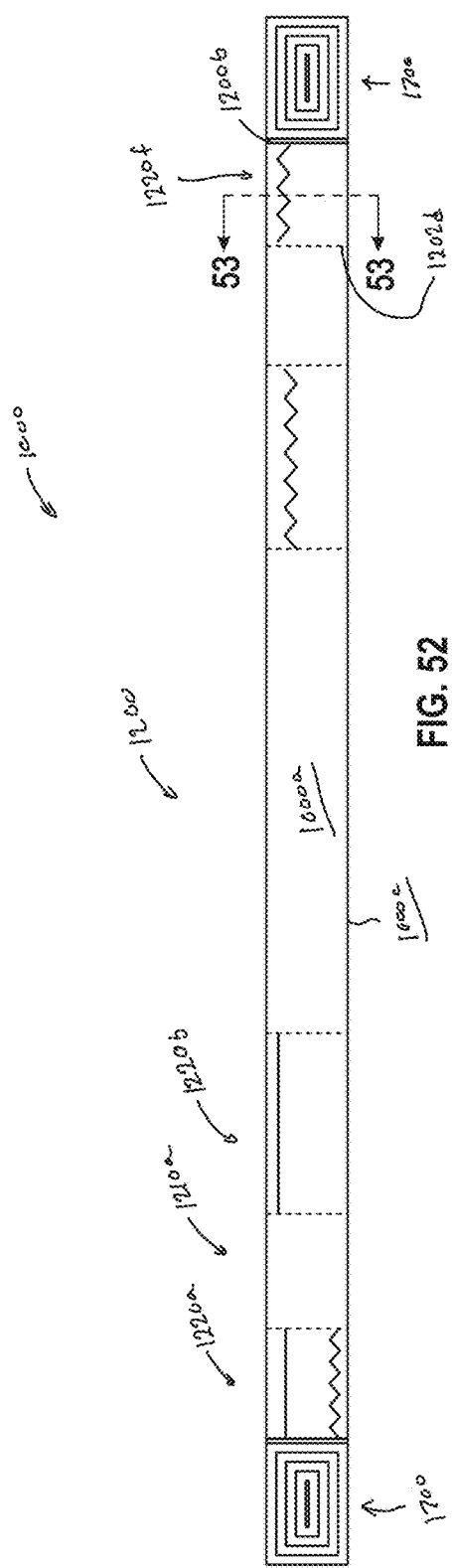
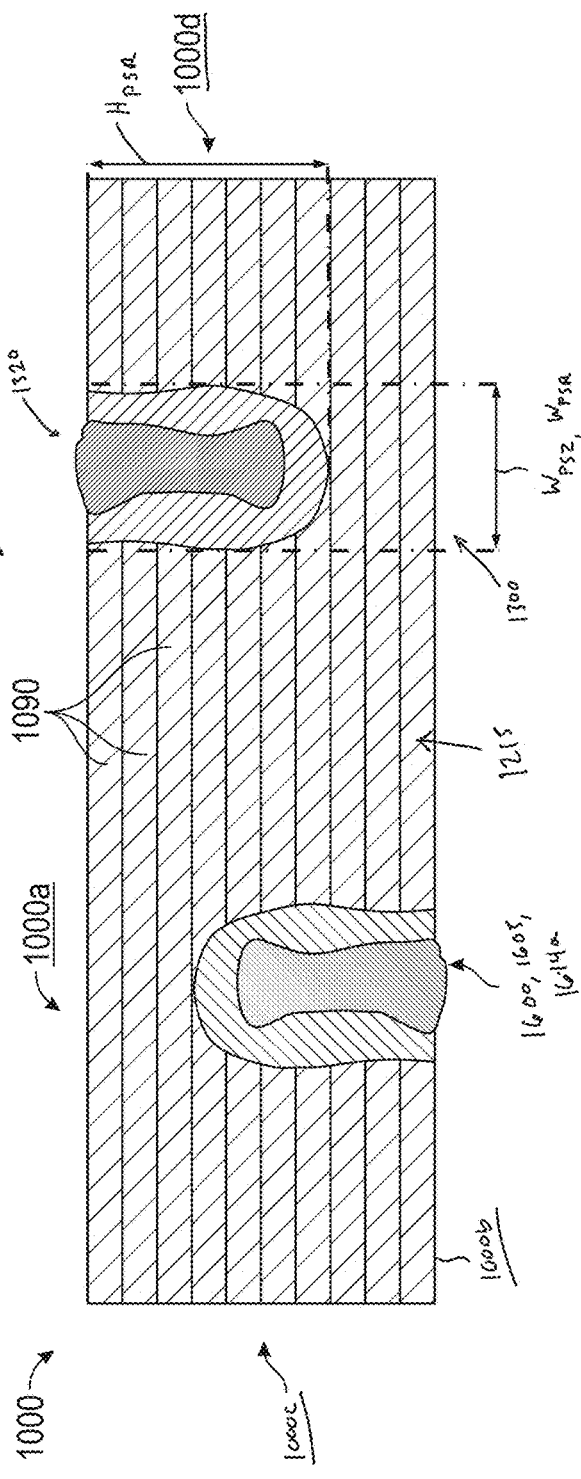
FIG. 52
FIG. 53

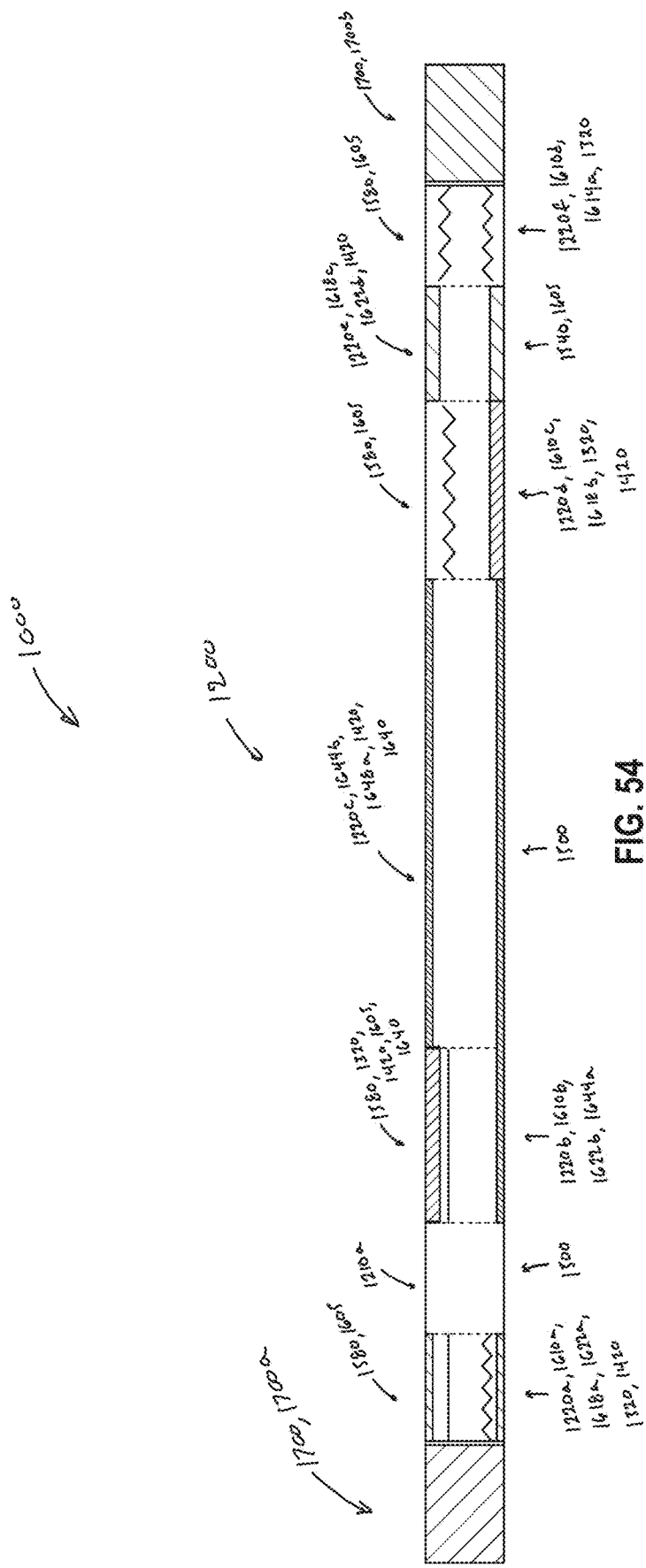

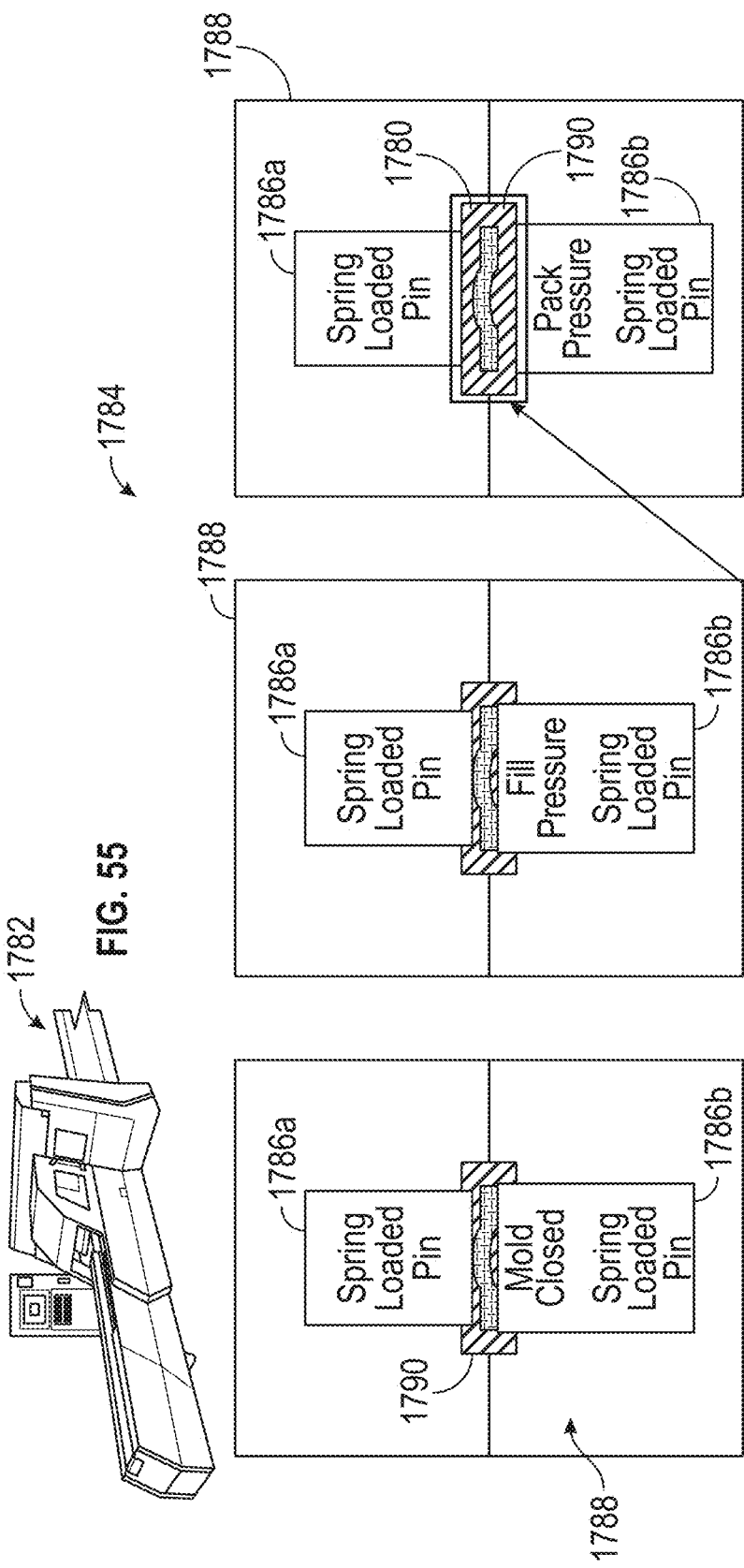

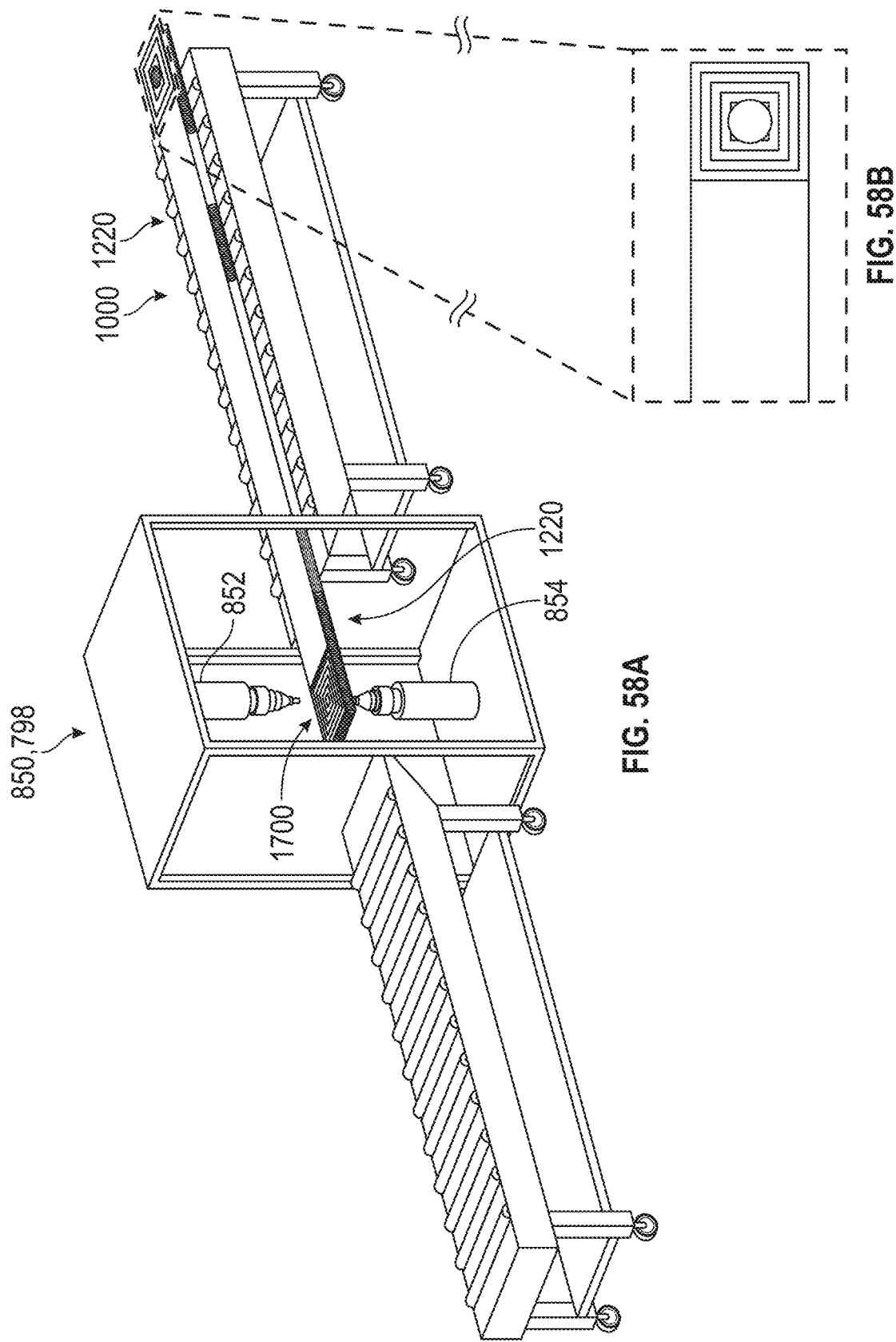

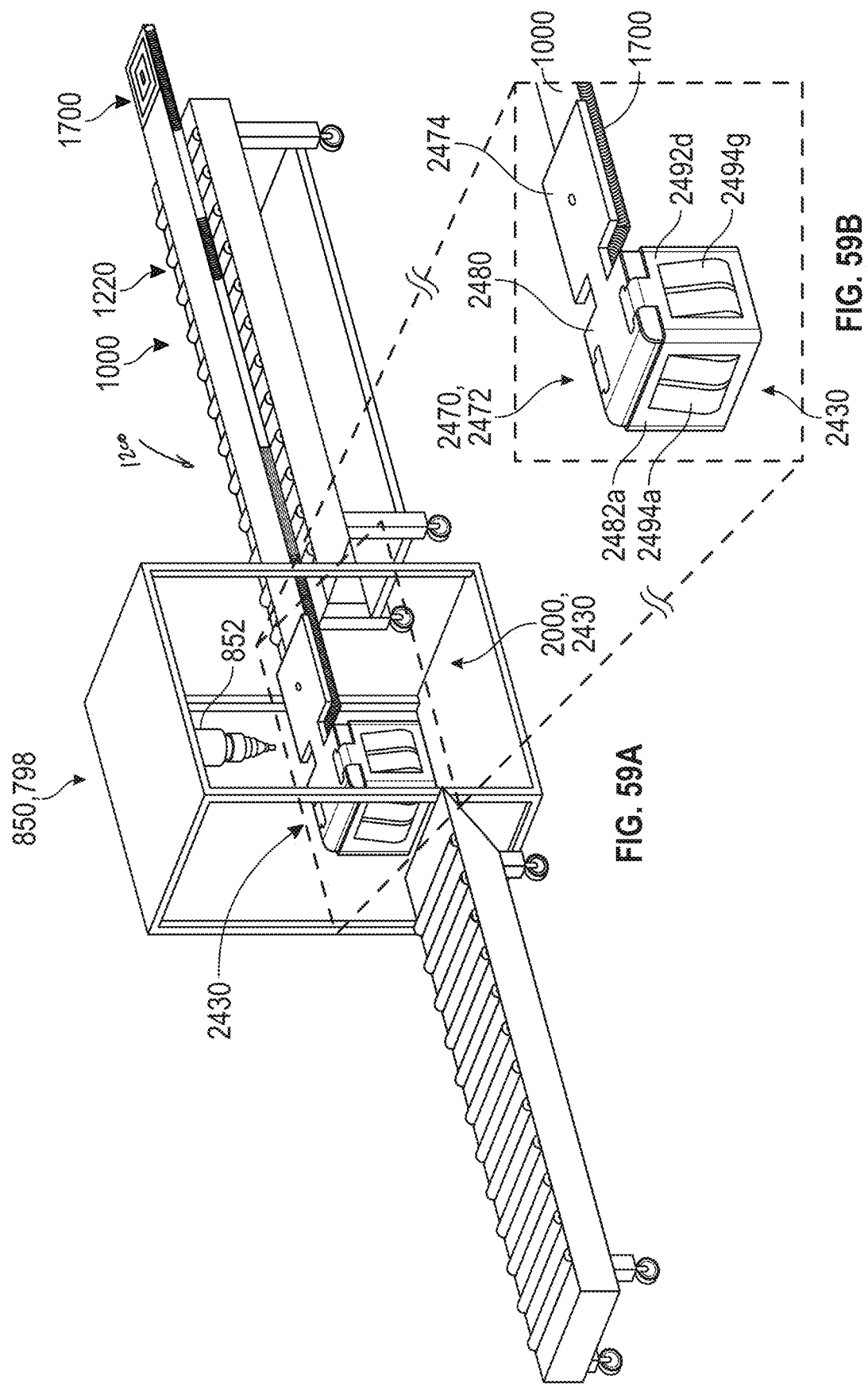

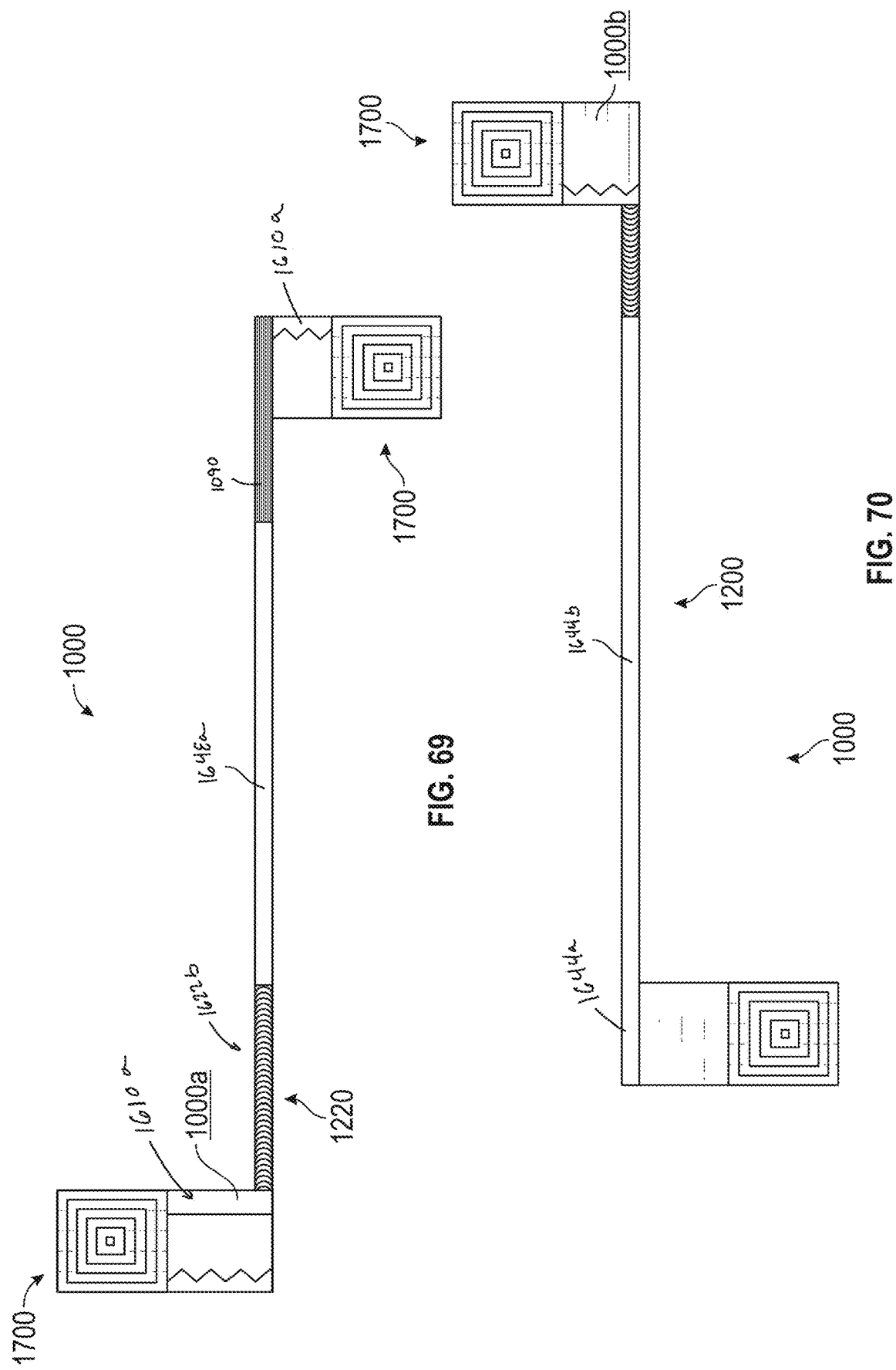

ELECTRICAL BUSBAR AND METHOD OF FABRICATING THE SAME

CROSS-REFERENCE TO RELATED APPLICATIONS

This application is claims priority from U.S. Provisional Patent Application No. 63/234,320, filed Aug. 18, 2021, all of which are incorporated herein by referenced and made a part hereof.

FIELD OF DISCLOSURE

The present disclosure relates to electrical connectors, and, in particular, to a busbar for use in electrical signal and power distribution systems like those found in automotive, military, marine and aviation applications. The inventive busbar features at least one fused segment with a solidified region and one potentially unfused segment, which enables the busbar to be formed with complex geometric configurations that are necessary in electrical signal and power distribution systems.

BACKGROUND

Over the past several decades, the number of electronic devices, components, and systems in the automotive, military, marine and aviation sectors have dramatically increased and are expected to continue to increase in the future. The performance of devices, components, and systems are industry performance standards, as well as production and reliability requirements. As an example, in the automotive segment, automobiles, and other on-road and off-road vehicles such as pick-up trucks, commercial trucks, semi-trucks, motorcycles, all-terrain vehicles, and sports utility vehicles (collectively "motor vehicles") have experienced a dramatic increase in the number and complexity of electronic devices, components, and systems. Electronics are used to improve performance, manage safety features, control emissions, and provide creature comforts to the occupants and users of the motor vehicles. For motor vehicles, a number of electronic components and devices provide critical signal connections for automotive airbags, batteries, battery power packs, and advanced driver-assistance systems (ADAS).

However, motor vehicles are challenging operating environments due to vibration, heat, and moisture, all of which can limit the performance, reliability and operating life of electronic devices and the connectors used to install them in the vehicles. The same challenges apply in the military marine and aviation sectors. For example, heat, vibration and moisture can all lead to premature wear and eventual failure of the connector and/or the devices themselves. In fact, loose connectors, both in the assembly plant and in the field, are one of the largest failure modes for motor vehicles. Considering that just the aggregate annual accrual for warranty by all of the automotive manufacturers and their direct suppliers is estimated at between $50 billion and $150 billion, worldwide, a large failure mode in automotive is associated with a large dollar amount.

In light of these challenging electrical environments, considerable time, money, and energy have been expended to develop power distribution assemblies that meet all of the needs of these markets. Most conventional power distribution assemblies use custom fabricated busbars which are expensive to fabricate and install. By utilizing custom fabricated busbars, any alterations to the power distribution system may require altering the configuration of one or more busbars. These alterations are time-consuming to develop and they further increase labor and installation costs. Once the configuration of these custom-fabricated busbars is finalized and the busbars are manufactured, installers typically couple the busbars to power sources, power distribution components, or other devices with a combination of conventional fasteners (e.g., elongated fasteners, washers, nuts and/or studs). These conventional fasteners make installing the busbars in the application extremely difficult due to the protective equipment that an installer may be required to wear in order to protect themselves during this process. Finally, after the conventional busbars are properly installed in the application, they are prone to high failure rates due to their complex geometric configuration. Accordingly, there is an unmet need for an improved busbar that is boltless, modular suitable, and is suitable for use in power distribution systems that require complex geometries and that are typically found in automotive, military, marine and aviation applications.

The description provided in the background section should not be assumed to be prior art merely because it is mentioned in or associated with the background section. The background section may include information that describes one or more aspects of the subject technology.

SUMMARY

The present disclosure relates to a busbar with at least one fused, stiffer segment and one unfused, flexible segment which enable the busbar to be formed with a complex geometry in the three dimensional Cartesian X, Y and Z coordinate system. The fused segment of the busbar contains at least one region of conductors that has been laterally solidified, partially solidified, or fully solidified, which increases the stiffness of the fused segment of the busbar. The unfused segment of the busbar contains unsolidified regions of conductors, not partially solidified or fully solidified regions of conductors, that cause the unfused segment to be flexible and capable of being bent in the in-plane X-Y direction or the out-of-plane Z direction.

As such, the inventive busbar can be installed in electrical signal and power distribution systems that require complex geometric configurations. These electrical signal and power distribution systems are prevalent in automotive, military, marine and aviation applications, which have industry performance standards and production and reliability requirements that the inventive busbar can meet due to its unique properties.

Other aspects and advantages of the present disclosure will become apparent upon consideration of the following detailed description and the attached drawings wherein like numerals designate like structures throughout the specification.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIGS. 8A-8E show perspective views of busbars that are included in the layout in the computer generated model of FIG. 7;

FIGS. 10A and 10B show a plurality of different conductor configurations that may be selected during the busbar design process, wherein the conductors vary in width, height, layout, shape, orientation, and number;

FIGS. 11A-11I show a plurality of different conductor configurations that may be selected during the busbar design process, wherein the conductors vary in width, height, shape, orientation, and number;

FIG. 29A-29D shows the combined fusion patterns positioned on various regions of a busbar;

FIG. 34 is a top view of the busbar of FIG. 33;

FIG. 35 is a bottom view of the busbar of FIG. 33;

FIG. 36 is a first side view of the busbar of FIG. 33;

FIG. 37 is a second side view of the busbar of FIG. 33;

FIG. 38 is a first end view of the busbar of FIG. 33;

FIG. 39 is a second end view of the busbar of FIG. 33;

FIG. 52 is a top view of the busbar of FIG. 33;

FIG. 53 is a cross-sectional view of the busbar taken along line 53-53 of FIG. 52 showing a fused segment including: (i) two partially solidified region, and (ii) an unsolidified region;

FIG. 54 is a top schematic view of the busbar of FIG. 34, wherein the fully solidified regions, partially solidified regions, laterally solidified regions and unsolidified regions are outlined;

FIG. 55 is a perspective view of a busbar insulating machine;

FIGS. 56A-56C shows the operation of the busbar insulating machine of FIG. 48, wherein the insulating machine uses a cavity centering method to insulate the conductors of the busbar;

FIG. 57 is a busbar that has been insulated using the insulating machine of FIG. 55;

FIG. 58A shows a laser welding machine forming an opening in the busbar, wherein the opening is designed to receive a conventional elongated coupler;

FIG. 58B is a zoomed-in view of the busbar with an opening formed in the end portion;

FIG. 59A shows a laser welding machine coupling an electrical connector assembly with an internal spring component to the busbar;

FIG. 59B is a zoomed-in view of the busbar with the electrical connector assembly with an internal spring component coupled thereto;

FIG. 69 is a top view of the busbar of FIG. 64;

FIG. 70 is a bottom view of the busbar of FIG. 64;

DETAILED DESCRIPTION

Figure 1A:
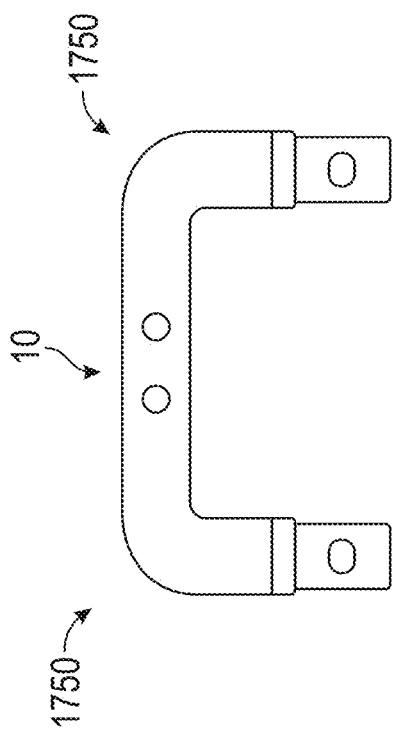
FIG. 1A is a conventional rigid busbar with a configuration having in-plane bends.

In the following detailed description, numerous specific details are set forth by way of examples in order to provide a thorough understanding of the relevant teachings. However, it should be apparent to those skilled in the art that the present teachings may be practiced without such details. In other instances, well-known methods, procedures, components, and/or circuitry have been described at a relatively high-level, without detail, in order to avoid unnecessarily obscuring aspects of the present teachings.

While this disclosure includes a number of embodiments in many different forms, there is shown in the drawings and will herein be described in detail particular embodiments with the understanding that the present disclosure is to be considered as an exemplification of the principles of the disclosed methods and systems, and is not intended to limit the broad aspects of the disclosed concepts to the embodiments illustrated. As will be realized, the disclosed methods and systems are capable of other and different configurations and several details are capable of being modified all without departing from the scope of the disclosed methods and systems. For example, one or more of the following embodiments, in part or whole, may be combined consistently with the disclosed methods and systems. As such, one or more steps from the flowcharts or components in the Figures may be selectively omitted and/or combined consistently with the disclosed methods and systems. In addition, the steps contained in the flowcharts can be performed in different orders. In other words, the order of the steps described below does not have to be strictly followed and instead steps can be performed out of order. Accordingly, the drawings, flow charts and detailed descriptions are to be regarded as illustrative in nature, not restrictive or limiting.

1) Definitions

The following terms appear through this specification and are defined as follows. From an organizational standpoint, the terms "segment(s)" and "section(s)" are at a top level of the hierarchy, "zone(s)" are at a middle level of the hierarchy and "region(s)" are at a lower level of the hierarchy.

Figure 42:
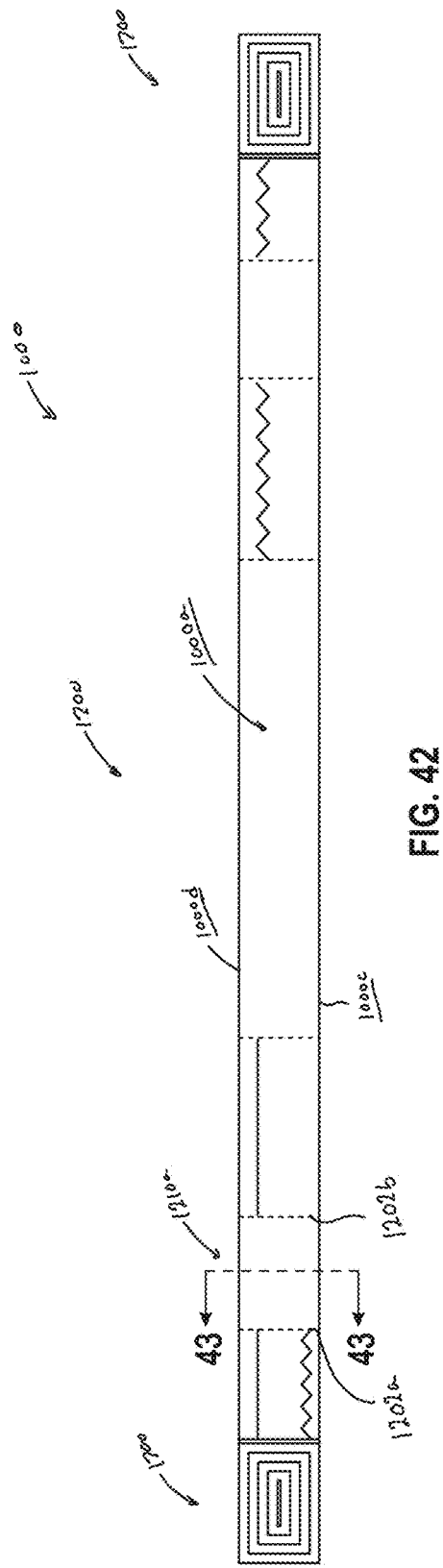
FIG. 42 is a top view of the busbar of FIG. 33.
Figure 43:
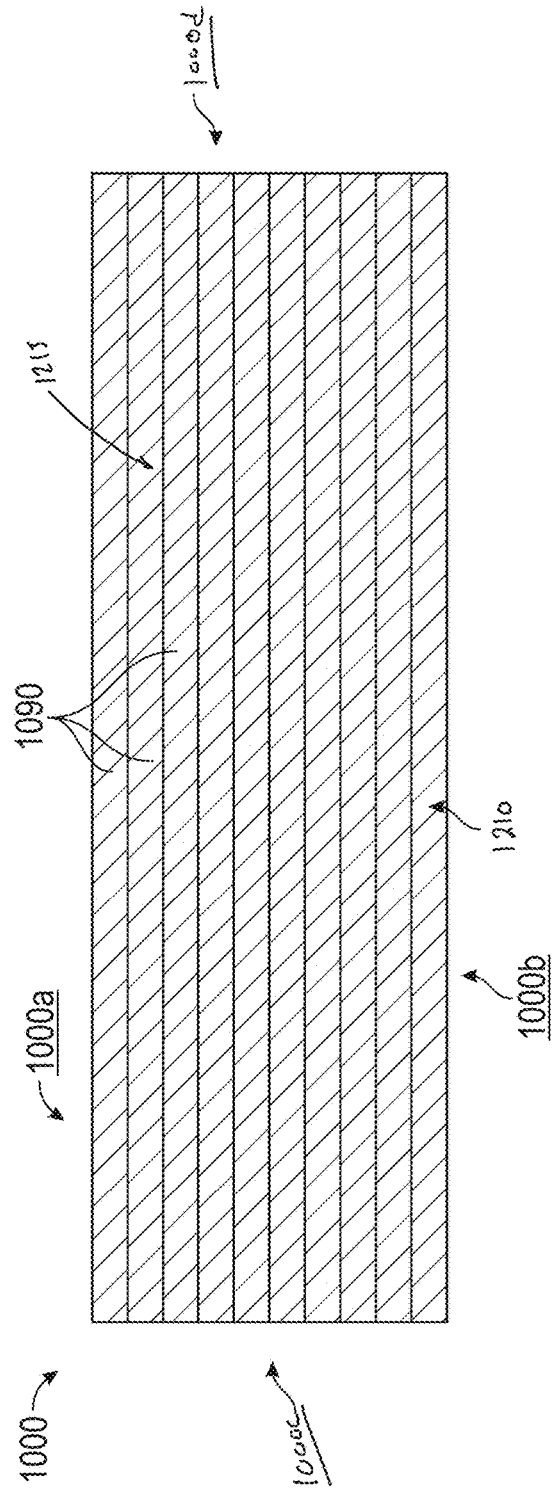
FIG. 43 is a cross-sectional view of the busbar taken along line 43-43 of FIG. 42 showing an unfused segment having an unsolidified region.

The term "unfused segment" is an extent of the busbar that only contains an unsolidified or unfused distinct, region(s) of conductors. Thus, the unfused segment does not contain: (i) a partially solidified region, (ii) a limitedly or laterally solidified region, or (iii) a fully solidified region. For example, FIGS. 42-43 show the unfused segment 1210 of the intermediate portion 1200 of the inventive busbar 1000, the unfused segment 1210 having an unsolidified region 1215 with distinct, unfused conductors 1090.

The term "fused segment" is an extent of the busbar that contains at least one of: (i) a partially solidified region, (ii) a laterally solidified region, or (iii) a fully solidified region. The fused segment may also include an unsolidified region. For example, FIGS. 40-41 and 44-53 shows fused segment 1220 that includes: (i) unsolidified regions 1215, (ii) partially solidified regions 1320, and (iii) laterally solidified regions 1420.

The term "partial solidification zone" is an area of the fused segment of the intermediate portion of the busbar, where the zone (i) extends, in the fused segment, from the lowermost or bottom conductor to the uppermost or top conductor, and (ii) includes a partially solidified region. For example, in FIG. 41 the partial solidification zone 1300 extends between the top surface 1000*a* and the bottom surface 1000*b* and includes an extent of the busbar 1000 that has undergone a vertical partial penetration weldment process. A significant amount (e.g., approximately 70%) of the conductors 1090 in the partially solidified zone 1300 are combined or fused into a single consolidated conductor to form a partially solidified region 1320. In contrast, a lesser amount (e.g., approximately 30%) of the conductors 1090 located within the partial solidification zone 1300 and beyond the partially solidified region 1320 remain as individual, distinct conductors 1090—meaning that they are not combined or fused into a single combined conductor—in an unsolidified region 1215.

Figure 41:
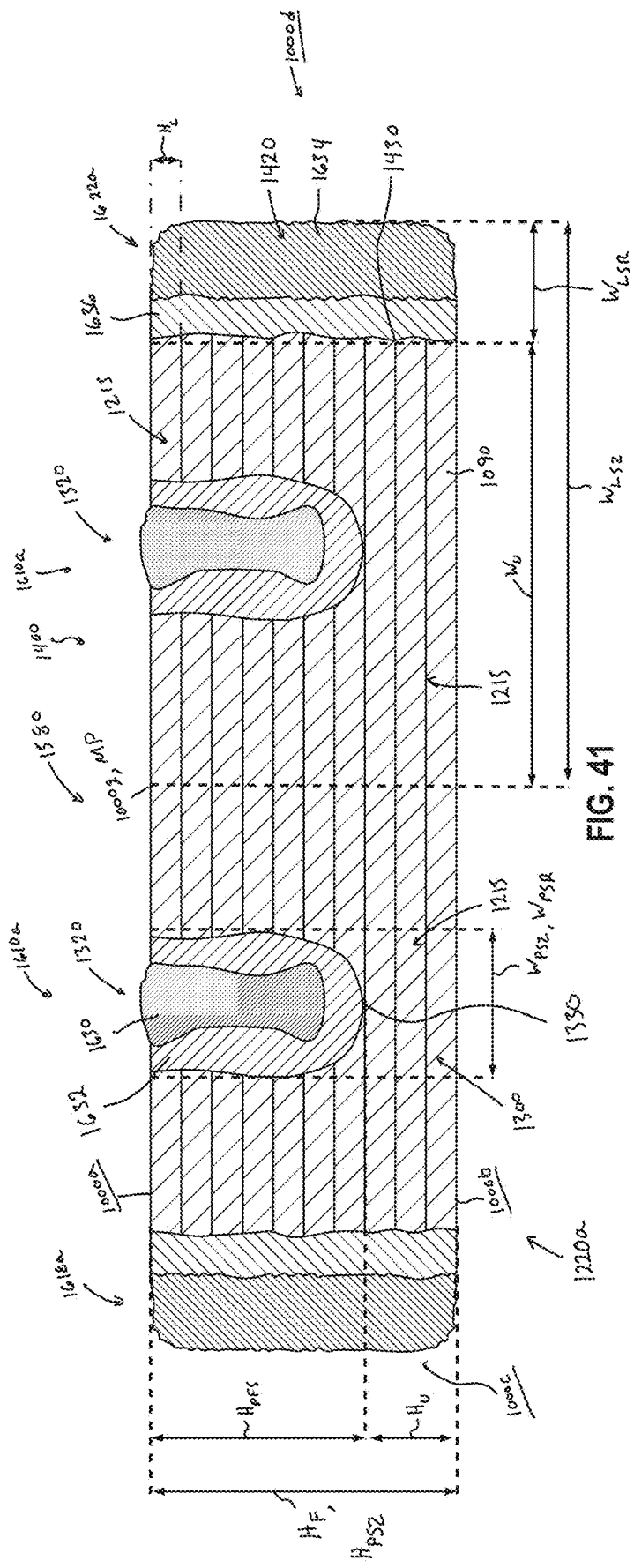
FIG. 41 is a cross-sectional view of the busbar taken along line 41-41 of FIG. 40 showing a fused segment including: (i) two limitedly or laterally solidified regions, (ii) two partially solidified region, and (iii) an unsolidified region that lacks solidified region(s)
Figure 51:
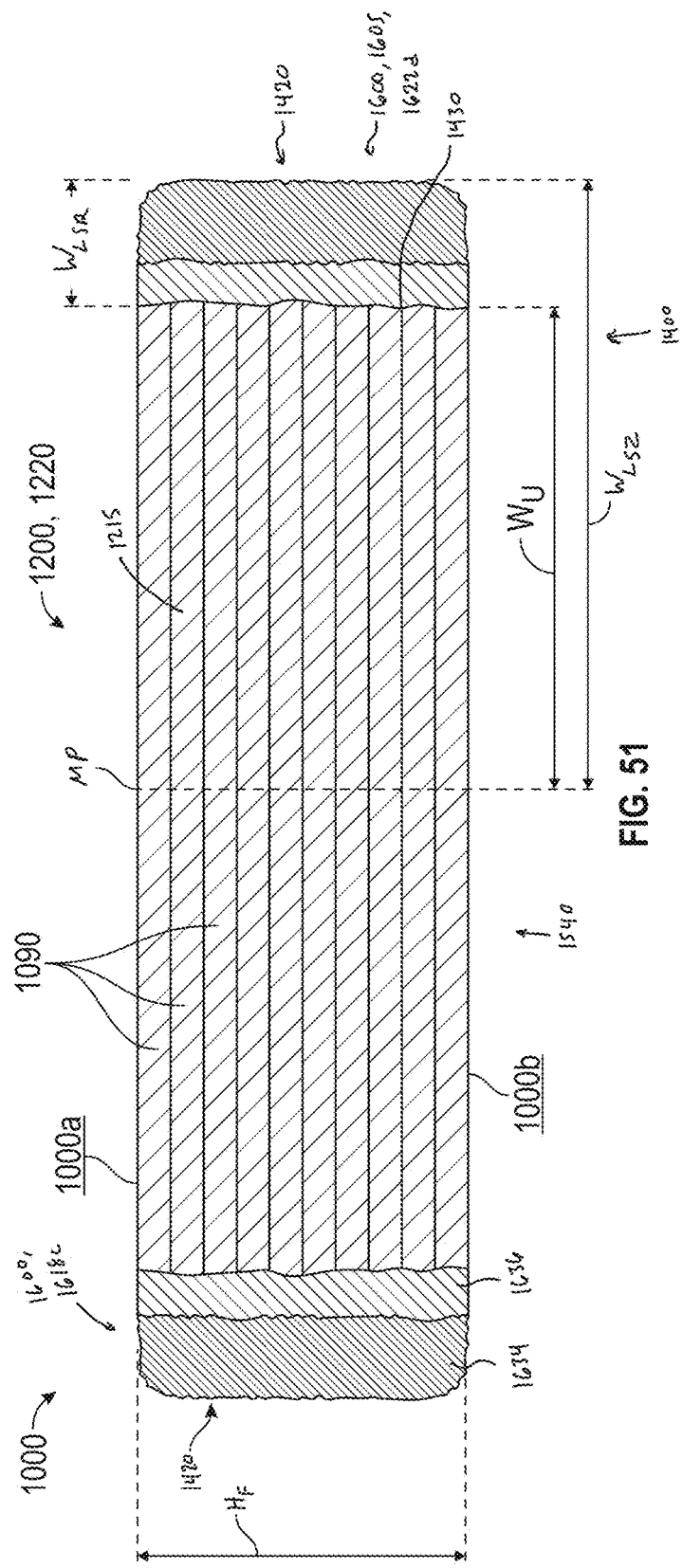
FIG. 51 is a cross-sectional view of the busbar taken along line 51-51 of FIG. 50 showing a fused segment including: (i) two laterally solidified region, and (ii) an unsolidified region.

The term "partially solidified region" means an extent of the partial solidification zone of the busbar that has undergone a fusion process (e.g., vertical partial penetration weldment process). This process combines or fuses some, but not all, extents of conductors to form a single consolidated conductor. For example, FIGS. 41 and 51 show partially solidified regions 1320 adjacent to the unsolidified region 1215, both of which are located in the partial solidification zone 1300 of the fused segment 1220 of the intermediate portion 1200 of the busbar 1000.

The term "limited solidification zone" is an area of the fused segment of the busbar, where the zone extends between: (i) a midpoint or middle of the width or depth as defined between the outermost edges of the fused segment, and (ii) one of the outermost edges of the fused segment. For example, FIGS. 41 and 51 shows a limited solidification zone 1400 that extends between the edge 1000*d* and the midpoint MP of the busbar 1000, which includes an extent that has undergone a lateral partial penetration weldment process that does not reach the midpoint MP. A minor amount (e.g., approximately 5%) of the conductors 1090 located within the limited solidification zone 1400 are combined into a single consolidated conductor to form a laterally solidified region 1420 and a greater amount (e.g., approximately 95%) of the conductors located within the limited solidification zone 1400 remain as individual conductors 1090—meaning that they are not combined or fused into a single combined conductor—in an unsolidified regions 1215.

The term "laterally solidified region" means an extent of the limited solidification zone of the busbar that has undergone a fusion process (e.g., a lateral partial penetration weldment process or a cold forming process). This process combines or fuses some, but not all, of the intermediate extents of conductors to form a single consolidated conductor. For example, FIGS. 41 and 51 shows the laterally solidified region 1420 adjacent to the unsolidified region 1215, both of which are located in the limited solidification zone 1400 of the fused segment 1220 of the intermediate portion 1200 of the busbar 1000.

The term "unsolidified region" means an extent of the busbar that has not undergone a weldment process to combine or fuse any of the conductors in that region of the busbar. As such, all of the conductors 1090 located in an unsolidified region remain as individual, discrete conductors. For example, FIG. 42 shows an unsolidified region 1215 adjacent to the laterally solidified region 1420.

Figure 75:
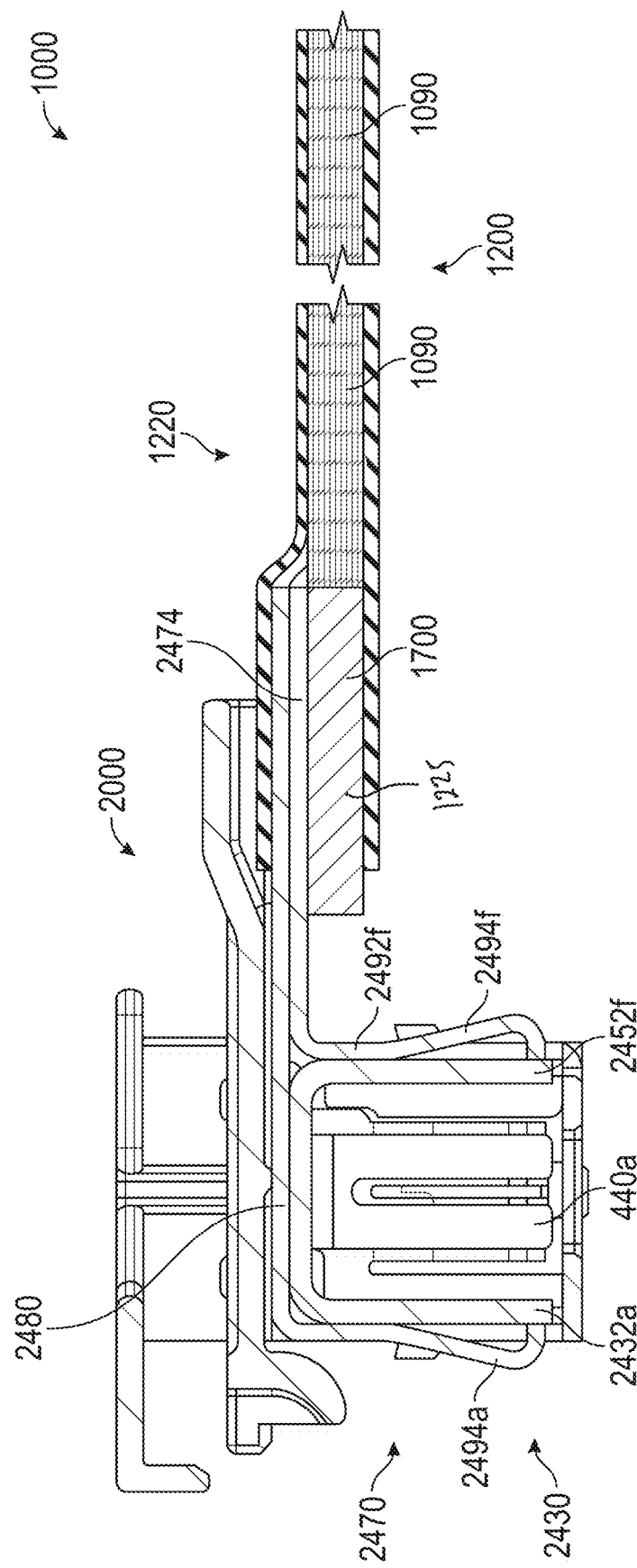
FIG. 75 is a cross-sectional view of the busbar taken along line 75-75 of FIG. 74, showing the electrical connector assembly coupled to the busbar.

The term "fully solidified region" means an extent of the busbar that has undergone a full penetration weldment process to combine or fuse all conductors 1090 contained in that extent of the busbar into a single consolidated conductor. For example, FIG. 75 shows a fully solidified region 1225 that extends across the end portion 1700 of the busbar 1000.

The general term "solidified region" means a partially solidified region 1320, a laterally solidified region 1420, or a fully solidified region 1225.

Figure 46:
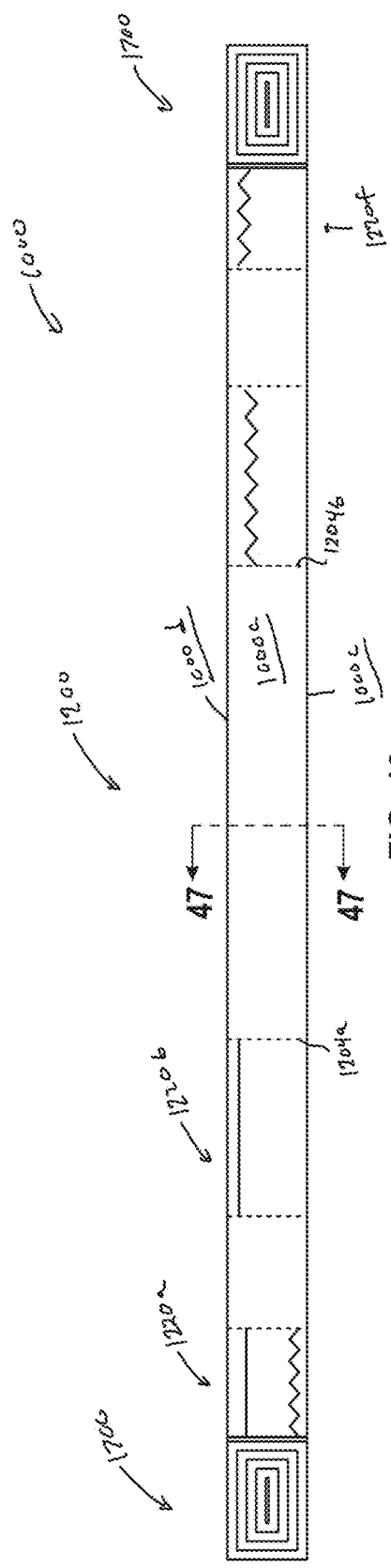
FIG. 46 is a top view of the busbar of FIG. 33.
Figure 47:
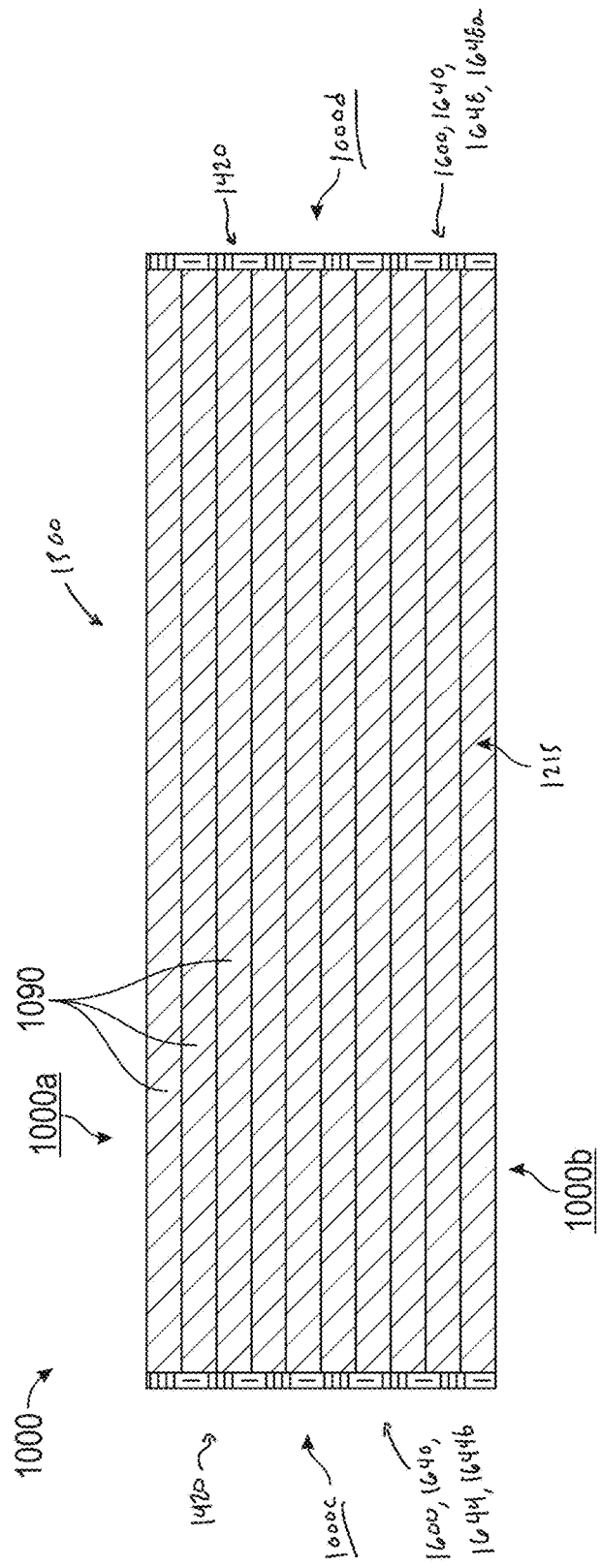
FIG. 47 is a cross-sectional view of the busbar taken along line 47-47 of FIG. 46 showing a fused segment including: (i) two laterally solidified regions, and (ii) an unsolidified region.

The term "flexible section" is an extent of the busbar that does not contain: (i) a partially solidified region, (ii) a laterally solidified region formed using a lateral partial penetration weldment process, or (iii) a fully solidified region. For example, FIGS. 42-43 and 46-47 show a flexible section 1500 that is primarily comprised of unsolidified region(s) 1215 of conductors 1090 and potentially one or more laterally solidified region(s) 1420 formed using a cold forming process (as shown in FIGS. 46-47). The rigidity of the flexible section 1500 of the busbar 1000 is less than 20% of the rigidity of a corresponding section of a reference busbar having the same geometry and being formed from a similar solid material.

Figure 50:
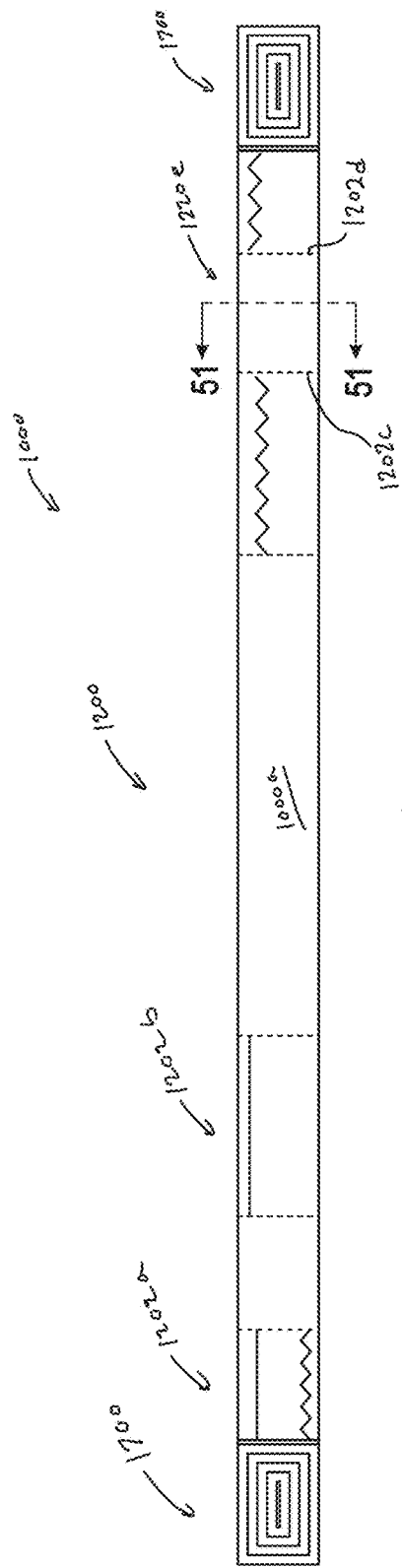
FIG. 50 is a top view of the busbar of FIG. 33.

The term "handling section" is an extent of the busbar that does not contain: (i) a partially solidified region, or (iii) a fully solidified region. For example, FIGS. 50-51 show a handling section 1540 that is comprised of unsolidified region(s) 1215 of conductors 1090 and one or more laterally solidified region(s) 1420 formed using a lateral partial penetration weldment process. The rigidity of the handling section 1540 of the busbar 1000 is between 50% and 75% of the rigidity of a corresponding section of a reference busbar having the same geometry and being formed from a similar solid material.

The term "bend section" is an extent of the busbar that contains at least one of: (i) partially solidified region, or (ii) a fully solidified region. For example, FIGS. 40-41, 44-45, 48-49 and 52-53, show a bend section 1580 that includes unsolidified region(s) 1215 of conductors 1090 and one or more partially solidified region(s) 1320 formed using a vertical partial penetration weldment process and potentially one or more laterally solidified region(s) 1420 formed using a lateral partial penetration weldment process and/or one or more laterally solidified region(s) 1420 formed using a cold forming process. The rigidity of the bend section 1580 is greater than 75% of the rigidity of a corresponding section of a reference busbar having the same geometry and being formed from a similar solid material.

From an organizational standpoint, the term "busbar" or "bar" is at a top level of the hierarchy, "end(s)" and "intermediate" are at an upper middle level of the hierarchy, "segment(s)" is at a lower middle level of the hierarchy, and "surface(s)" and "edge(s)" are at a lower level of the hierarchy.

The term "busbar fusion pattern" includes the end fusion pattern(s) and the intermediate fusion pattern(s) contained in the busbar model 100. For example, FIGS. 29A-29D show a busbar fusion pattern 298 that includes an intermediate fusion pattern 300 and an end fusion pattern 400.

The term "end fusion pattern" is an extent of the busbar model that includes a combination of fusion patterns contained in an end portion of the busbar model. For example, FIGS. 29A-29D show an end fusion pattern 400 of the busbar model 100 including: (i) a top end fusion pattern 402, (ii) a bottom end fusion pattern 404, and (ii) two side end fusion patterns 406, 408.

The term "intermediate fusion pattern" is an extent of the busbar model that includes all segment fusion patterns contained in the intermediate portion of the busbar model. For example, FIGS. 29A-29D show an intermediate fusion pattern 300 of the busbar model 100 including six segment fusion patterns 310a-310f.

The term "segment fusion pattern" is a fused segment in the intermediate fusion pattern of the busbar model that includes the surface fusion pattern(s) and the edge fusion pattern(s) in a specific fused segment. For example, FIGS. 29C and 29D show six segment fusion patterns 310a-310f, wherein each segment 310a-310f includes at least one of: (i) top surface fusion pattern 330, (ii) a bottom surface fusion pattern 332, (iii) a first side edge fusion pattern 350, and (iv) a second side edge fusion pattern 352.

Figure 29A:
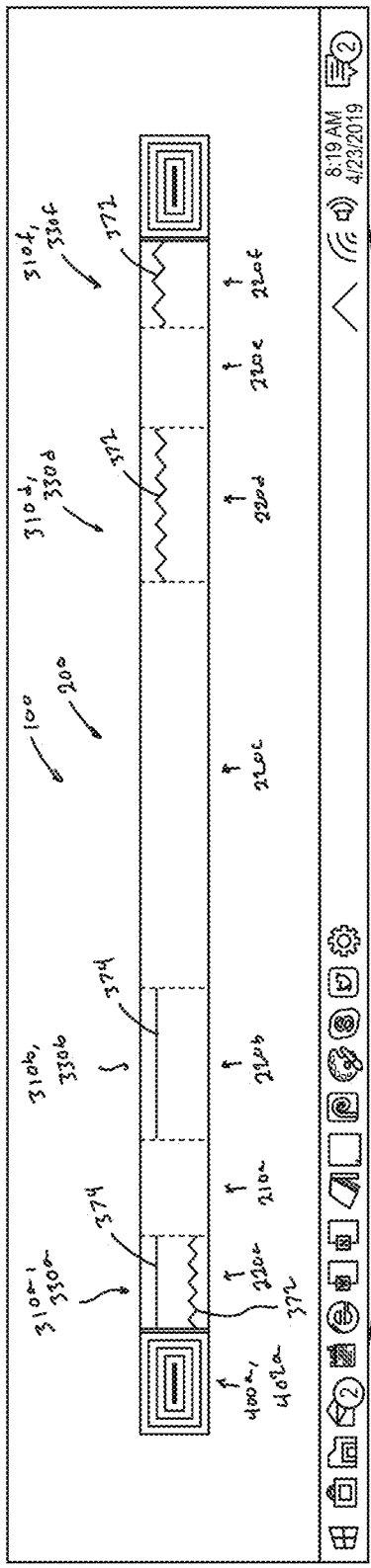
Figure 29B:
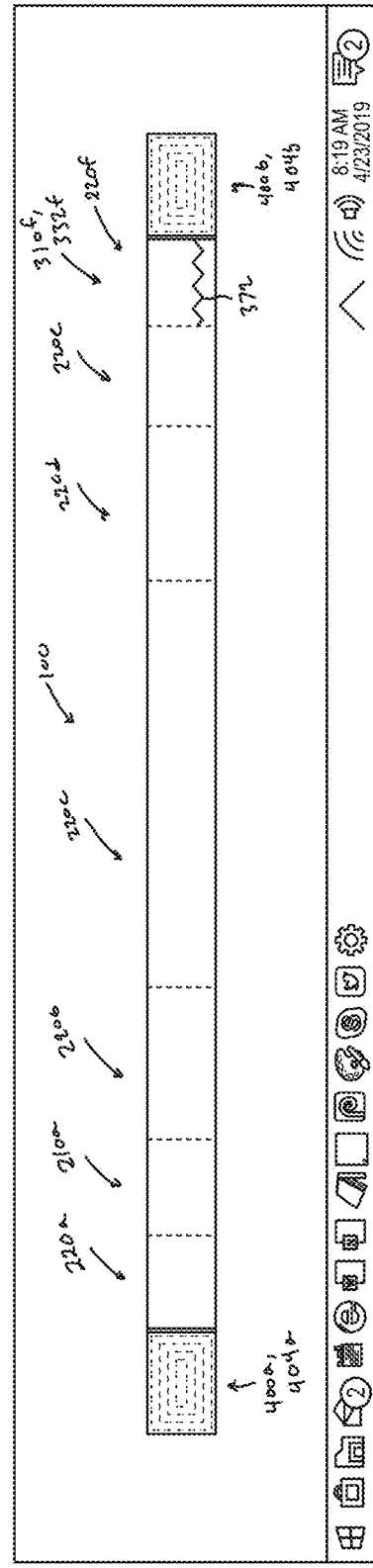
Figure 30B:
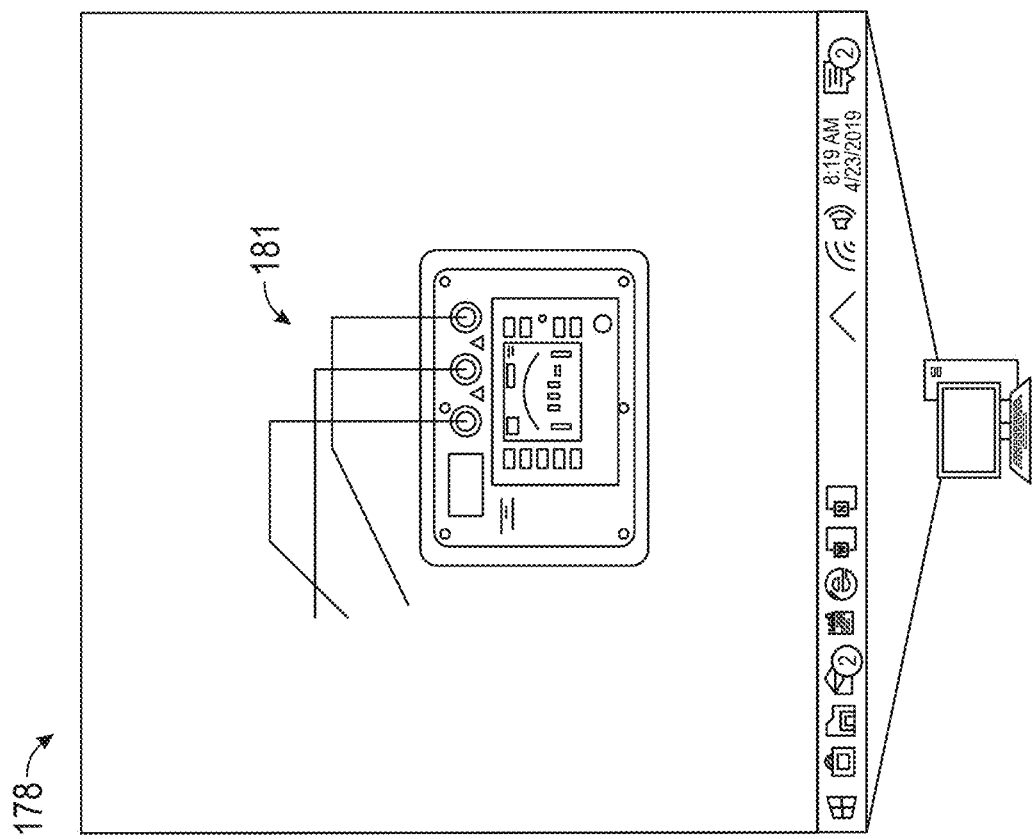
FIGS. 30A and 30B show machines for the digital testing of the busbar design to ensure that it meets the customer's busbar specifications.
Figure 30A:
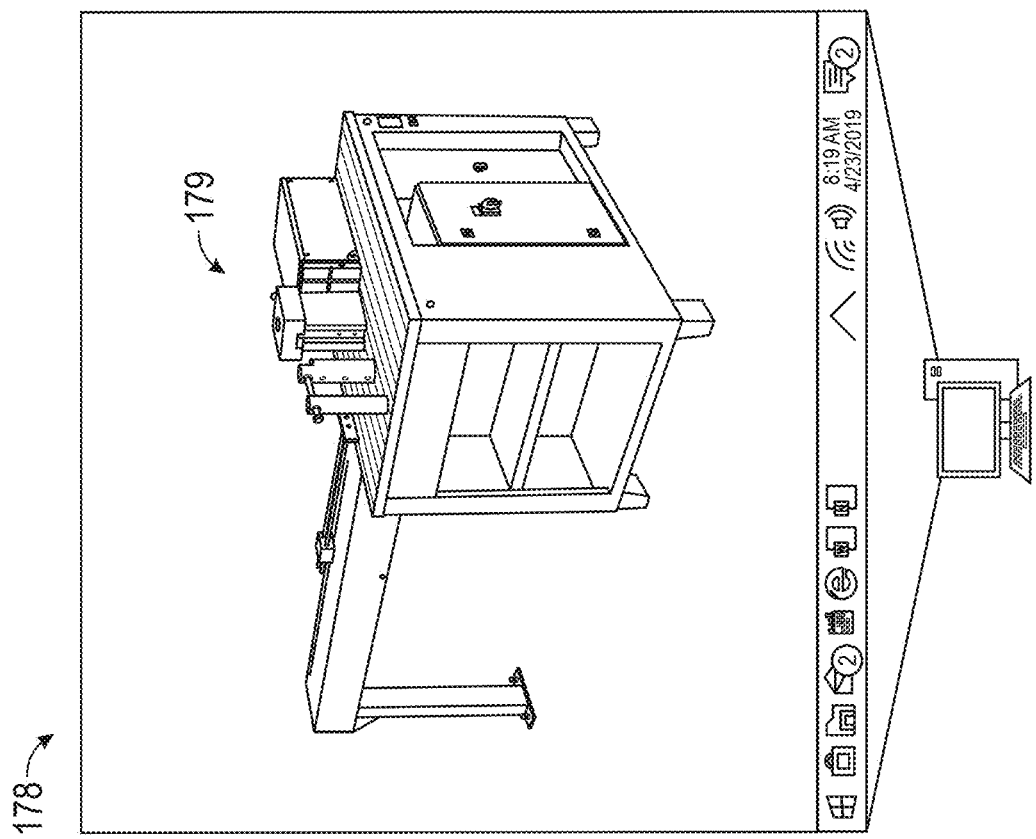
Figure 31:
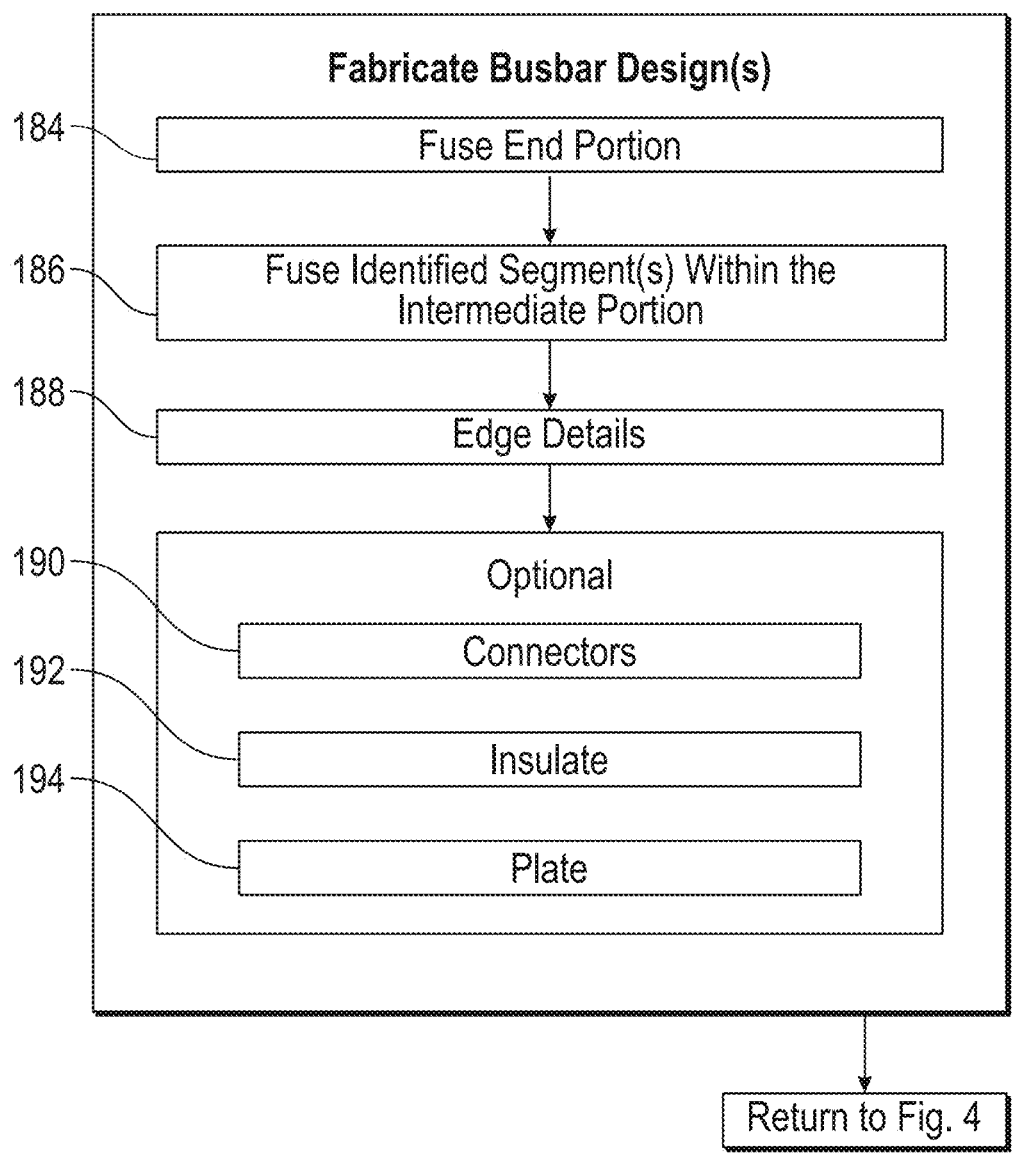
FIG. 31 is a flowchart showing the fabrication process of the busbar design.

The term "surface fusion pattern" is an extent of the segment fusion pattern of the busbar model that includes at least one waveform generated from an analysis of the general properties associated with a fused segment 220 contained in the busbar model 100. For example, FIGS. 29A and 29B show a busbar model 100 that includes three surface fusion patterns 330a, 330b, and 332a.

The term "edge fusion pattern" is an extent of the segment fusion pattern of the busbar model that includes at least one waveform generated from an analysis of the general properties associated with a fused segment 220 contained in the busbar model 100. For example, FIGS. 29C and 29D show a busbar model 100 that includes ten edge fusion patterns 350a-350e and 352a-352e.

Figure 3A:
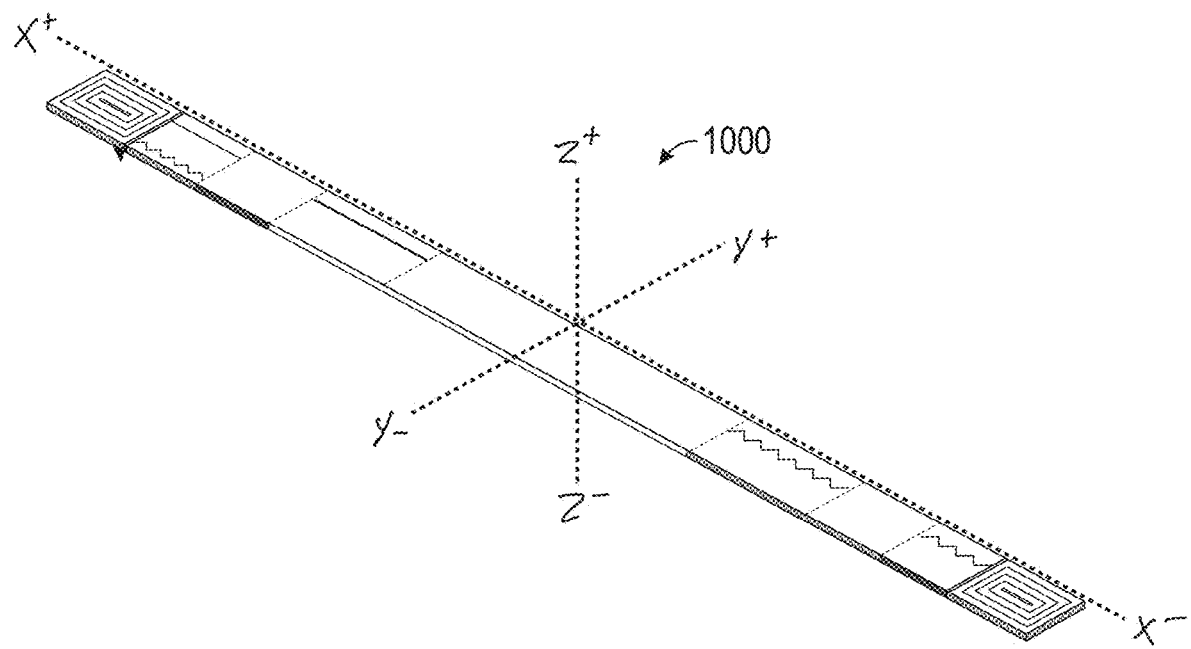
FIG. 3A is a perspective view of the inventive busbar and a three dimensional X, Y and Z Cartesian coordinate reference system.
Figure 3B:
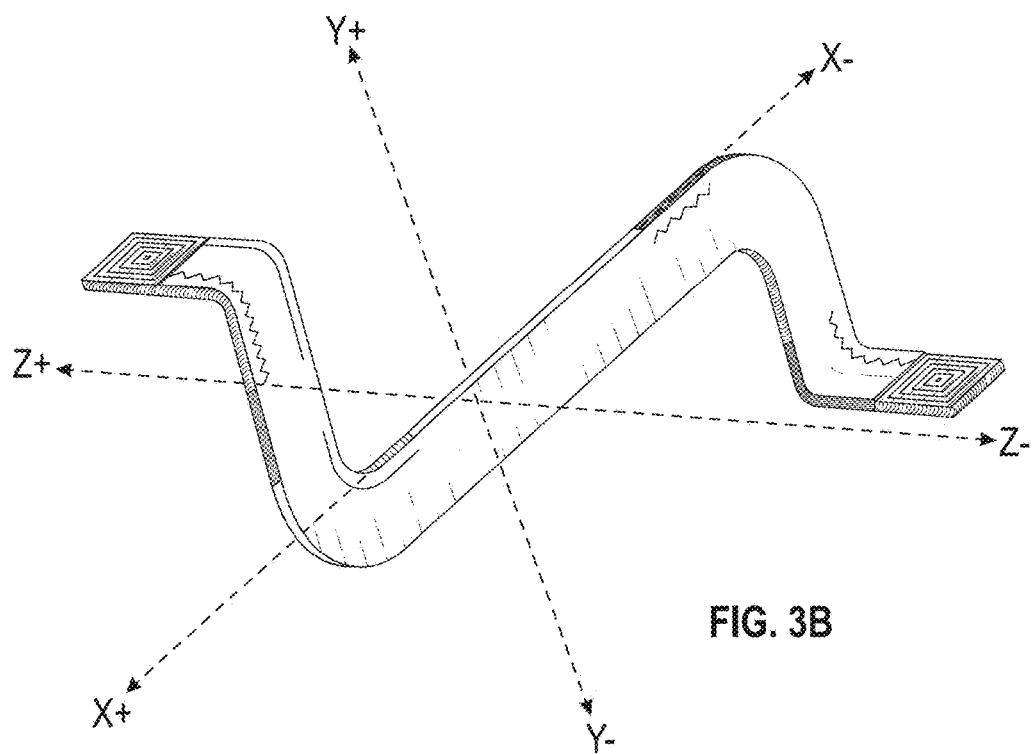
FIG. 3B is a perspective view of the inventive busbar and the three dimensional X, Y and Z Cartesian coordinate reference system, showing the busbar having two out-of-plane bends formed external to two in-plane bends formed in the intermediate portion of the busbar.

The term "in-plane" refers to a plane defined by the X and Z axes in a three dimensional Cartesian X, Y and Z coordinate system, as shown in FIGS. 3A-B. In this frame of reference, a longitudinal axis A-A of the busbar 100 is coplanar with the X-Y plane.

Accordingly, the term "in-plane bend" is a type of bend of the busbar that is oriented in the X-Y plane and that is oriented transversely to the longitudinal axis A-A. Accordingly, the portions of the busbar 1000 fore and aft of the bend are located in the X-Z plane. FIG. 1A shows a busbar 10 with two exemplary in-plane bends 1750 in the X-Y plane, which were formed in the fused segment 1220 of the intermediate portion 1200 of the inventive busbar 1000. FIG. 3B shows the busbar 1000 having two in-plane bends 1750 in the X-Y plane that are formed in the intermediate portion of the busbar 1000.

The term "out-of-plane" refers to a plane defined by the Y and Z axes in the three dimensional Cartesian X, Y and Z coordinate system shown in FIG. 3A. In this frame of reference, the longitudinal axis A-A of the busbar 100 is oriented perpendicular to the Y-Z plane.

Thus, the term "out-of-plane bend" is a type of bend of the busbar that is oriented in the Y-Z plane and that is oriented transversely, and potentially perpendicular, to longitudinal axis A-A. Accordingly, one of a first portion of the busbar 1000 fore of the bend or a second portion of the busbar 100 aft of the bend is located in the Y-Z plane. FIG. 3B shows the busbar 1000 having two out-of-plane bends 1760 that are formed external to the two in-plane bends 1750 formed in the intermediate portion of the busbar 1000.

The term "high power" means (i) voltage between 20 volts to 600 volts regardless of current or (ii) at any current greater than or equal to 80 amps regardless of voltage.

The term "high current" means current greater than or equal to 80 amps regardless of voltage.

The term "high voltage" means a voltage between 20 volts to 600 volts regardless of current.

2) Overview of Conventional Busbars

Figure 1B:
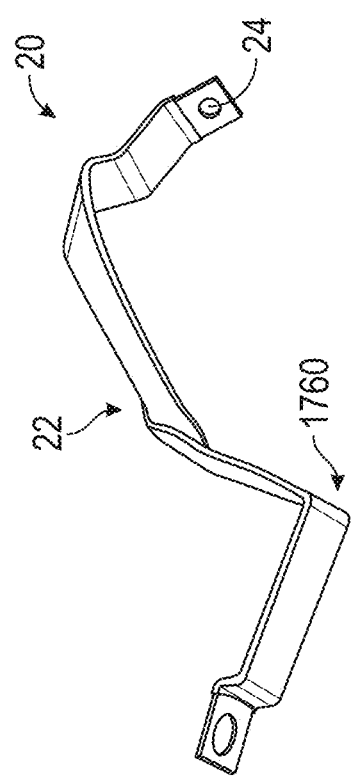
FIG. 1B is a conventional flexible busbar with a configuration having multiple out-of-plane bends.

A conventional rigid busbar 10 is shown in FIG. 1A and a conventional flexible busbar 20 is shown in FIG. 1B, wherein both of these conventional busbars 10, 20 suffer from numerous limitations. For example, conventional rigid busbars 10: (i) have high manufacturing costs, (ii) cannot effectively account for manufacturing tolerances, and (iii) cannot properly expand or contract during battery charging and discharging cycles. While conventional flexible busbars 20 address some of the problems associated with conventional rigid busbars 10, flexible busbars 20 have their own significant limitations. For example, conventional flexible busbars 20: (i) cannot be easily connected to other objects, (ii) can be expensive to fabricate, and (iii) cannot maintain an out-of-plane bends without creating large gaps (e.g., delamination) between the conductors contained in the flexible busbar 20, which causes electrical problems such as reduced current flow in the busbar 20. In order to achieve the configuration of an out-of-plane bend using a flexible busbar 20, the flexible busbar 20 is folded 22 in a manner that causes a first extent of the busbar 20 to overlap with a second extent of the busbar 20 (see FIG. 1B). This folded configuration causes problems, such as increased height required for the busbar 20 (which may not be available due to the environment in which the busbar 20 is installed) and the geometry of the fold limits the current flow of the busbar 20. Additionally, even out-of-plane bends can cause an increase in the resistance of the busbar 20, which may lead to hot spots in the insulation and even failure of the busbar 20. Further, the edges of the flexible busbar 20 tear into or wear away the external insulation; thereby leading to the failure of the entire busbar 20. To solve some of these issues, companies have attempted to join distinct flexible busbars with distinct rigid busbars. The cobbling together of these two separate types of busbars is expensive, time consuming, their junction regions are prone to extremely high failure rates, and a substantial amount of material is wasted in attempting to form these kluged together busbars.

Figure 2A:
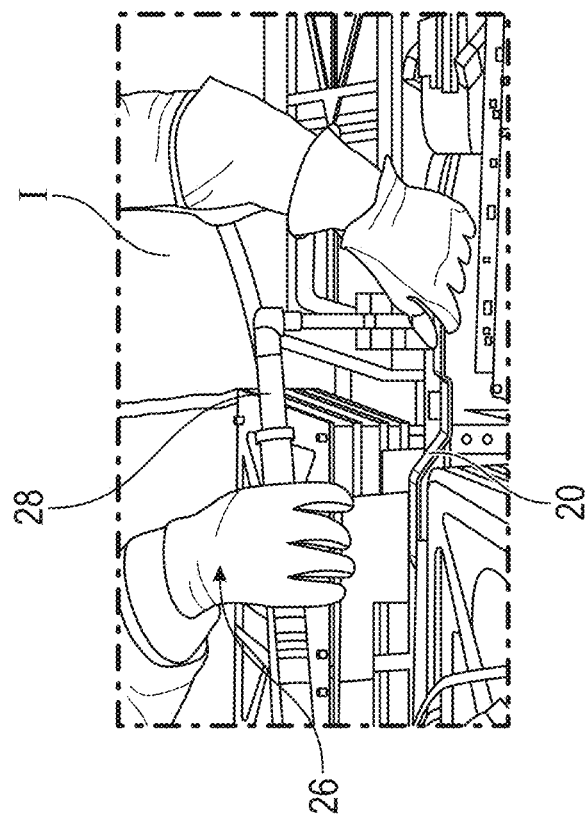
FIGS. 2A and 2B show the installation of a conventional busbar to a component in an application, such as an automotive vehicle.
Figure 2B:
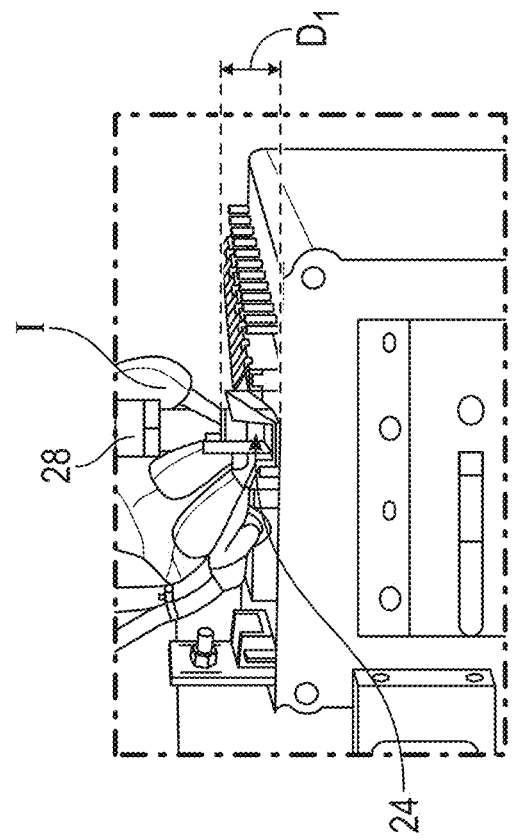

Furthermore, conventional busbars 10, 20 that are connected to components using conventional connectors 24 also suffer from a number of problems. For example, conventional busbars 10, 20 and connectors 24 suffer from: (i) time consuming installation, (ii) requiring a high level of skill and dexterity to perform the installation, (iii) high number of safety concerns, (iv) may require disassembly of the entire battery pack, if a conventional connector is dropped or misplaced in the pack during the installation process, (v) subject to high failure rates, (vi) requires multiple people to confirm that a single installation has been properly performed, and (vii) requires a substantial amount of space and weight. As shown in FIGS. 2A and 2B, a number of safety concerns exist when an installer, I, is working over an open battery pack. To mitigate some of these concerns, the installer I wears thick protective gloves 26 and utilizes custom designed tools 28. The custom designed tools 28 are expensive to obtain and the thick protective gloves 26 requires that the installer I have a high level of skill and dexterity to ensure that the conventional connector 24 is not accidently dropped in the battery pack or the surrounding environment. If a mishap like this occurs, then the installation process needs to be halted and the entire battery pack must be disassembled in order to find the misplaced conventional connector 24. Even assuming that the installation goes as planned, a second person (other than the installer I) is typically required to check the torque of the conventional connectors 24 and apply a marking or indicia to show that such the requisite check was made. Because the conformation of the connection is done by hand, the manufacturing company may not have a digital record showing when and if the conventional connector was properly connected.

3) Design and Fabrication of the Inventive Busbar

The inventive busbar 1000 disclosed herein overcomes a number of the limitations disclosed above while meeting automotive, military, marine and aviation performance, production and reliability requirements. In particular, the busbar 1000 includes a plurality of laminates or conductors 1090 arranged to provide two opposed end portions 1700 and an intermediate portion 1200, wherein each of the laminates or conductors 1090 has a plurality of intermediate extents that traverse or span the intermediate portion 1200. The intermediate portion 1200 includes at least: (i) an unfused segment 1210, and (ii) a fused segment 1220. First, integrally forming fused and unfused segments 1210, 1220 in a single busbar 1000 allows the busbar 1000 to combine the best features of conventional rigid busbars 10 and conventional flexible busbars 20 into a single unit, while limiting the negative features associated with these conventional busbars 10, 20. For example, the unfused segments 1210 are flexible which allows the busbar 1000 to: (i) adjust for manufacturing tolerances, (ii) expand and contract during thermal expansion and contraction events, such as battery charging and battery discharging cycles, and (iii) help absorb vibrations caused by the operating environment (e.g., under the hood of a vehicle) that the busbar 1000 is installed in, instead of transferring these vibrations into other components operatively associated with the busbar 1000. Additionally, the fused segments 1220 of the busbar 1000 are stiffer (e.g., increased its Young's modulus in $N/m^2$) which allows the busbar 1000 to be accurately bent both out-of-plane and in-plane and maintain these bends over time without causing the conductors 1090 to delaminate and thus reduce current flow in the busbar 1000. This attribute of the busbar 1000 is beneficial because: (i) it reduces the overall dimensions, such as its height, of the busbar 1000 and (ii) does not limit the current flow through the fused segments 1220, which in turn allows the busbar 1000 to carry more current without creating hot spots or causing a substantial rise in temperature. Further, the edges of the busbar 1000 can be modified to reduce the probability that the conductors 1090 in the busbar 1000 tear into or wear away the surrounding insulation. Moreover, the high cost, extremely high failure rates and material waste associated with the cobbled together conventional busbars are eliminated by integrally forming the fused and unfused segments 1210, 1220 into a single busbar 1000. Finally, the inclusion of fused and unfused segments 1210, 1220 allows the busbar 1000 to be: (i) formed without custom molds and (ii) shipped to a customer in a substantially flat configuration, which reduces packaging, handling, and shipping costs and also reduces the chance the busbar 1000 may be damaged, either in transit or while being handled, prior to being installed in a component, device or vehicle.

The inventive busbar 1000 can utilize either conventional connectors 24 or a boltless connector system 2000. The boltless connector system 2000 does not utilize bolts, screws, fasteners, or the like to connect at least an extent of a busbar 1000 between: (i) power sources (e.g., alternator or battery), (ii) a power source and a power distribution/control component, or (iii) a power source and a device (e.g., radiator fan, heated seat, power distribution component, or another current drawing component). This boltless connector system 2000 and its features are described in at least PCT/US18/19787, PCT/US19/36010, PCT/US19/36070, PCT/US19/36127, PCT/US21/43788, PCT/US21/47180, PCT/US20/13757, PCT/US21/43686, PCT/US20/49870, PCT/US21/33446, PCT/US20/14484, and PCT/US21/57959, which are incorporated by reference, and overcomes a number of the limitations related to conventional busbar connectors 24. For example, the boltless connector system 2000 only requires a single person to connect the male connector assembly 2200 into the female connector assembly 2600, hear an audible signal (e.g., a "click"), tug on the connector assemblies 2200, 2600 to ensure they are properly coupled together, and read an extent of the system (push, click, tug, read—"PCTR" compliant). In other words, the busbar 1000 can be coupled to another component or device without the use of a separate tool, which reduces safety concerns, reduces assembly and handling times, and does not require a high level of skill and dexterity required to install a conventional busbar connector 24. Manufacturing times remain consistent because there are no loose parts that may be lost in the battery pack or surrounding environment. Furthermore, labor costs are better managed and reduced because handling and installation of the busbar 1000: (i) only requires one person a shorter amount of time to install the busbar 1000, (ii) requires less space (e.g., the conventional connector height ($D_1$ shown in FIG. 2B) is reduced from approximately 40 mm to 16 mm), and (iii) is easier because the busbar 1000 is approximately 50% lighter than conventional busbars 10, 20.

In addition to being utilized in a vehicle battery pack, the busbar 1000 may be used to provide mechanical and electrical connection in other electrical systems that are found in an airplane, a motor vehicle, a military vehicle (e.g., tank, personnel carrier, heavy-duty truck, and troop transporter), a bus, a locomotive, a tractor, a boat, a submarine, a battery pack, a volt system that has more than 24 volts, power storage system, in a high-power application, in a high-current application, in a high-voltage application, or in another application where busbars 1000 are essential to meet industry standards and production requirements.

A. Designing the Inventive Busbar

Figure 4:
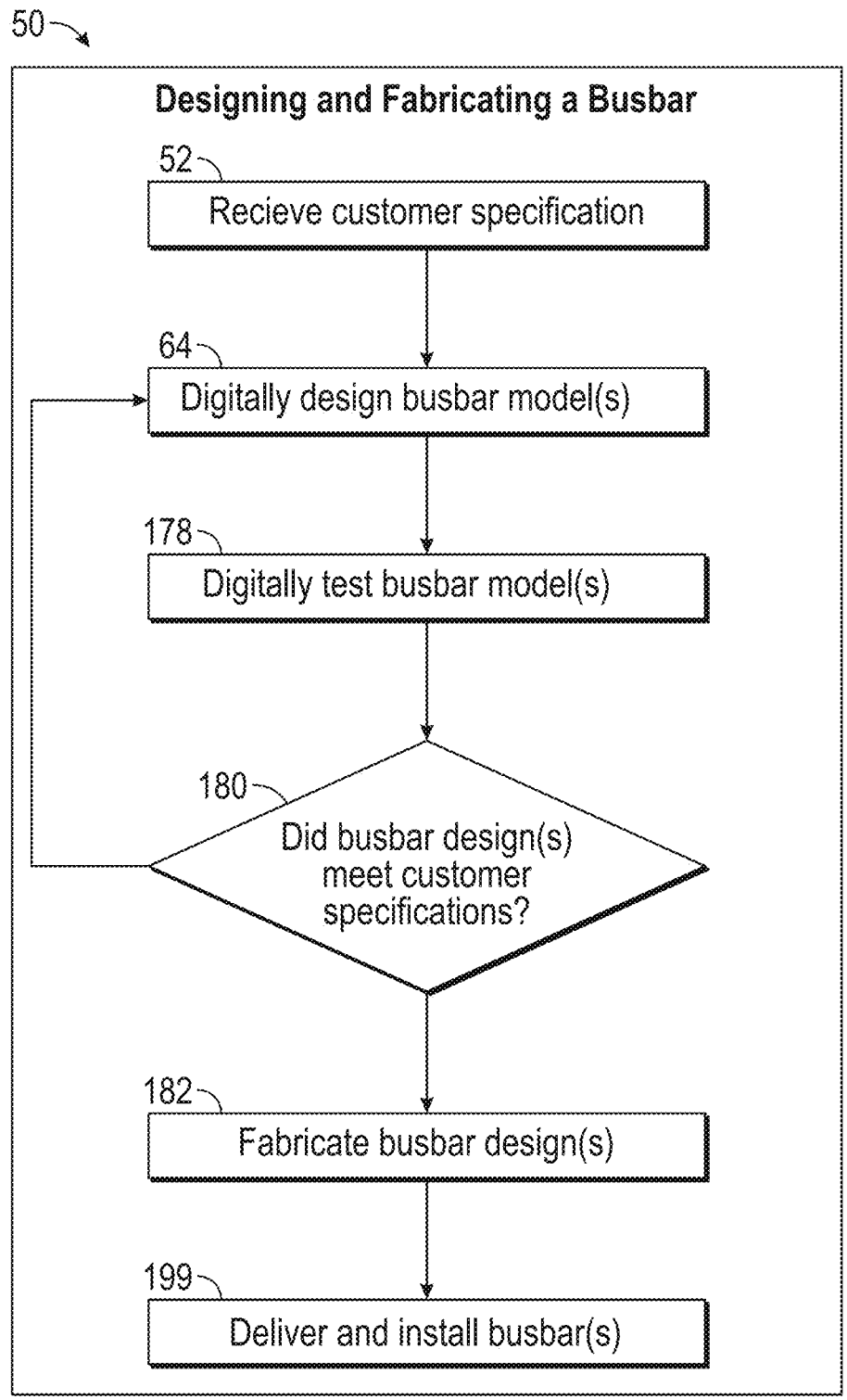
FIG. 4 is a flowchart showing the steps for creating the inventive busbar.
Figure 5:
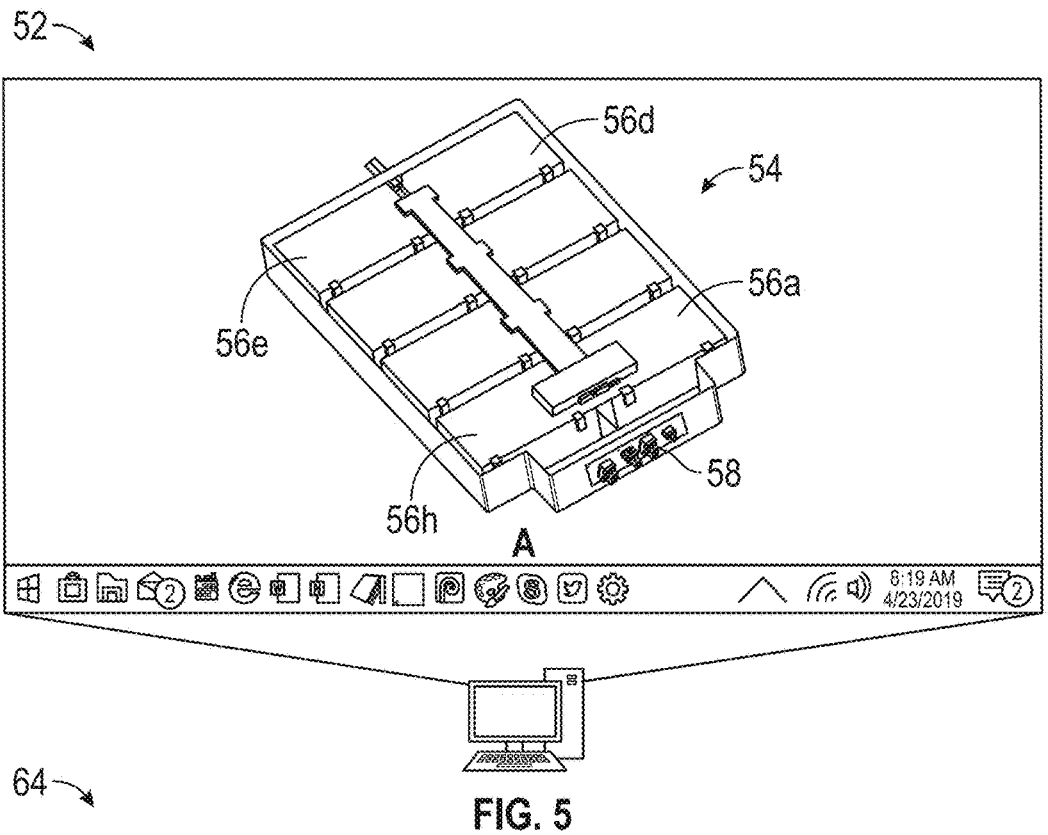
FIG. 5 shows a digital request from a customer for a plurality of busbars to be installed in a battery pack, wherein the specifications and requirements for said busbars are included in the customer's request.

Designing and fabricating a busbar 1000 is a multi-step process 50 that is described at a high level in connection with FIG. 4. As shown in FIG. 4, this multi-step process 50 starts by receiving specifications from the customer in step 52. These customer specifications may include a multitude of different requirements, including but not limited to: (i) current carrying capacity, (ii) geometry constraints, (iii) material and/or chemical constrains, (iv) manufacturing repeatability, (v) durability, (vic) compliance with standard setting bodies, (vii) environmental constraints, (viii) manufacturing requirements, (ix) handling and/or installment rigidity requirements, and (x) other requirements. The customer specifications may be sent to the busbar designer in any manner and the specifications may take any form including data sheets and CAD models. For example, FIG. 5 shows an example of a portion of the customer specifications that were received in step 52. Specifically, FIG. 5 shows a digital 3D CAD model of a battery pack 54 that includes eight battery modules 56a-56h. The customer is requesting busbars 1000 that can: (i) mechanically and electrically couple the external battery pack connectors 58 to the battery modules 56a-56h and (ii) couple the battery models 56a-56h to one another. Once the customer specifications are received, the busbar designer can take the specifications and move on to step 64 of this multi-step process 50.

Figure 6:
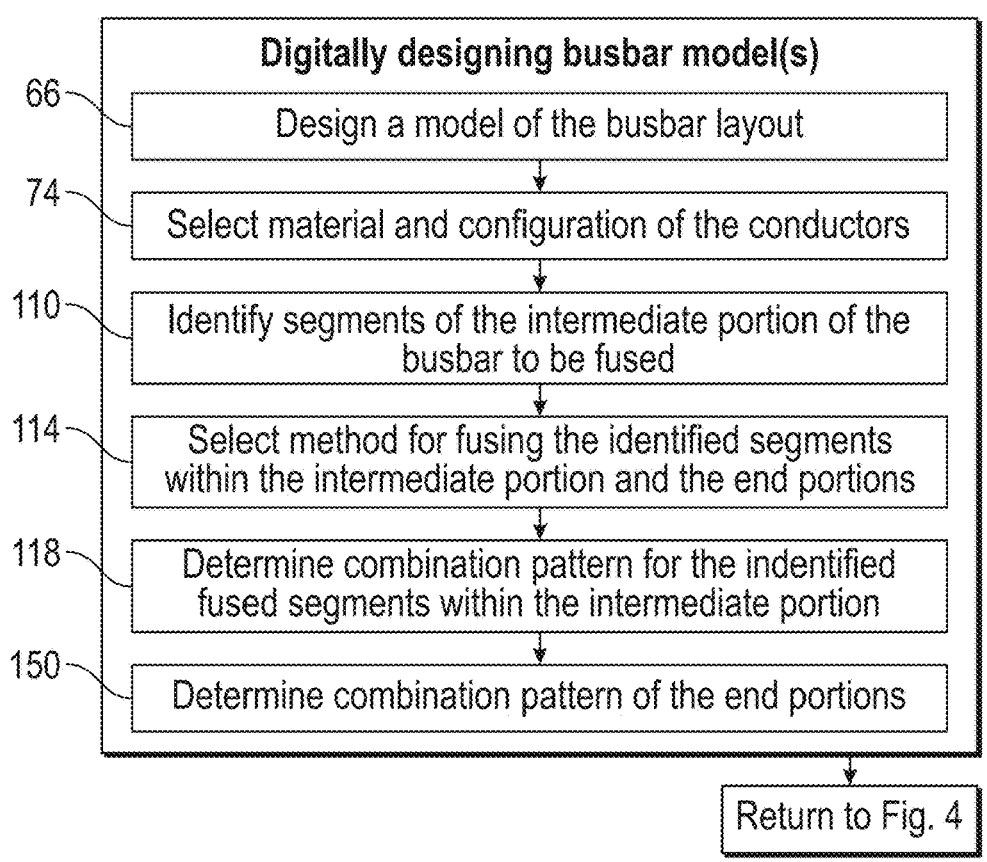
FIG. 6 is a flowchart showing the steps for digitally designing the busbar models.
Figure 7:
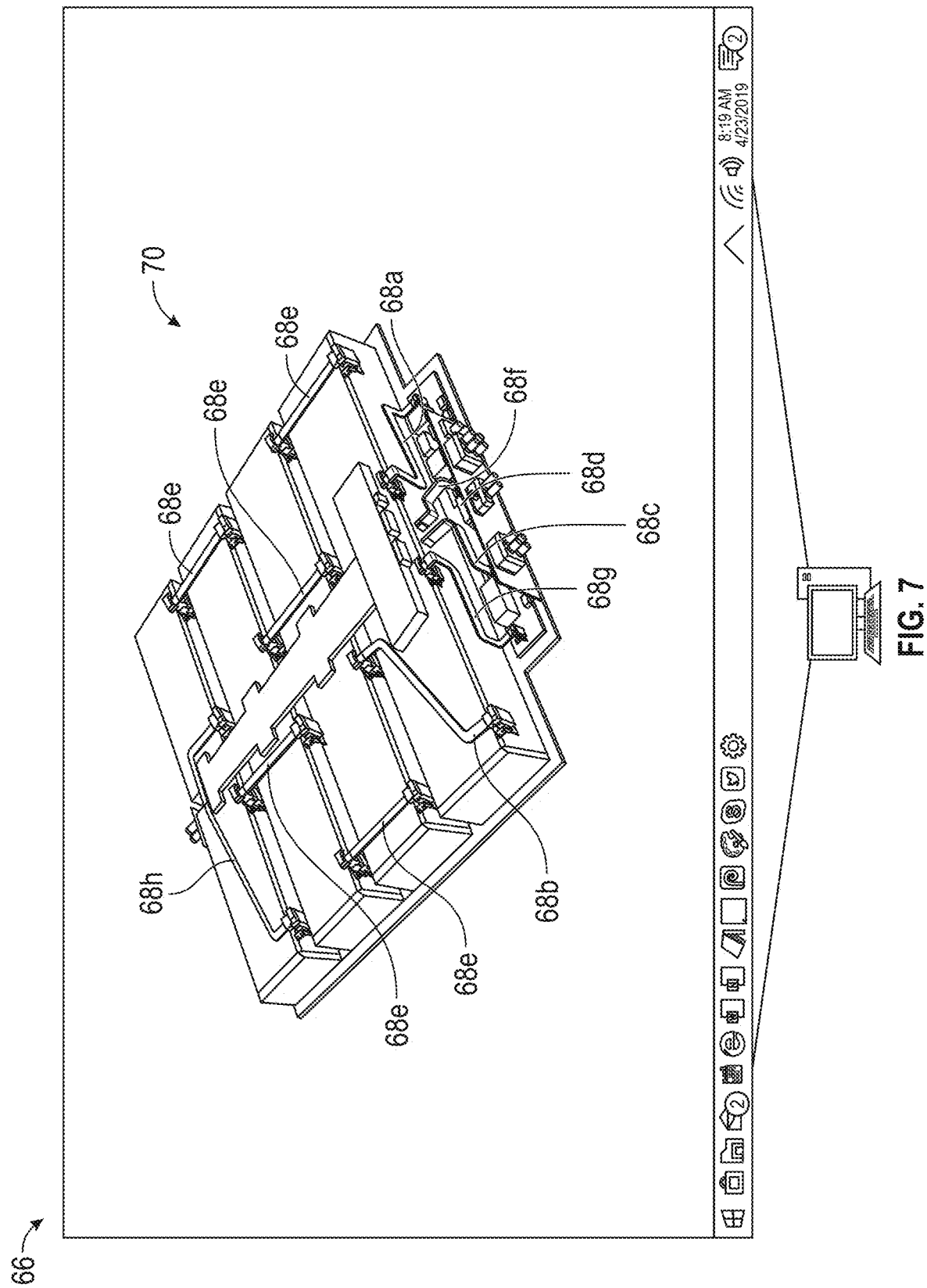
FIG. 7 shows a computer generated model with a layout of busbars that meet the customer's device specifications and requirements.
Figure 8B:
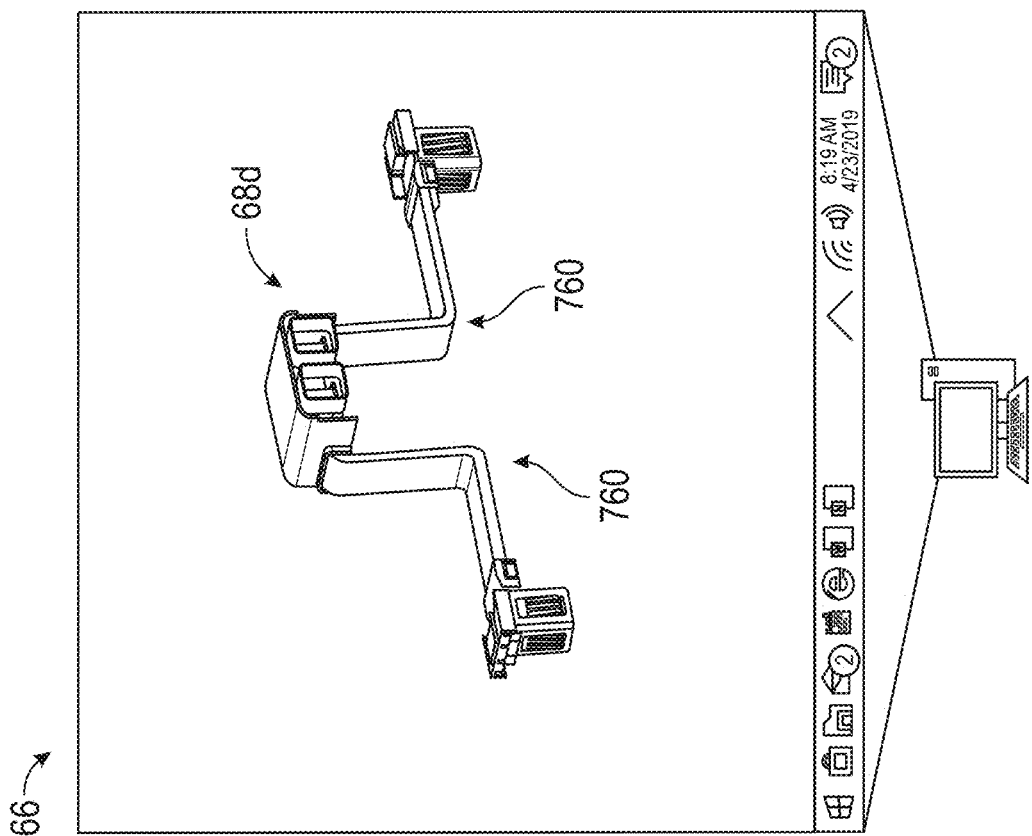
Figure 8A:
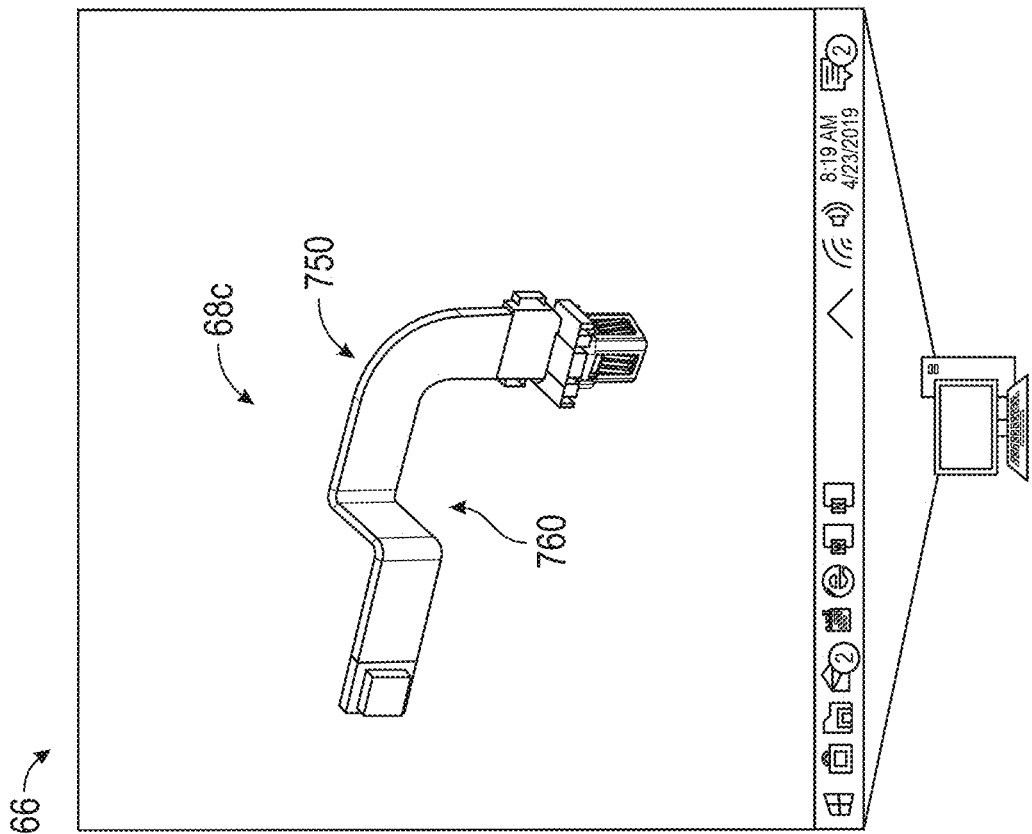
Figure 8D:
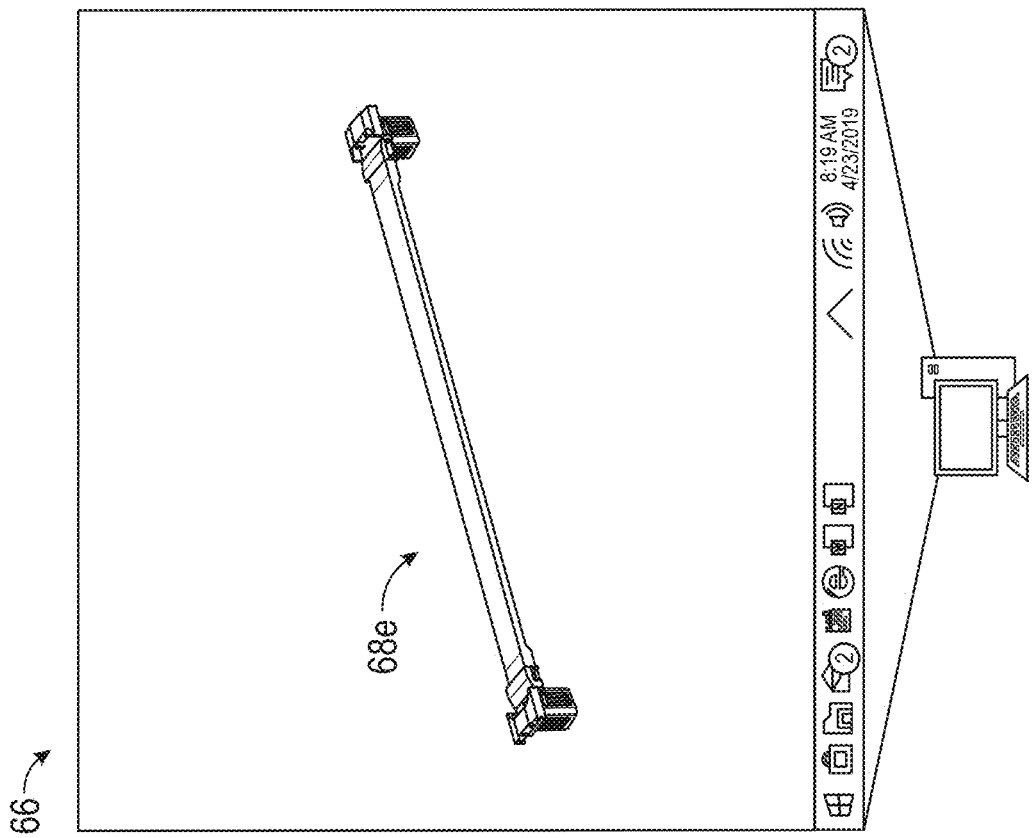
Figure 8C:
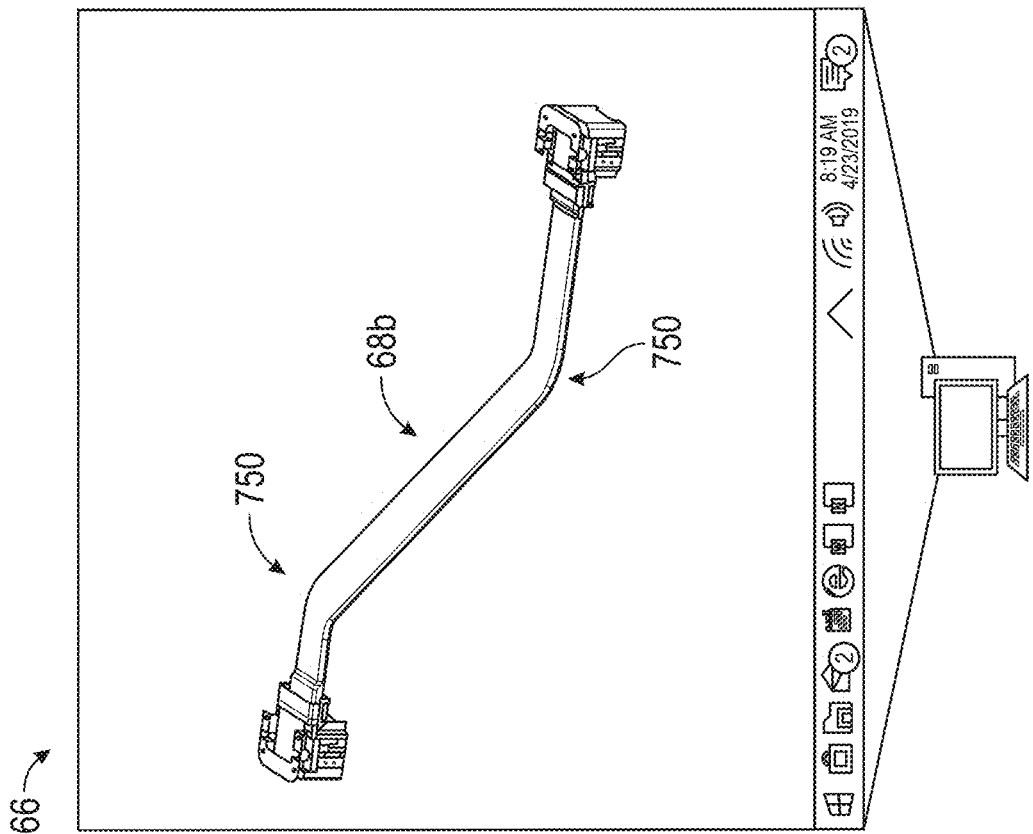

The next step in the multi-step process 50 of designing and manufacturing a busbar 1000 is step 64 (see FIG. 6), which entails digitally designing engineering busbar models 100 that meet the customer specifications that were received in step 52. In designing these engineering busbar models 100, it may be desirable to understand how electricity will be routed in the customer's application, product, component, or device. In particular, it may be desirable to gain an understanding of how busbars will route the electricity in the application, product, component, or device to enable the busbar designer to create engineering busbar models 100 that: (i) meets the customer's specifications, (ii) minimizes the length and weight of the busbar, (iii) allows for proper electrical and mechanical connections, (iv) minimizes the height required for the busbar, and (v) minimizes overlapping busbars. To gain this understanding, the designer may create a model of the busbar layout 70 in the application, product, component, or device (step 66). An example of a model of this busbar layout 70 is shown in FIG. 7. In particular, FIG. 7 shows eight different non-engineering busbar models 68a-68h that may be used in the customer's application, product, component, or device shown in FIG. 5. FIGS. 8A-8E show isolated views of a few of these non-engineering busbar models 68a-68e. While these non-engineering models 68a-68h are not suitable for manufacturing purposes, they provide the general overall geometry of the busbar. The next steps described herein will work to turn these non-engineering models 68a-68h into engineering models 100 that can be manufactured.

Figure 9:
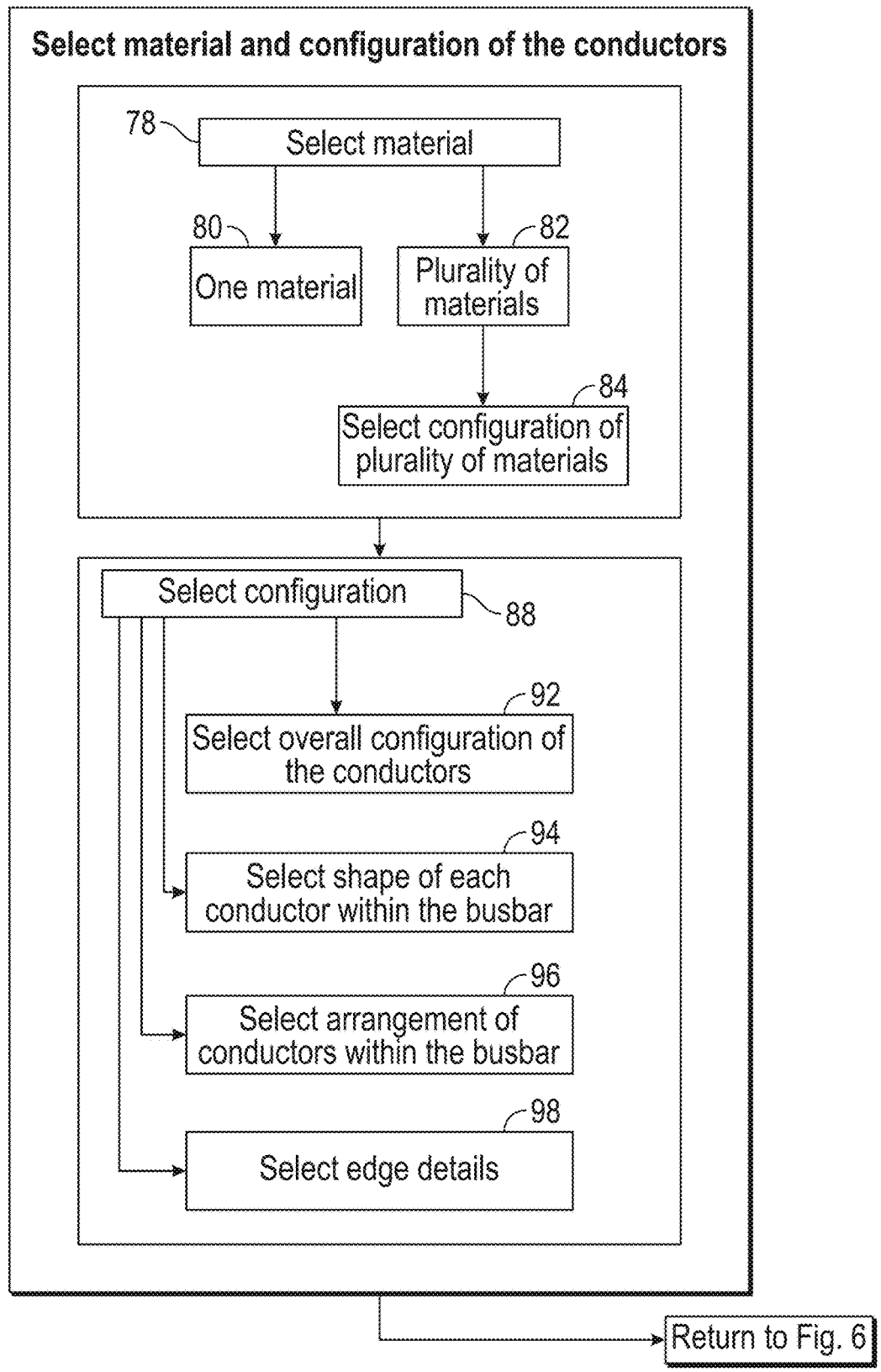
FIG. 9 is a flowchart showing the steps for selecting the material(s) and configuration of the conductors in the busbar based on the selected busbar design.
Figure 10B:
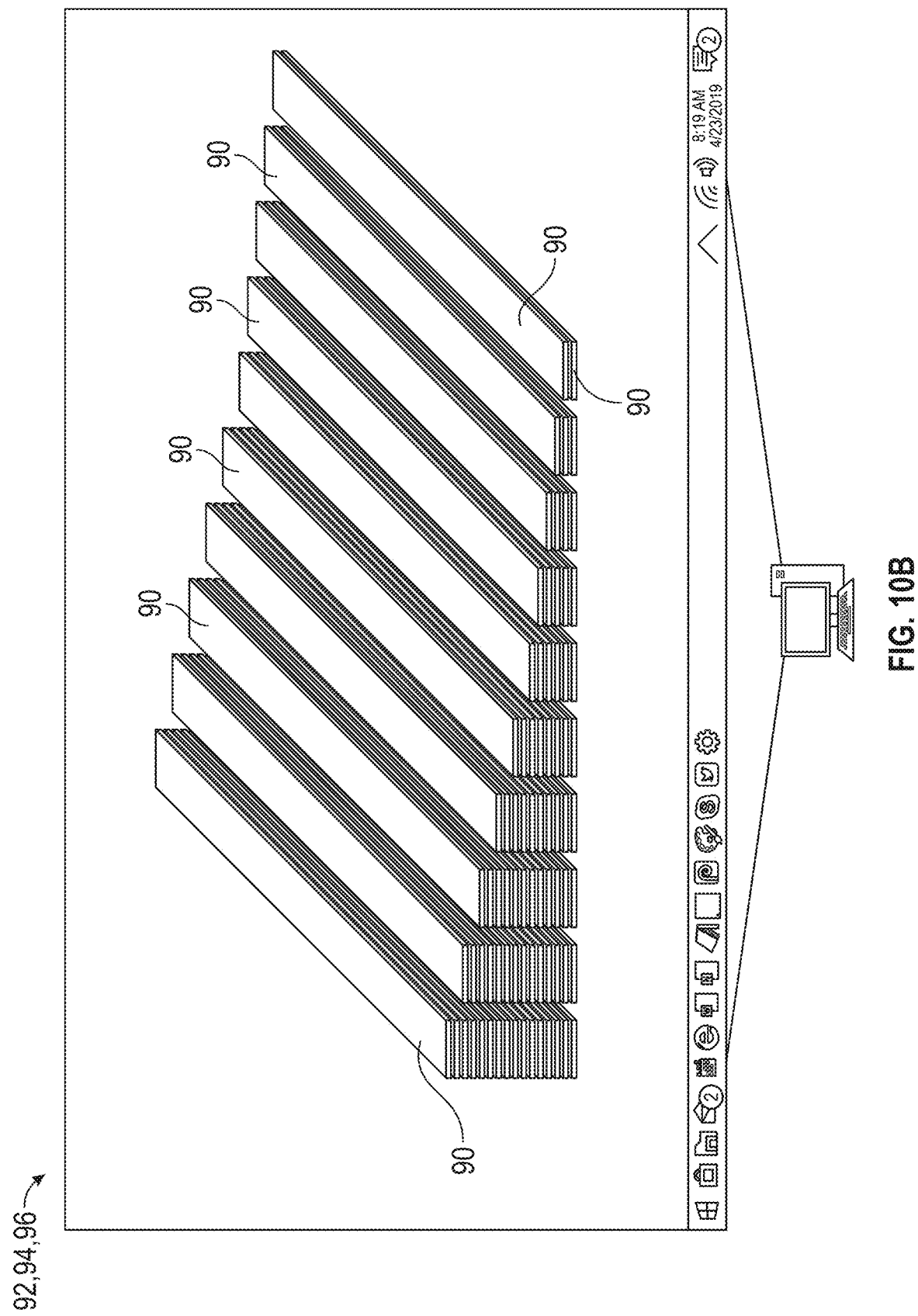
Figure 11C:
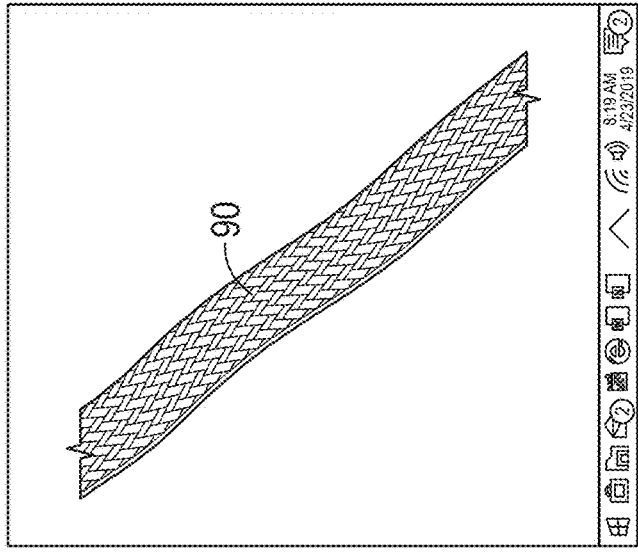
Figure 11D:
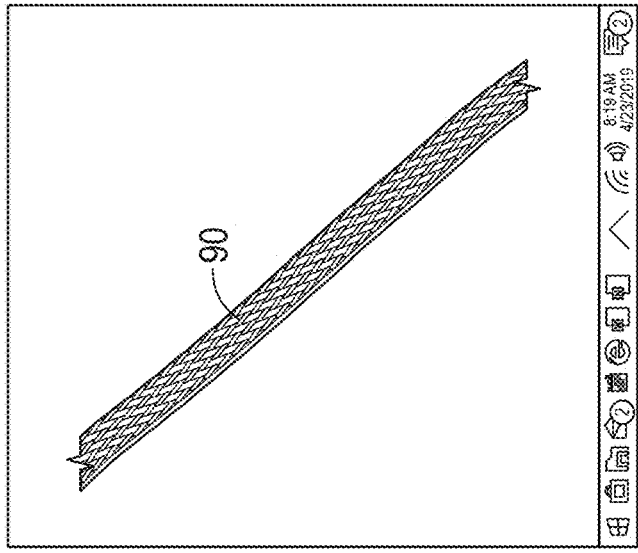
Figure 11E:
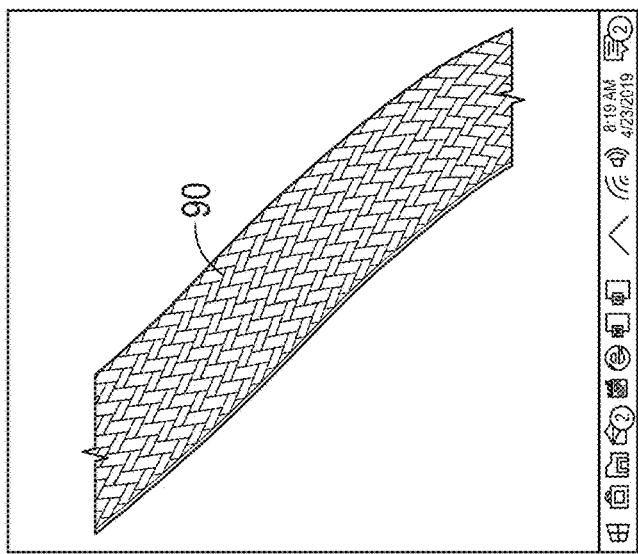
Figure 12A:
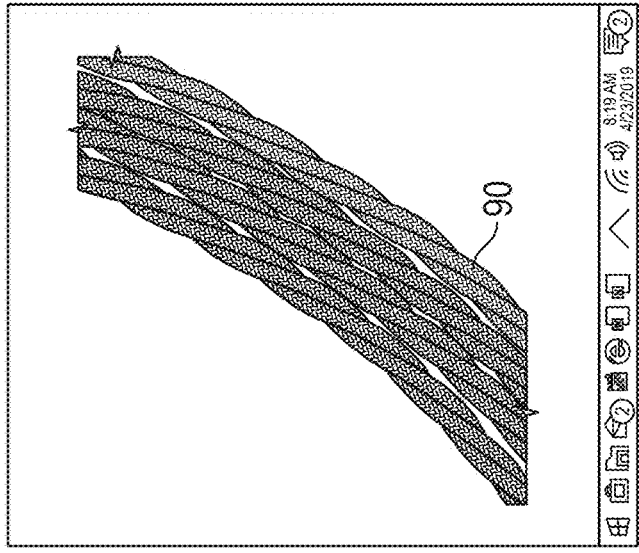
FIGS. 12A-12F show a plurality of different conductor configurations that may be selected during the busbar design process, wherein the conductors vary in width, diameter, layout, shape, orientation, and number.
Figure 12B:
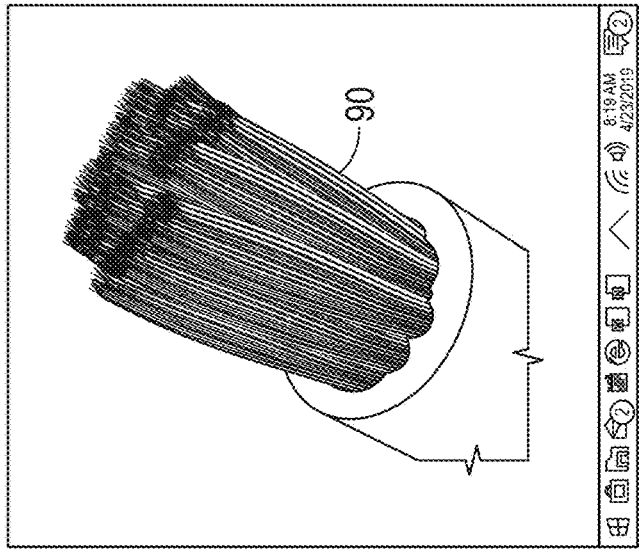
Figure 12C:
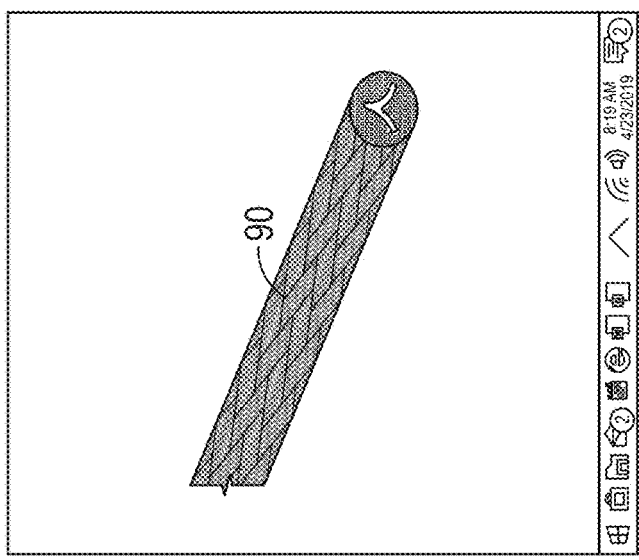
Figure 12D:
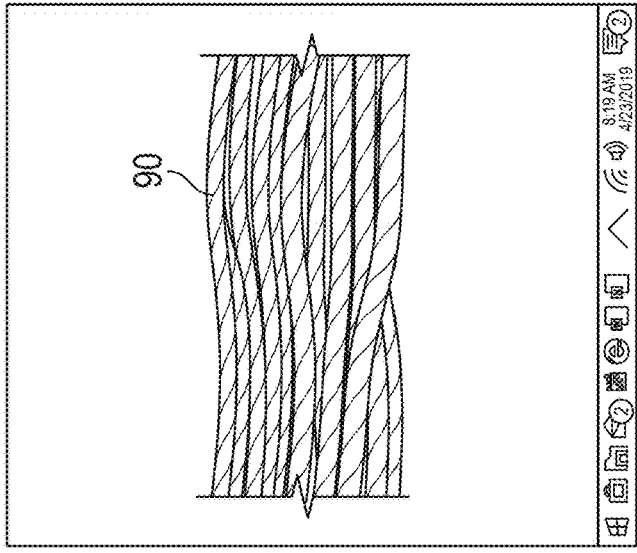
Figure 12E:
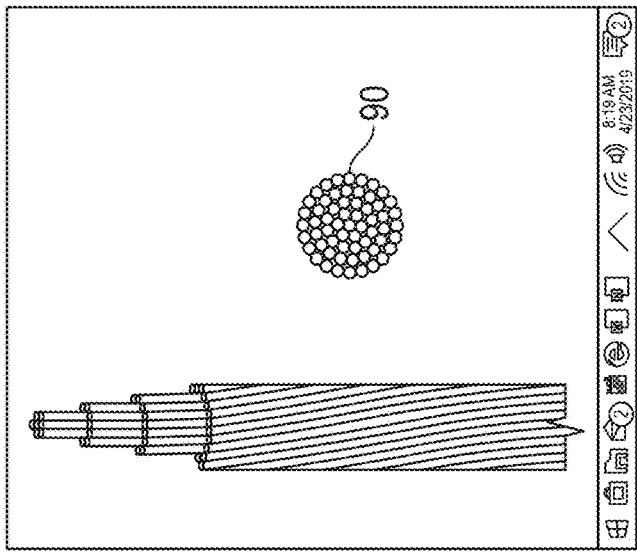
Figure 12F:
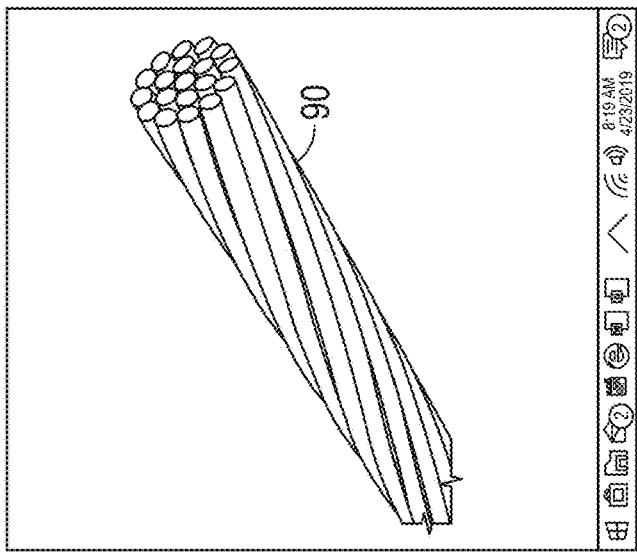

Returning to FIG. 6, the next step in digitally designing the engineering busbar models 100 is selecting the material and configuration of the laminates or conductors 90 contained in the busbar model 100 (step 74). Specifically, process of step 74 is described in greater detail in FIG. 9. With the non-engineering model in hand 68a-68h, the busbar designer can select the materials that will be used in the engineering busbar model 100 (step 78). As shown in FIG. 9, the busbar designer may choose to make the busbar model 100 from a single material in step 80. Such materials may include, but are not limited to, stainless steel, nickel, aluminum, silver, gold, copper, steel, zinc, brass, bronze, iron, platinum, lead, molybdenum, calcium, tungsten, lithium, tin, a combination of the listed materials, or other similar metals. For example, the busbar designer may choose to utilize C10200 copper alloy in connection with non-engineering busbar model 68a, 68b. This copper alloy has an electrical conductivity of more than 80% of IACS (International Annealed Copper Standard, i.e., the empirically derived standard value for the electrical conductivity of commercially available copper), is reported, per ASTM B747 standard, to have a modulus of elasticity (Young's modulus) of approximately 115-125 gigapascals (GPa) at room temperature and a coefficient of thermal expansion (CTE) of 17.6 ppm/degree Celsius (from 20-300 degrees Celsius) and 17.0 ppm/degree Celsius (from 20-200 degrees Celsius). Alternatively, the busbar designer may choose to use a plurality of materials in step 82. If the busbar designer makes this selection, then the designer must select the configuration of the materials in step 84. For example, the busbar designer may choose to alternate materials in the busbar model 100 or may interweave two different materials in the busbar model 100. More specifically, the model 100 may include alternating layers of copper and aluminum or may include a plated conductor (FIG. 10A) 90, which includes an aluminum core and a copper plating. It should be understood that the above materials and configurations of materials are only examples and other similar materials and configurations are contemplated by this disclosure.

Once the materials and their configuration are selected in step 78, the busbar design can then select the configuration of the laminates or conductors 90 in step 88. Step 88 is comprised of multiple sub-steps, which are shown in FIG. 9. One of these sub-steps included in step 88 requires the selection of the overall configuration of the conductors 90 in step 92. Non-limiting examples of configurations that the designer may select include: (i) a vertical stack or laminated stack (see FIG. 10B), (ii) a woven, knitted or braided pattern (see FIG. 11C-11I), or (iii) other configurations (see FIGS. 12A-12F). In addition, the selection of the overall configuration of the conductors 90 in step 92 includes selecting the number of conductors 90 that are contained in the busbar model 100. In making this selection, the busbar designer may keep the number of conductors 90 consistent throughout the busbar model 100 or may vary the number of conductors 90 contained in the model 100. For example, the designer may choose to increase the number of conductors 90 near the end portion or may decrease the number of conductors 90 in an intermediate portion of the busbar model 100. It should be understood that the exemplary non-engineering busbar models 68a, 68b may utilize a laminated stack of ten conductors 90, wherein the number of conductors 90 does not vary across the length of the busbar model 100.

Another sub-step in step 88 requires selecting the shape of each conductor 90 in the busbar model 100 in step 94. Exemplary shapes include, but are not limited to, rectangular prism or bar (see FIG. 10A), a "U-shaped" plate (see FIG. 11A-11B), cylinder, a pentagonal prism, a hexagonal prism, octagonal prism, a cone, a tetrahedron, or any other similar shape. In making this selection, the busbar designer may keep the shape of conductors 90 consistent throughout the busbar model 100 or may vary the shape of conductors 90 contained in the model 100. Changes in the shape of the conductors 90 may be desirable to add mechanical strength or electrical current capacity in certain segments of the busbar model 100. It should be understood that the shape of the conductors 90 contained in the exemplary non-engineering busbar models 68a, 68b may be rectangular prisms or bars.

In addition, the selection of the shape of each conductor 90 in step 94 includes selecting the thickness of conductors 90 that are contained in the busbar model 100. In making this selection, the busbar designer may keep the thickness of conductors 90 consistent throughout the busbar model 100 or may vary the thickness of conductors 90 contained in the model 100. Changes in the thickness of the conductors 90 may be desirable to add mechanical strength or electrical current capacity in certain segments of the busbar model 100. Further, the selection of the shape of each conductor 90 in step 94 includes selecting whether the conductors 90 contained in the busbar model 100 have a solid, partially solid or a hollow configuration. It should be understood that the thickness and widths of the conductors may be decided by the designer based on cross sectional area and flexibility specification. For example, thinner laminates are more flexible, but take longer to cut, clean and stack, but its utilization can allow for the creation of a busbar that requires less than 10 Newtons to deflect.

Another sub-step in step 88 requires selecting the arrangement of the conductors 90 in the busbar model 100 in step 96. For example, the busbar designer may desire a specific circular configuration, shown in FIG. 12E, over another circular configuration, shown in FIG. 12F. When making the above selections, it may be desirable for the designer to ensure that: (i) the thickness of the conductors 90 is greater than 0.01 mm, and preferably between 0.1 mm and 10 mm, (ii) the width of the conductors 90 is greater than 1 mm, preferably between 5-100 mm and most preferably between 10 mm and 50 mm, and (iii) there are more than two conductors 90 in the busbar and preferably between 5 and 200 conductors 90. For example, the busbar model 100 can have: (i) ten conductors 90, (ii) the conductors 90 are solid, include copper (e.g., C10200), have a substantially constant thickness of 0.5 mm, and a width that is 20 mm, (iii) has a total thickness that is 5 mm, (iv) has a total width that is 20 mm. It should be understood that the above described configurations, shapes, arrangements, and edge details are only examples of possible selections and other similar configurations, shapes, arrangements, and edge details are contemplated by this disclosure.

Figure 13:
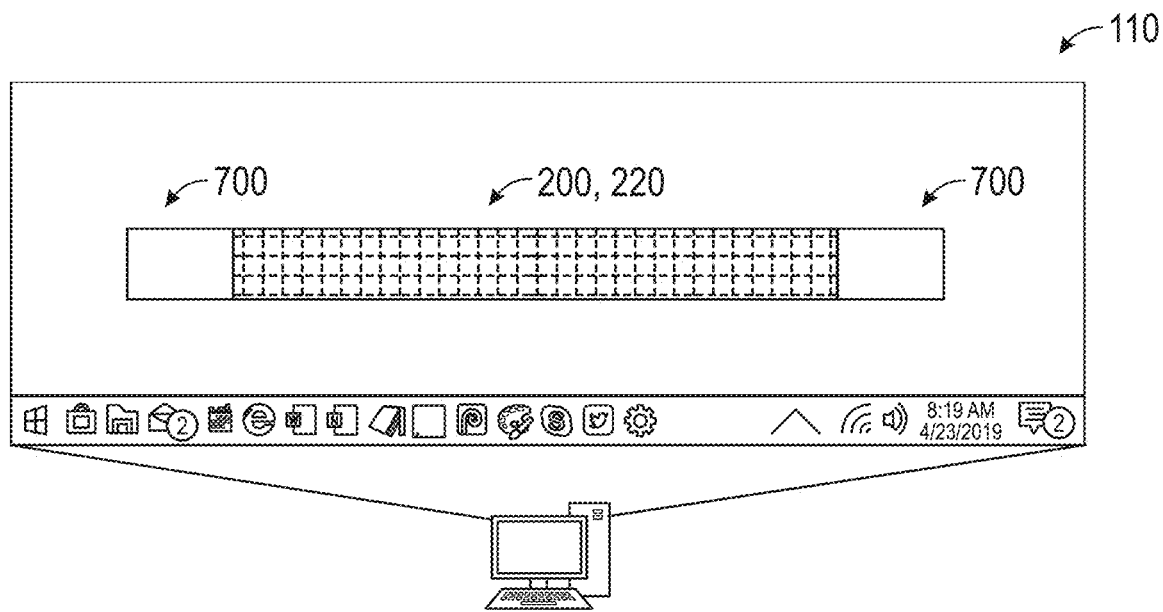
FIG. 13 show a busbar model having a busbar fusion pattern, wherein the intermediate fusion pattern of the of the busbar fusion pattern includes a single consistent segment.
Figure 14:
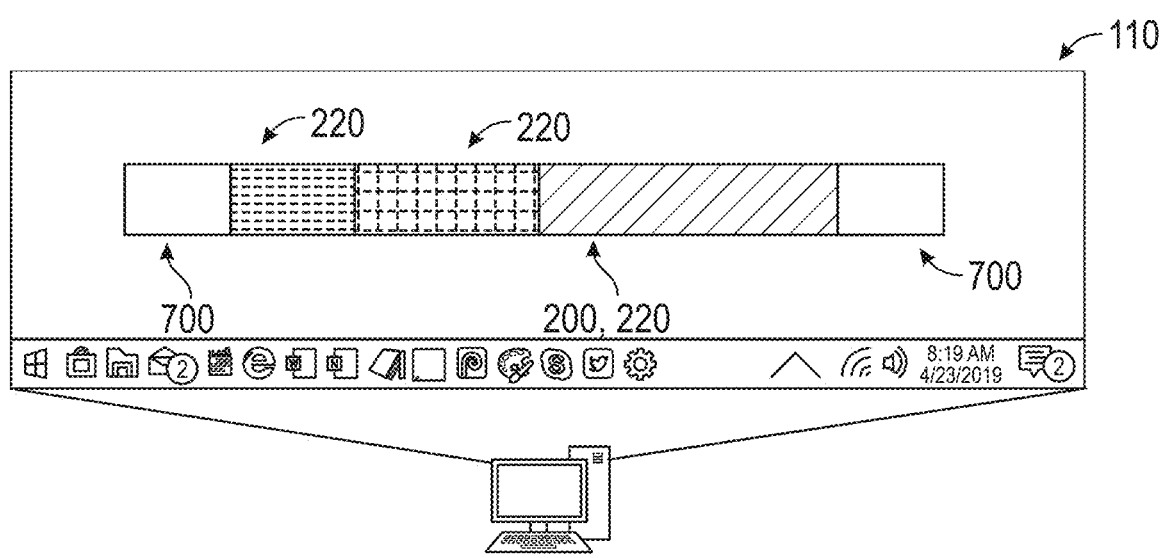
FIG. 14 show a busbar model having a busbar fusion pattern, wherein the intermediate fusion pattern of the of the busbar fusion pattern includes three different segments.

Returning to FIG. 6, once the materials and configuration of the conductors 90 is selected in step 74, then the busbar designer can identify segments 220 of the intermediate portion 200 of the busbar 100 to be fused in step 110. In turn by identifying the segments 220 of the intermediate portion 200 of the busbar 100 that are to be fused, the design is also identifying the segments 210 of the busbar 100 that are to be left unfused. The designer will identify these segments 220 based upon a number of factors, which may include: (i) width of the busbar, (ii) the geometry of the bend (e.g., in-plane 750 or out-of-plane 760) contained in the busbar, (iii) the number of conductors 90 contained, (iv) thickness of the conductors 90, (v) material properties of the conductors 90, (vi) fusion type or method, (vii) commercial throughput of the machine performing the fusion, (viii) total number of bends contained in the busbar, (ix) spacing of the bends in the busbar, (x) other customer specifications, and (xi) other factors that are obvious to one of skill in the art based upon the above list of factors. Once the designer has analyzed some or all of the above factors, the designer can determine whether the intermediate portion 200 of the busbar model 100 should contain: (i) no fused segments 220 and only unfused segments 210, (ii) only one fused segment 220 (see FIG. 13), or (iii) contain multiple fused segments 220 (see FIG. 14-18). It should be understood that a fused segment 220 is less flexible, more rigid, or more stiff then an unfused segment 210.

The following are non-limiting examples of how the unfused segments 210 and fused segments 220 may be selected and arranged in a busbar 100. In one example, the intermediate portion 200 may not include any fused segments 220, if: (i) the busbar 100 does not contain any bends (see 68e in FIG. 8D), (ii) the bends contained in the busbar 100 have a wide bend radius, or (iii) the designer determines that the busbar 100 does not need to include such segments. If the busbar designer determines that the busbar model 100 does not need to contain any fused segments 220, then the designer can move onto the next step in this process. In a second example, the intermediate portion 200 may only include one fused segment 220 (shown in FIG. 13), if: (i) the busbar 100 only contains a single bend, (ii) if the overall length of the busbar 100 is short (e.g., less than 8 inches) and the busbar 100 includes multiple bends, (iii) if the overall length of the busbar 100 is not long (e.g., greater than 3 feet) and the busbar 100 only contains a single bend type (e.g., in-plane 750 or out-of-plane 760) or (iv) the designer determines that the busbar 100 only needs to include this single segment. One of the primary reasons that a designer may choose to use only a single fused segment 220 is because the variance in manufacturing times between using a single segment and multiple segments does not justify trying to create multiple segments. Once it has been determined that the busbar 100 should include one fused segment 220, the busbar designer must determine the general properties of that segment 220. These general properties are based on the designer's analysis of the some or all of the factors described above.

Alternatively, if the busbar model 100 contains non-bent extents, out-of-plane bends 760, and in-plane bends 750, then the designer may choose to utilize multiple fused segments 220. This may be desirable because the designer can vary the properties of each fused segment 220, which in turn provides the welds that are necessary for certain extents of the busbar 100 but does not require that the entire busbar 100 be welded at a frequency that is only adapted to the bend that requires the most force. Selectively varying of the properties of the segments in the busbar improves manufacturing times and eliminates the possibility of over welding the busbar 100. Once it has been determined that the busbar should include multiple segment 220 in the busbar, the busbar designer must determine the location and general properties of each segment 220 contained in the busbar 100.

Various examples 250, 254, 258, 262 of busbar models 100 that contain multiple fused segments 220 are shown in FIGS. 15-18. For example, the designer may choose to utilize the busbar design 254 shown in FIG. 16 in order to build the busbar 100 shown in the non-engineering busbar model 68b shown in FIG. 8C. The intermediate portion 200 of the non-engineering busbar model 68b can include: (i) four bend sections 1580, (ii) one handling section 1540, and (iii) two flexible section 1500. To form these sections 1580, 1540, 1500, six different general busbar properties 254a-254f are determined based upon: (i) stiffness, (ii) ductility, (iii) flexibility, (iv) flexural modulus, (v) reslilience, or (vi) other similar properties. Accordingly, this example layout for the non-engineering busbar model 68b will contain: (i) two end portions 700 (i.e., a first end portion 702a and a second end portion 702b) and (ii) an intermediate portion 200. The intermediate portion 200 includes: (i) six fused segments 220, wherein the fused segments 255a-255f have different general properties 254a-254f and (ii) one unfused segment 255g that has the general properties 254g that are associated in the individual conductors 90 in their specific arrangement, which are contained in that segment 210. This exemplary configuration of fused and unfused segments 210, 220 contained in non-engineering busbar model 68b will allow the busbar 100 to: (i) achieve the in-plane bends 750 that are shown in connection with the model 68b, (ii) allow the non-bent extent 252 to flex, expand, contract, absorb vibration, or move as required by the busbar 100 during operation of the customer's application, product, component, or device that is shown in FIG. 5, and (iii)

withstand bending, handling and installation procedures. This provides a significant advantage over conventional busbars 10, 20, as described above.

Figure 15:
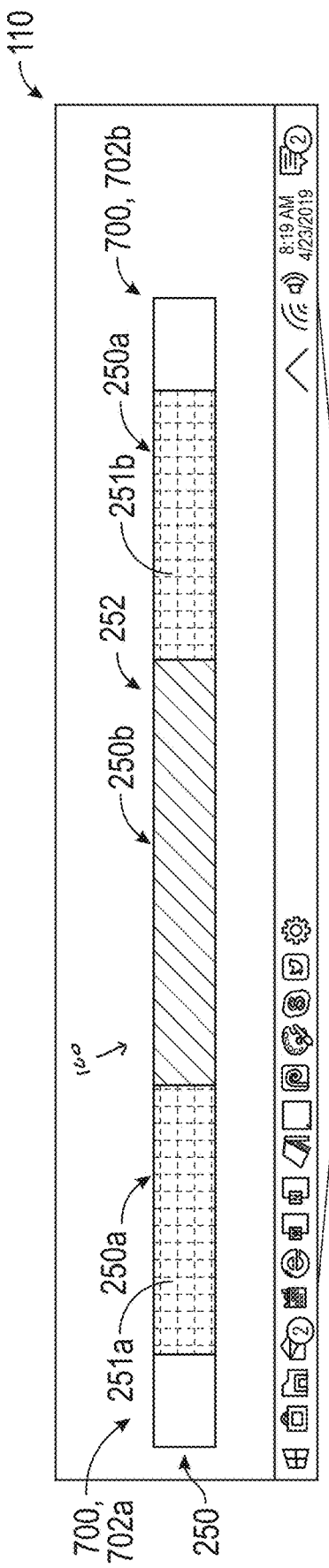
FIG. 15 show a busbar model having a busbar fusion pattern, wherein the intermediate fusion pattern of the of the busbar fusion pattern includes a two segments of a first type and another segment of a different type.
Figure 16:
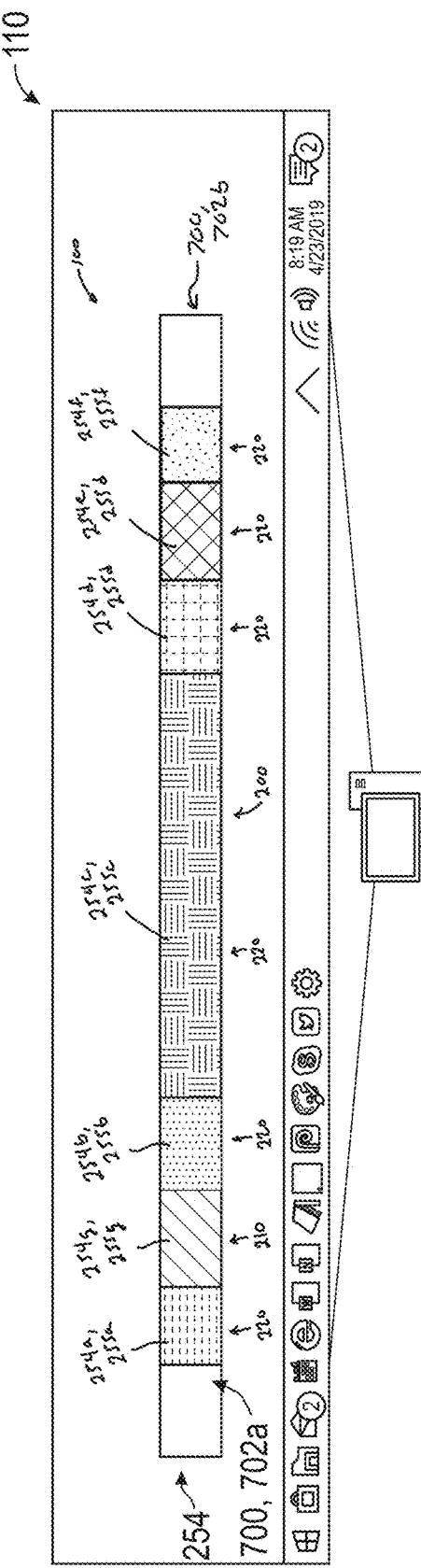
FIG. 16 show a busbar model having a busbar fusion pattern, wherein the intermediate fusion pattern of the of the busbar fusion pattern includes seven different segments.

In another example, the designer may choose to utilize the busbar design 250 shown in FIG. 15 in order to build the busbar 100 shown in the non-engineering busbar model 68a illustrated in FIG. 8E. This is because the intermediate portion 200 of the non-engineering busbar model 68a contains: (i) two similar in-plane bends 750 and thus can include a first set of fused segments 220—namely, a first fused segment 253a and a second fused segment 253b and (ii) two similar out-of-plane bends 760 and include second set of fused segments 220—namely, a third fused segment 253c and a fourth fused segment 253d. The first fused segment 253a and the second fused segment 253b have a first set of general properties 254a, while the third and fourth fused segment 253c, 253d have a second set of general properties 254b, which is different from the first set of general properties 254a. The second set of general properties 254b is different from the first set of general properties 254b because the bends are different. In particular, the first set of general properties 254a is utilized from the in-plane bends 750 and the second set of general properties 254b is utilized for the out-of-plane bends 760. Changing the properties based on the bends is beneficial because different bend types place different forces on the conductors 90, wherein the out-of-plane bend 760 may have a higher probability of causing the connectors 90 to delaminate from one another in comparison in-plane bends 750. Additionally, the non-engineering busbar model 68a has a three non-bent extents 256a-256c, wherein one 256a is positioned between innermost fused segments 220 or first and second fused segments 253a, 253b, another one 256b is positioned between the first fused segment 253a and the third fused segment 253c, and the final one 256b is positioned between the second fused segment 253b and the fourth fused segment 253d. The designer can choose to use an unfused segment 210 for these non-bent extents 256 of the busbar 100.

In other words, non-engineering busbar model 68a may contains: (i) the first and second end portions 700, 702a, 702b and (ii) an intermediate portion 200. The intermediate portion 200 includes: (i) the first and second fused segments 220, 253a-253b, wherein each segment has a first set of general properties 254a, (ii) the third and fourth fused segments 220, 253c-253d, wherein each segment has a second set of general properties 254b, and (iii) three unfused segment 210, 256a-256c that have the general properties 254c that are associated with the individual conductors 90 in their specific arrangement, which are contained in that segment 210. This exemplary configuration of fused and unfused segments 220, 210 contained in non-engineering busbar model 68a will allow the busbar 100 to achieve the in-plane bends 750 that are shown in connection with the model 68a and will allow the non-bent extent 256 to flex, expand, contract, absorb vibration, or move as required by the busbar 100 during operation of the customer's application, product, component, or device that is shown in FIG. 5. This provides a significant advantage over conventional busbars 10, 20, as described above.

Figure 17:
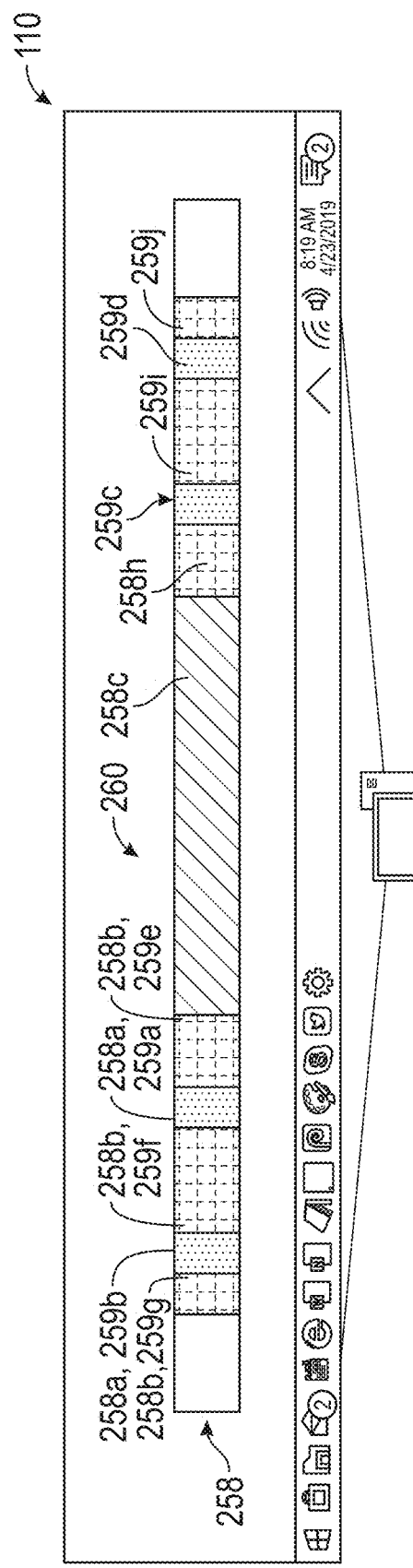
FIG. 17 show a busbar model having a busbar fusion pattern, wherein the intermediate fusion pattern of the of the busbar fusion pattern includes four segments of a first type and six segments of a second type.

Alternatively, the designer may choose to utilize the busbar design 258 shown in FIG. 17 in order to build the busbar 100 shown in the non-engineering busbar model 68a illustrated in FIG. 8E. This is because the intermediate portion 200 of the non-engineering busbar model 68a contains: (i) four bends and thus these fused segments 220 (i.e., first through the fourth fused segments 259a-259d) can have a first set of general properties 258a, and (ii) three extents that are positioned between these bends that can account for forces that radiate from the four bends and thus these fused segments 220 (i.e., fifth through tenth fused segments 259e-259j) can have a second set of general properties 258b. As shown in FIG. 17, the first set of general properties 258a is different from the second set of general properties 258b. These first and second sets of general properties 258a, 258b are different because the forces experienced by these regions are different. Additionally, the non-engineering busbar model 68a has a non-bent extent 260 that is positioned between the innermost fused segments 220, 259b. The designer can choose to use an unfused segment 210 for this non-bent extent 256 of the busbar 100.

Figure 18:
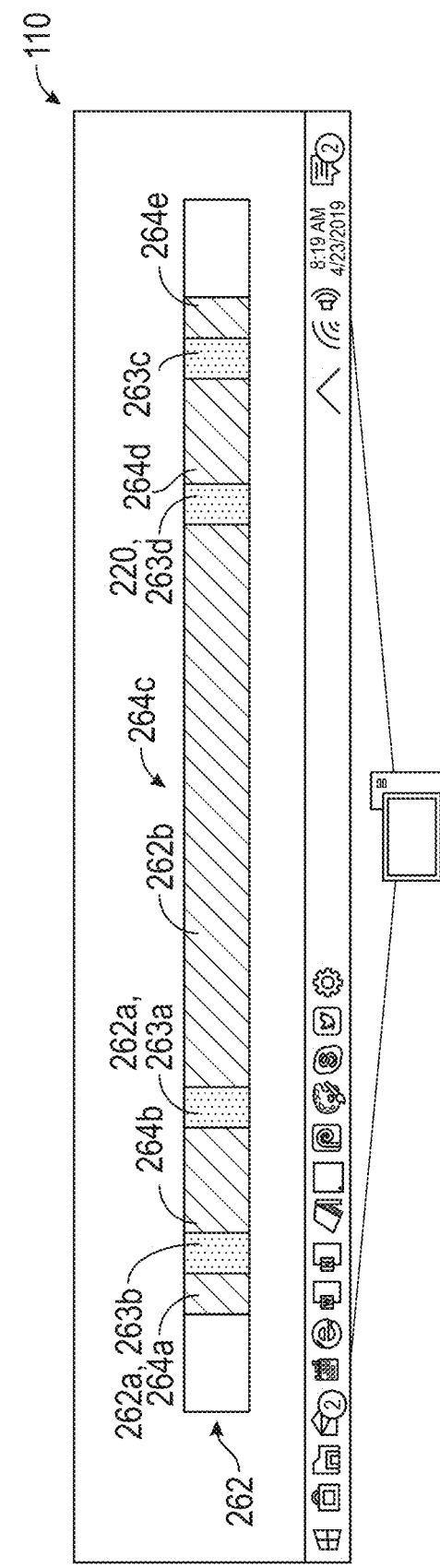
FIG. 18 show a busbar model having a busbar fusion pattern, wherein the intermediate fusion pattern of the of the busbar fusion pattern includes four segments of a first type and five segments of a second type.

In another alternative, the designer may choose to utilize the busbar design 262 shown in FIG. 18 in order to build the busbar 100 shown in the non-engineering busbar model 68a illustrated in FIG. 8E. This is because the intermediate portion 200 of the non-engineering busbar model 68a contains four bends and thus these fused segments 220 (i.e, first through the fourth fused segments 263a-263d) can have a first set of general properties 262a. Additionally, the non-engineering busbar model 68a has non-bent extents 264a-264e that surround the fused segments 220, 263a-263d that have a second set of general properties 262b. The designer can choose to use an unfused segment 210 for these non-bent extents 264a-264e of the busbar 100. In a further alternative, the designer may choose to utilize a busbar design that includes six fused segments and one unfused segment. Here, the six fused segments may have different general properties from one another. Overall, it should be understood that the intermediate portion 200 may contain any number (e.g., 0-1000) of fused regions 220 and any number (e.g., 0-1000) of unfused regions 210. For example, the intermediate portion 200 may only contain a single fused region 220.

Figure 20:
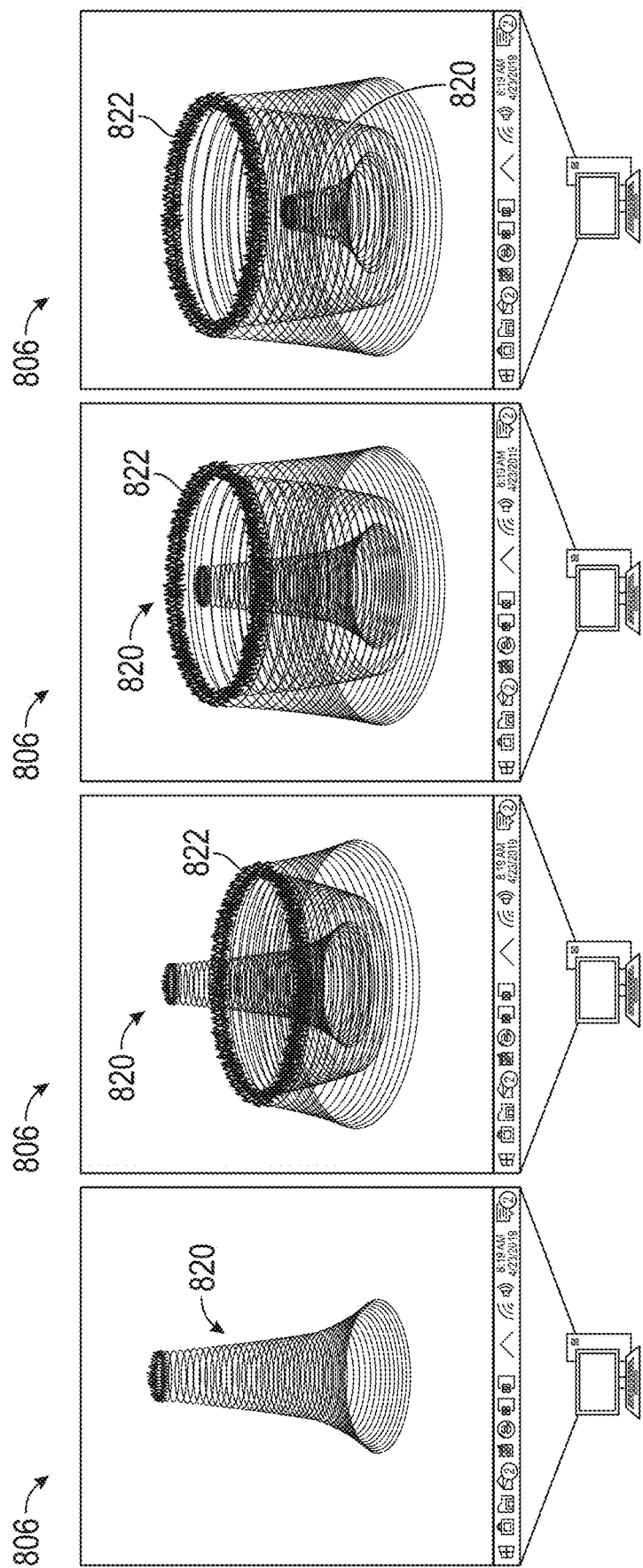
FIG. 20A-20D show exemplary shapes of the laser beam that may be utilized to fuse the selected segments of the busbar.
Figure 22:
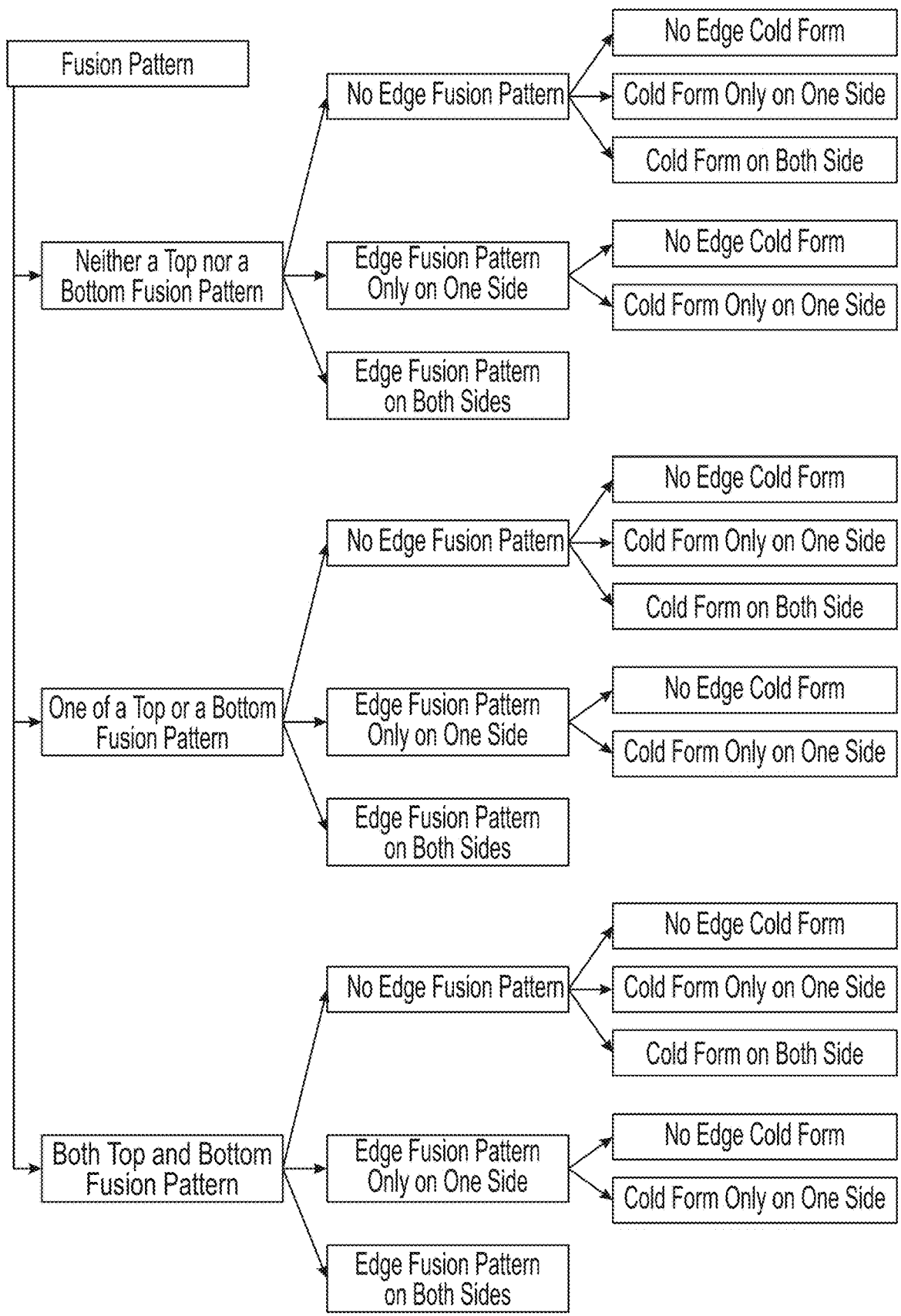
FIG. 22 is a flowchart showing different possible permutations of the fusion patterns that may be applied to a busbar.

Returning to FIG. 6, once the fused segments 220 of the intermediate portion 200 of the busbar 100 have been identified in step 110, then the busbar designer can select a method of fusing the identified segments 220 in the intermediate portion 200 and end portions 700 in step 114. Examples of fusion methods that may be selected are shown in FIG. 22. In particular, these fusion methods include: (i) laser welding 800, (ii) resistance welding 900, (iii) cold form 910, (iv) arc welding 920, (v) electron beam welding 930, (vi) orbital welding 940, (vii) ultrasonic welding 950, (viii) friction welding 960, (ix) any combination of the above methods 970, or (x) other known methods for fusing metal 980. In making this selection, the designer may consider some or all of the following: (i) configuration of conductors 90, (ii) number of conductors 90, (iii) density of the conductors 90, (iv) thickness of the conductors 90, (v) material properties of the conductors 90, (vi) general properties of the fused segments 220, (vii) number of fused segments 220, (viii) frequency of the fused segments 220, (ix) commercial throughput requirements, (x) width of the busbar, (xi) other customer specifications, and (xii) other factors that are obvious to one of skill in the art based upon the above list of factors If the designer selects laser welding 800, then the designer may select: (i) laser type 802, (ii) laser power 804, (iii) laser beam shape 806, (iv) laser path 808, and/or (v) other factors 810. The laser type 802 may be any type of laser that is designed to solidify, weld, or cut metal. For example, the laser type 802 that may be used is a fiber-based laser that has a wavelength that is between 688 nm and 1080 nm. The laser power 804 may be any power that is configured to weld the busbar 100 in the desired manner. For example, the laser power 804 may be between 0.5-25 kW, preferably between 1-6 kW, and most preferably between 2-5 kW. The laser beam shape 806 may also take any desirable shape, including only a central core 820 (shown in FIG. 20A), a ring 822 surrounding a central core 820 (shown in FIGS. 20B-20D), a central core and two adjacent cores, wherein these adjacent cores are positioned in front of the central core when utilizing the laser, or other similar configurations. Not only can the general shape of the laser beam be controlled, the power and size associated with each of these features may also be controlled. Examples of how these power levels may be changed are shown in FIGS. 20B-20D. Specifically, FIG. 20B shows a beam shape 806 where the central core 820 is set to a first power level and the ring 822 is set to a second power level that is lower than the first power level. For frame of reference, the central core power may vary between 0.5-12 kW, preferably between 1-5 kW, and most preferably between 2-4 kW, while the ring power may vary between 0.5-15 kW, preferably between 1-4 kW, and most preferably between 1-2.5 kW. Additionally, the diameter of the central core 820 and the diameter of the ring may be changed. For example, these diameters by vary between 50 and 600 μm.

Figure 21:
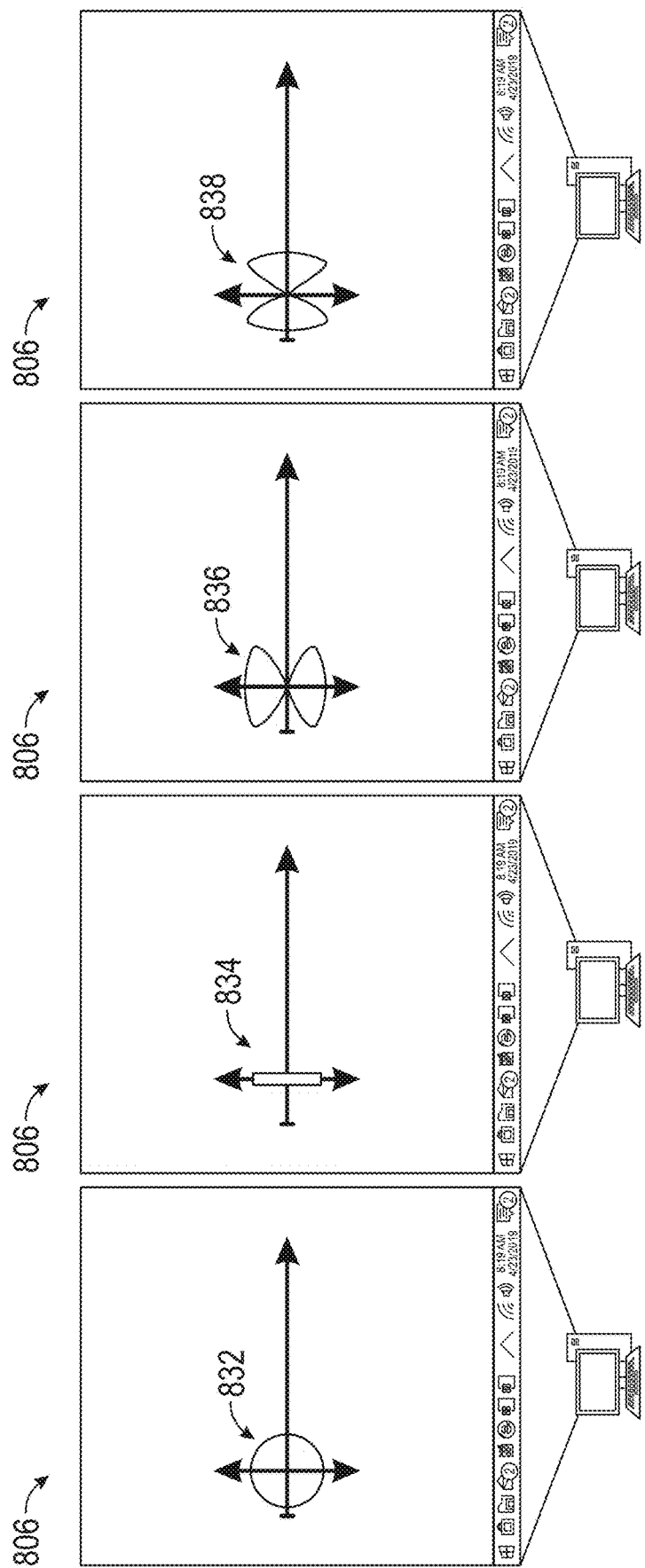
FIGS. 21A-21D show exemplary laser paths that the laser may utilize to fuse the selected segments of the busbar.

After selecting the laser type 802, laser power 804, and laser beam shape 806, the designer may select the laser path 808. Exemplary laser paths 808 are shown in FIGS. 21A-21D. It should be understood that these laser paths 808 are not the overall path the laser will follow on the busbar 100. Instead, these laser paths 808 are a component of the overall path the laser will follow. For example, the laser may oscillate in a circular path 832 while following a specific waveform shown in FIGS. 25A-25T. As shown in FIGS. 21B-21D, shapes other than a circle may be followed, such as a line 834, a figure eight 836, or an infinity sign 838. Finally, the designer can select other variables like processing times, cool down times, and the alike.

Instead of going with a laser based fusion process, the designer may choose to go with a resistance welding process 900. Here, the designer will select: (i) the fabrication mode 902, (ii) the power level that is applied to the electrode 904, (iii) the roller type 906, if the mass fabrication mode is selected in 902, and (iv) other like variables 908. This process is discussed in greater detail in PCT/US20/50018, which is incorporated herein by reference. It should be understood that the designer may choose to use any one of the above fusion methods in connection with applying an external pressure to the conductors 90 in order to keep the conductors 90 properly arranged when the conductors 90 are undergoing this fusion process. Also, instead of going with a laser based fusion process, the designer may choose to go with a cold forming method 910. Here, the designer will select: (i) the fabrication mode 910, (ii) the pressure applied by the roller, (iii) the roller type, if the mass fabrication mode is selected in, and (iv) other like variables.

It should also be understood that different fusion methods may be utilized in connection with different portions, segments, regions of the busbar 100. For example, the end portions 700 may be formed using a resistance welding method 900, while the intermediate portion 200 may be formed using a laser welding method 800. In further alternative embodiments, the fused segments 220 may be created using a process that deposits material around the conductors 90 in the busbar 100. For example, this may use a 3D printer or may slip a material sleeve over the conductors 90 to form this fused region 220. Upon selecting the fusion method for the identified segments in the intermediate portion 200 and the end portions 700 in step 114, the designer proceeds to determine the fusion pattern for the identified fused segments 220 in the intermediate portion 200 of the busbar 100.

Returning to FIG. 6, once the fusion method has been selected in step 114, then the busbar designer can determine the patterns for each of the fused segments 220 in the intermediate portion 200 of the busbar 100 in step 118. Because the general properties of each fused segment 220 were already identified in connection with step 110, step 118 focuses on converting these general properties (e.g., 250*a*, 254*a*, 258*a*) into manufacturable properties. The designer analyses these general properties (e.g., 250*a*, 254*a*, 258*a*) of each segment, the properties associated with selected the fusion process, and other relevant properties in order to determine the intermediate fusion pattern 300 of the busbar 100. This intermediate fusion pattern 300 may include: (i) a top fusion pattern 330, (ii) a bottom fusion pattern 332, (iii) right edge fusion pattern 350, (iv) left edge fusion pattern 352 and/or a selective combination of each of these fusion patters. It should be understood that the collection of the top, bottom, left and/or right edge fusion pattern(s) 330, 332, 350, 352 contained in a fused segment 220 form a segment fusion pattern 310 that is associated with said fused segment 220.

It should be understood that the use of edge welds based on the left and/or right edge fusion pattern(s) 350, 352 may be sufficient on their own to ensure that the conductors 90 do not delaminate during the process of bending the busbar 100, but said edge welds may not be sufficient to prevent delamination during installation or use of the busbar 100 at the system level. Thus, the inclusion of surface welds based on the top and bottom fusion pattern(s) 330, 332 may be necessary to ensure that the conductors 90 do not delamination during installation or use of the busbar 100 at the system level. Additionally, even if the busbar designer determines that the use of edge welds based on the left and/or right edge fusion pattern(s) 350, 352 is sufficient on their own to ensure that the conductors 90 do not delaminate at the system level, the busbar designer may still utilize surface welds based on the top and bottom fusion pattern(s) 330, 332 in areas where the busbar 100 is secured in the battery pack.

Referring to FIG. 22, there are 18 different combinations of the top/bottom and edge fusion patterns 330, 332, 350, 352. For example, there may be six different combinations may be formed when neither a top fusion pattern 330 nor a bottom fusion pattern 332 are included in the segment fusion pattern 310. Additionally, there may be six different combinations may be formed when a top fusion pattern 330 or a bottom fusion pattern 332 are included in the segment fusion pattern 310. Further, there may be six different combinations may be formed when both a top fusion pattern 330 and a bottom fusion pattern 332 are included in the segment fusion pattern 310. Each of the six different segment fusion pattern 310 that are described above include the following combinations: (i) both limited solidification zones do not include any type of a limitedly solidified region, (ii) one limited solidification zone includes a limitedly solidified region formed using a cold forming process and the other limited solidification zone does not include any type of a limitedly solidified region, (iii) both limited solidification zones include limitedly solidified regions formed using a cold forming process, (iv) one limited solidification zone includes a limitedly solidified region formed using a lateral partial penetration weldment process and the other limited solidification zone does not include any type of a limitedly solidified region, (v) one limited solidification zone includes a limitedly solidified region formed using a lateral partial penetration weldment process and the other limited solidification zone includes a limitedly solidified region formed using a cold forming process, and (vi) both limited solidification zones include limitedly solidified regions formed using a lateral partial penetration weldment process.

In other words, the six different segment fusion pattern 310 that are described above include the following combinations: (i) both side edge areas do not include a solidified region, (ii) one side edge area includes a solidified region formed using a cold forming process and the other side edge area does not include a solidified region, (iii) both side edge areas include solidified regions formed using a cold forming process, (iv) one side edge area includes a solidified region formed using a lateral partial penetration weldment process and the other side edge area does not include a solidified region, (v) one side edge area includes a solidified region formed using a lateral partial penetration weldment process and the other side edge area includes a solidified region formed using a cold forming process, and (vi) both side edge areas include solidified regions formed using a lateral partial penetration weldment process. Stated another way, the six different segment fusion pattern 310 that are described above include the following combinations: (i) a fusion process is not applied to either side edge, (ii) a cold forming process is applied to one side edge and a fusion process is not applied to the other side edge, (iii) a cold forming process is applied to both side edge, (iv) a lateral partial penetration weldment process is applied to one side edge and a fusion process is not applied to the other side edge, (v) a lateral partial penetration weldment process is applied to one side edge and a cold forming process is applied to the other side edge, and (vi) a lateral partial penetration weldment process is applied to both side edges.

As shown in FIGS. 29A-29B, top and bottom fusion pattern(s) 330, 332 may be selectively omitted from the segment fusion pattern 310 and likewise from the intermediate fusion pattern 300 and the busbar fusion pattern 298. Additionally, forming each of the segment fusion pattern 310, and by definition at least an extent of the intermediate fusion pattern 300 and the busbar fusion pattern 298, from one or both of the fusion pattern(s) 330, 332 is desirable because the fusion method is typically configured to only partially penetrate the height of the conductors 90 contained in the busbar 100 due to the fact that full penetration of all conductors 90 is typically undesirable because it creates failure points in the busbar 100. To prevent any extent of the intermediate portion 200 of the busbar 100 from becoming fully solidified busbar 100, settings on the welding or fusing apparatus are set in a manner that does not fully penetrate the height of all conductors 90 contained in the busbar 100. These welds will be discussed in greater detail in connection with FIGS. 40-54.

As shown in FIGS. 29C-29D, left and/or right edge fusion pattern(s) 350, 352 may be selectively omitted from the segment fusion pattern 310 and likewise from the intermediate fusion pattern 300 and the busbar fusion pattern 298. Additionally, forming each of the segment fusion pattern 310, and by definition at least an extent of the intermediate fusion pattern 300 and the busbar fusion pattern 298, from one or both of the fusion pattern(s) 350, 352 is desirable because the fusion method is typically configured to only partially penetrate the width of the conductors 90 contained in the busbar 100 due to the fact that full penetration of all conductors 90 would undesirably create a fully solidified busbar 100. To prevent any extent of the intermediate portion 200 of the busbar 100 from becoming fully solidified busbar 100, settings on the welding or fusing apparatus are set in a manner that does not fully penetrate the width of all conductors 90 contained in the busbar 100. These welds will be discussed in greater detail in connection with FIGS. 40-54.

Figure 23:
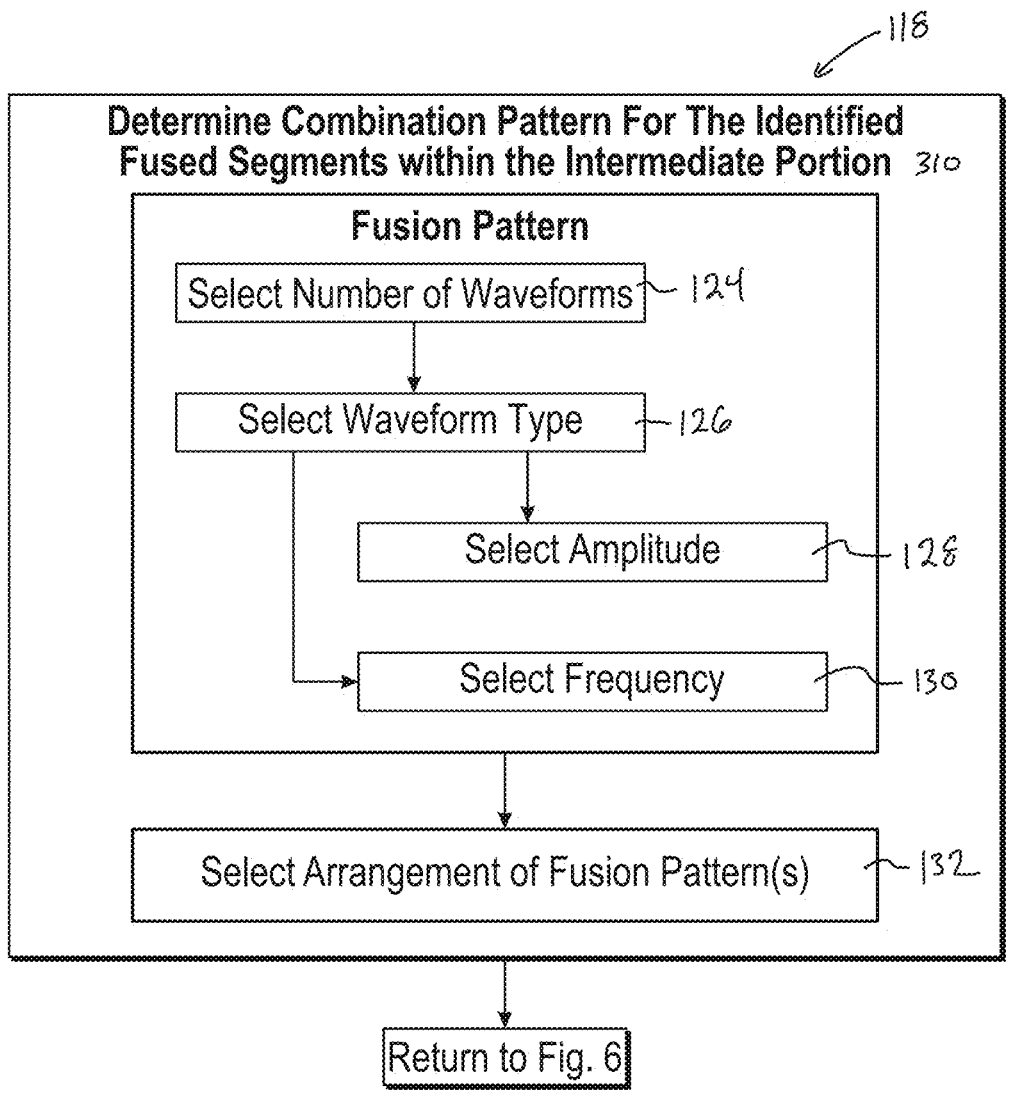
FIG. 23 is a flowchart for creating the combined fusion pattern for the identified fused segments of the intermediate portion of the busbar.
Figure 25A:
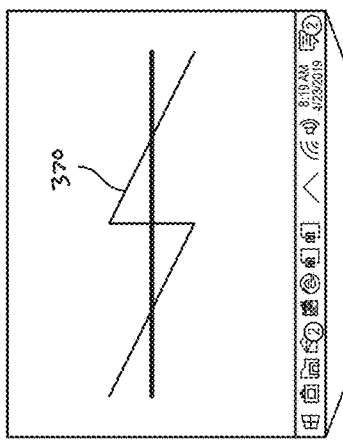
FIGS. 25A-25T show exemplary waveform types that may be used in the creation of the fusion patterns.
Figure 25B:
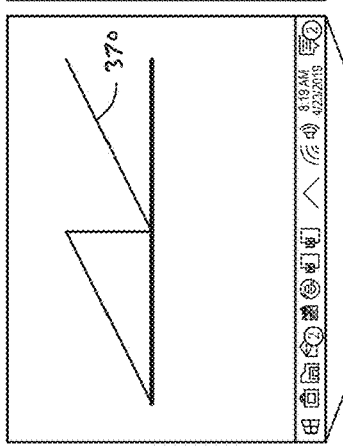
Figure 25C:
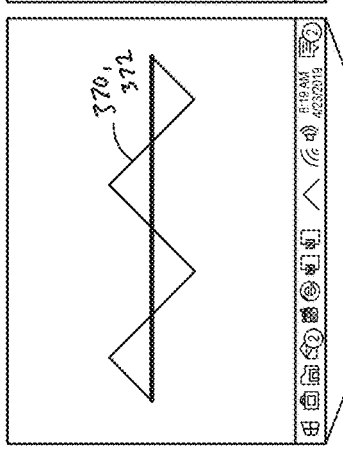
Figure 25D:
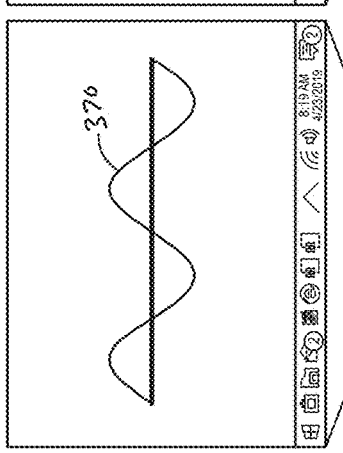
Figure 25E:
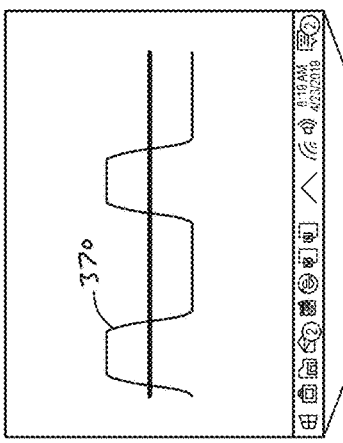
Figure 25F:
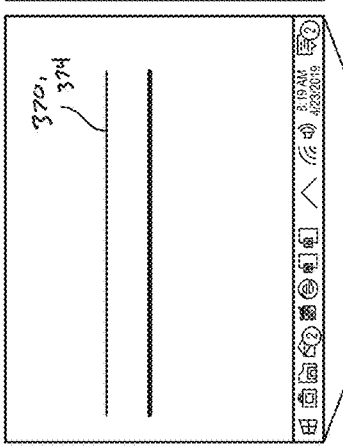
Figure 25G:
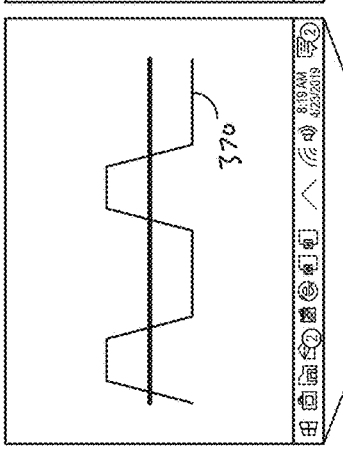
Figure 25H:
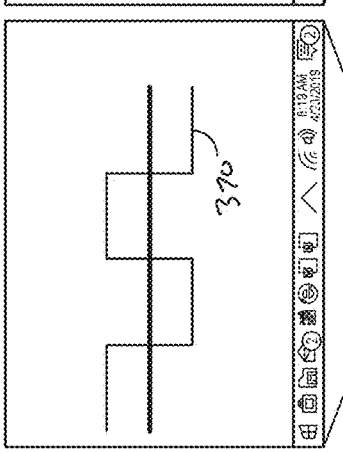
Figure 25I:
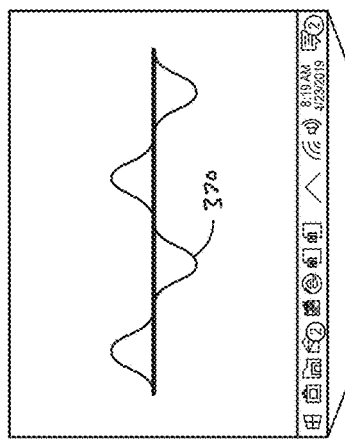
Figure 25M:
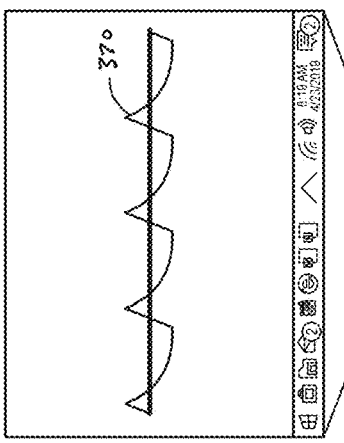
Figure 25J:
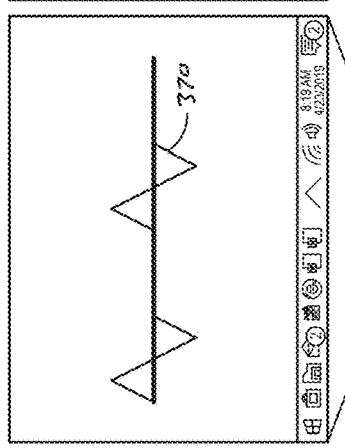
Figure 25N:
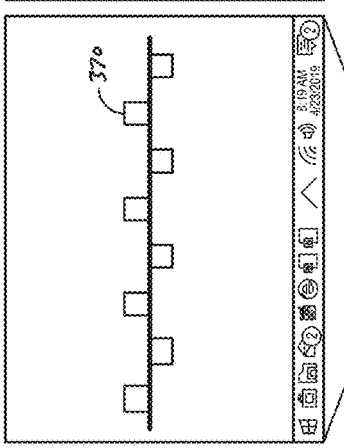
Figure 25K:
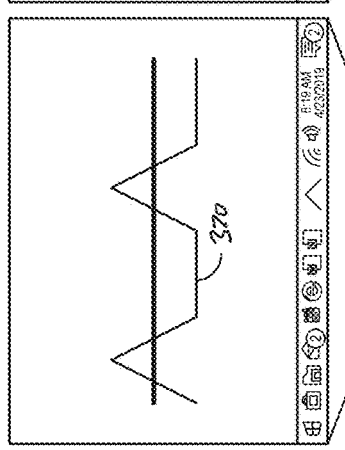
Figure 25O:
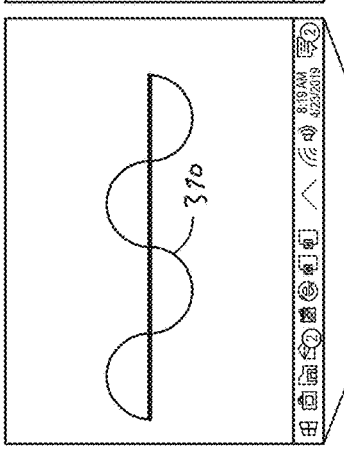
Figure 25L:
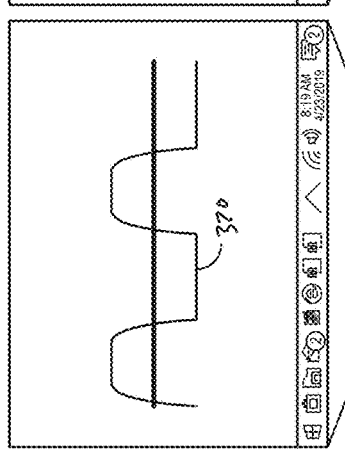
Figure 25P:
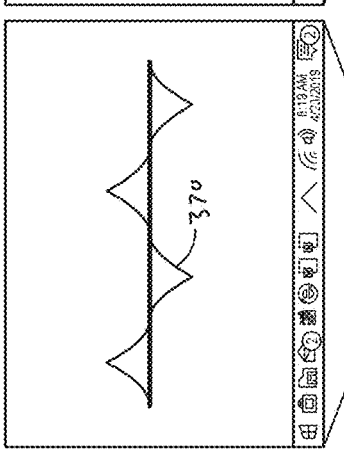
Figure 25Q:
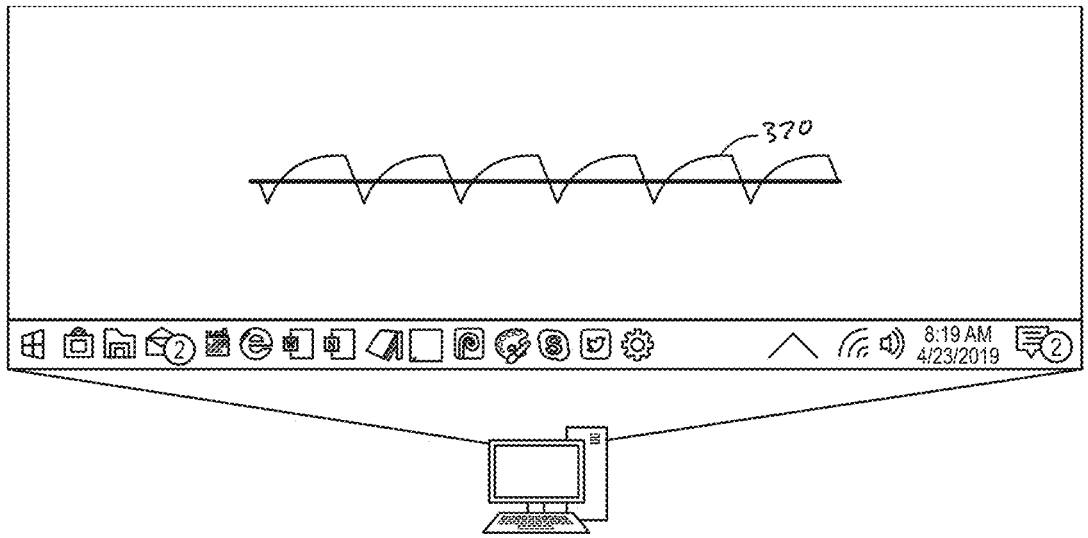
Figure 25R:
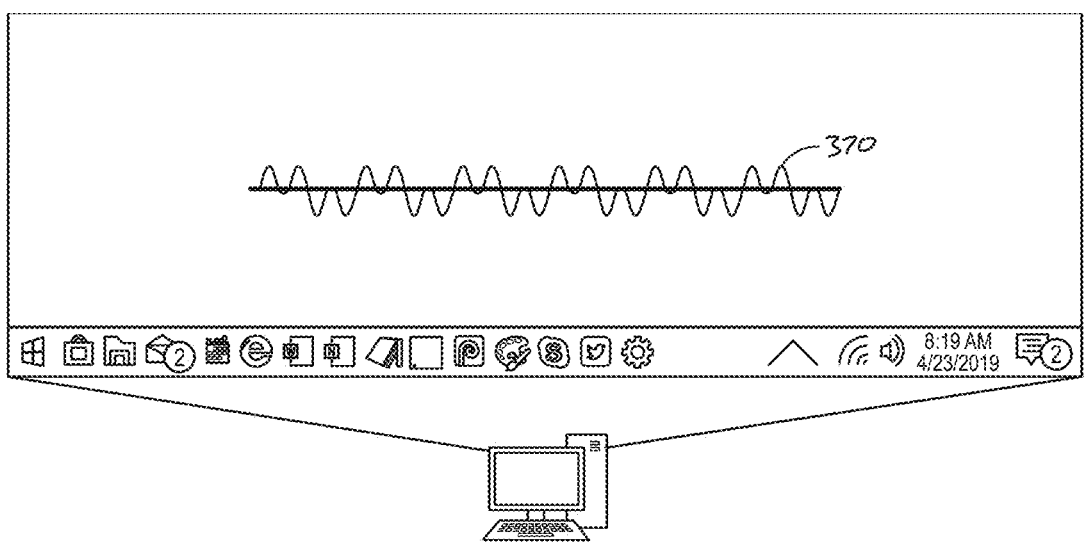
Figure 25S:
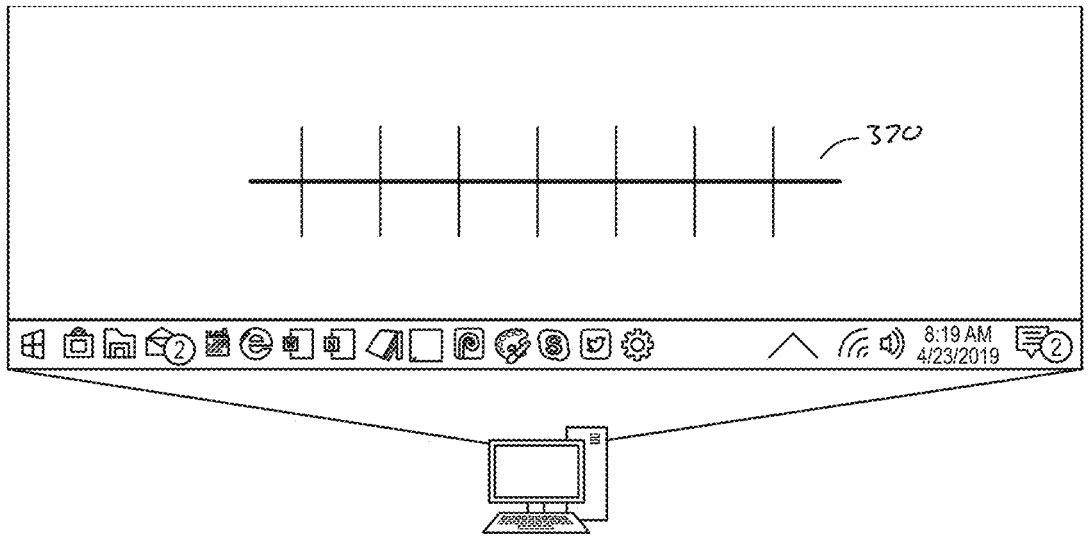
Figure 25T:
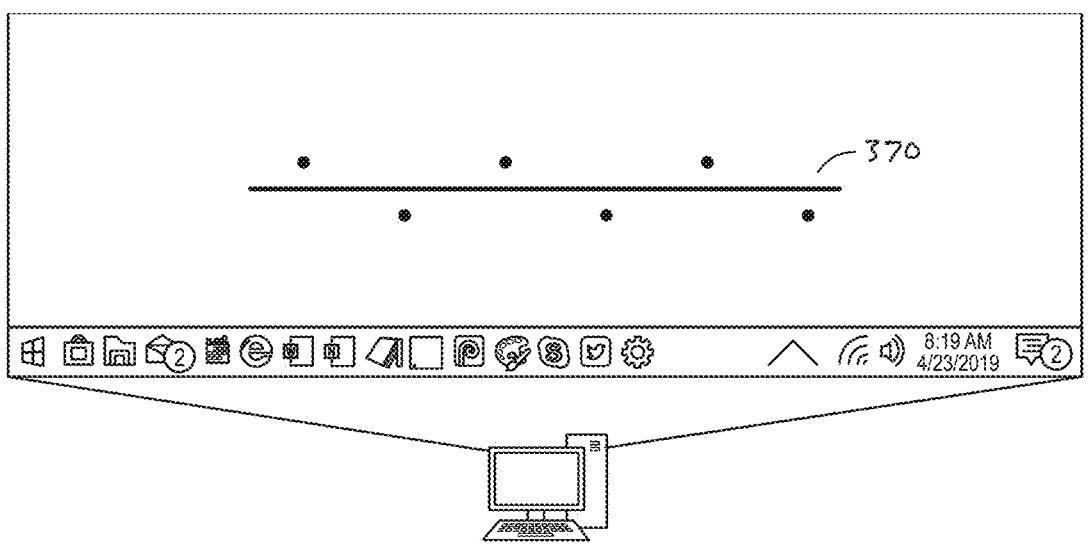
Figure 27:
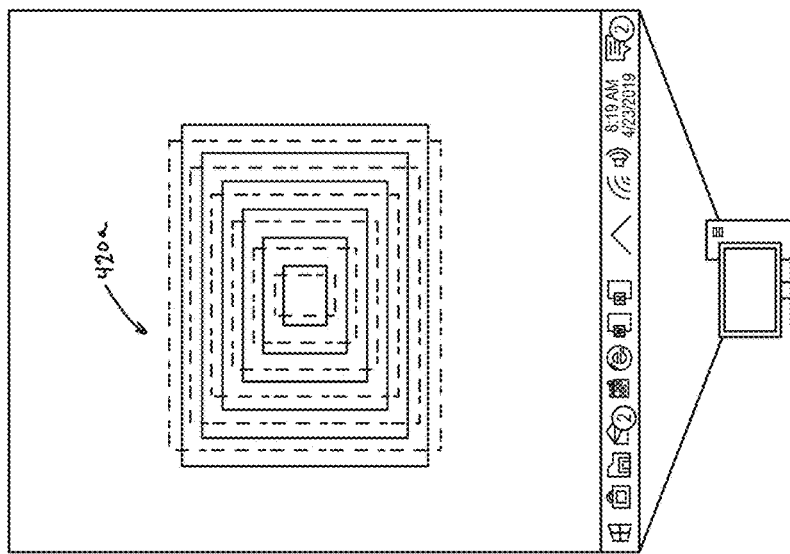
FIG. 27 shows a combined fusion pattern that is comprised of the top fusion pattern and the bottom fusion pattern, wherein the top fusion pattern and bottom fusion pattern are arranged such that they minimize the direct overlap with each other.
Figure 26B:
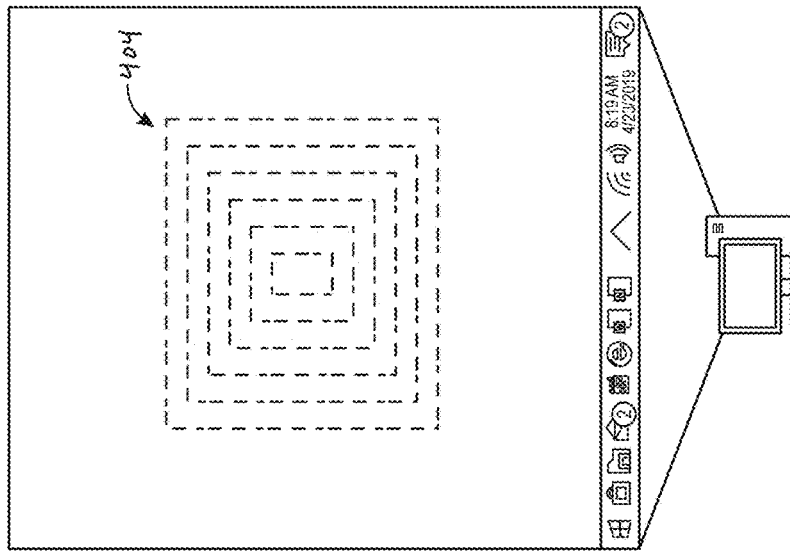
FIG. 26B shows a bottom fusion pattern configured to be disposed on the bottom surface of a fused segment of the end portion of the busbar.
Figure 26A:
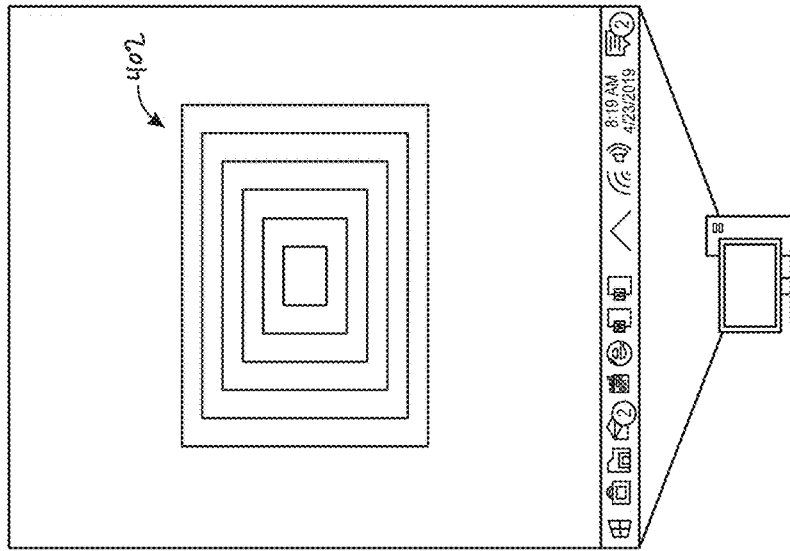
FIG. 26A shows a top fusion pattern configured to be disposed on the top surface of a fused segment of the end portion of the busbar.

Creating the top, bottom, left and/or right edge fusion patterns 330, 332, 350, 352, whose combination form the segment fusion pattern 310 and ultimately at least an extent of the intermediate fusion pattern 300 and the busbar fusion pattern 298, is a multiple step process that is described in connection with FIG. 23. Here, the first step in determining the fusion patterns 330, 332, 350, 352 is selecting the number of waveforms 370 contained in this pattern 304 in step 124. The number of waveforms 370 that may be selected can be any number (e.g., 0-100), is preferably between 1-6, and most preferably is one 372. After selecting the number of waveforms 370 in step 124, the designer can select the type of waveform 370 in step 126. Exemplary waveform types are shown in FIGS. 25A-25T. Examples of the waveforms contained in FIG. 25 are: (i) sine wave (FIG. 25A), (ii) triangle (FIG. 25B), (iii) ramp up (FIG. 25C), (iv) ramp down (FIG. 25D), (v) square (FIG. 25E), (vi) pulse (FIG. 25F), (vii) line (FIG. 25G), (viii) rounded pulse (FIG. 25H), (ix) circular pulse (FIG. 25I), (x) triangular pulse (FIG. 25J), (xi) ramp pulse (FIG. 25K), (xii) sine cubed (FIG. 25L), (xiii) flame (FIG. 25M), (ixv) semicircle (FIG. 25N), (xv) and other waveforms (FIGS. 25O-25T). It should be understood that the waveform types shown in FIG. 27 are only exemplary waveform types and that other types may be used.

Once the designer selects the waveform type in step 126, the designer then selects the amplitude of the waveform 370 in step 128 and the frequency of the waveform 320 in step 130. While any amplitude may be selected in step 128, it may be desirable to select an amplitude of the waveform 370 that enables the apex of the waveform to approach close to the edge of the busbar 100, but not extend over the edges of the busbar 100. This may be desirable because this will reduce welding spatter, if the designer is utilizing a laser welding fusion process 800, and in turn reduces the number of sharp edges contained in the busbar 100. While any amplitude may be selected in step 128, it should be understood that the selection of the frequency of the waveform in step 130 has a high correlation to the width or depth of the weldment and therefore selection of the frequency is carefully selected. Typically, if all other variable are kept the same, the high the frequency the deeper the weldment depth and the lower the frequency the shallower the weldment depth.

Finally, after the top, bottom, left and/or right edge fusion patterns 330, 332, 350, 352 are created, the designer can then align these patterns 330, 332, 350, 352 in each segment of the busbar 100 to form each of the segment fusion pattern(s) 310 in step 132. The combination of all segment fusion pattern(s) 310 in the entire model 100 can be used to generate the intermediate fusion pattern 300. It should be understood that one of the top, bottom, left and/or right edge fusion patterns 330, 332, 350, 352 may be selectively omitted, the top, bottom, left and/or right edge fusion patterns 330, 332, 350, 352 may include only a single waveform, the waveform may be a straight line (i.e., have an amplitude of zero) and/or the waveform may be a discontinuous waveform (e.g., formed from a plurality of discontinuous extents).

As discussed above, numerous factors are considered in formulating the general properties (e.g., 250a, 254a, 258a) of each of the fused segments 220 in step 110, which in turn means that numerous factors are considered when generating the top, bottom, left and/or right edge fusion patterns 330, 332, 350, 352. In considering these numerous factors, it should be understood that the bend geometry may be one of the leading factors in determining: (i) whether one of the top, bottom, left and/or right edge fusion patterns 330, 332, 350, 352 should be selectively omitted, (ii) the fusion process that will be used in conjunction with the top, bottom, left and/or right edge fusion patterns 330, 332, 350, 352, (iii) the laser settings for the top, bottom, left and/or right edge fusion patterns 330, 332, 350, 352, (iv) waveform types for the top, bottom, left and/or right edge fusion patterns 330, 332, 350, 352, (v) amplitudes for the top, bottom, left and/or right edge fusion patterns 330, 332, 350, 352, and (vi) frequencies for the top, bottom, left and/or right edge fusion patterns 330, 332, 350, 352. This is because significantly different forces are placed on the conductors 90 that are contained in the busbar 100 in connection with the in-plane bends 750 in comparison to the out-of-plane bends 760. As such, inclusion of the top, bottom, left and/or right edge fusion patterns 330, 332, 350, 352, the laser settings (e.g., power, shape, path), waveform type, and frequency may: (i) remain constant in a fused segment 220, (ii) may vary in a fused segment 220, (iii) remain constant across a plurality of fused segments 220, and/or (iv) may vary across a plurality of fused segments 220. It should be understood that varying the laser settings, waveform type, amplitude of the waveform, and/or frequency of the waveform will alter the weldment depth; thereby varying the cross-sectional area of the solidified region. The cross-sectional area of the weldments are discussed in greater detail below in connection with at least FIG. 41.

Figure 28B:
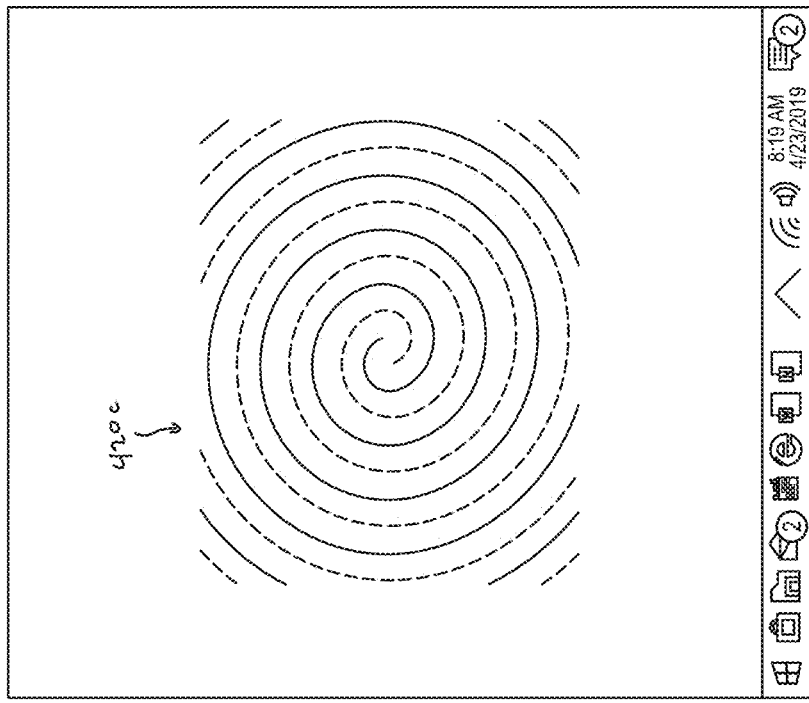
FIGS. 28A and 28B show alternative combined fusion patterns that may be disposed on a fused segment of the end portion of the busbar.
Figure 28A:
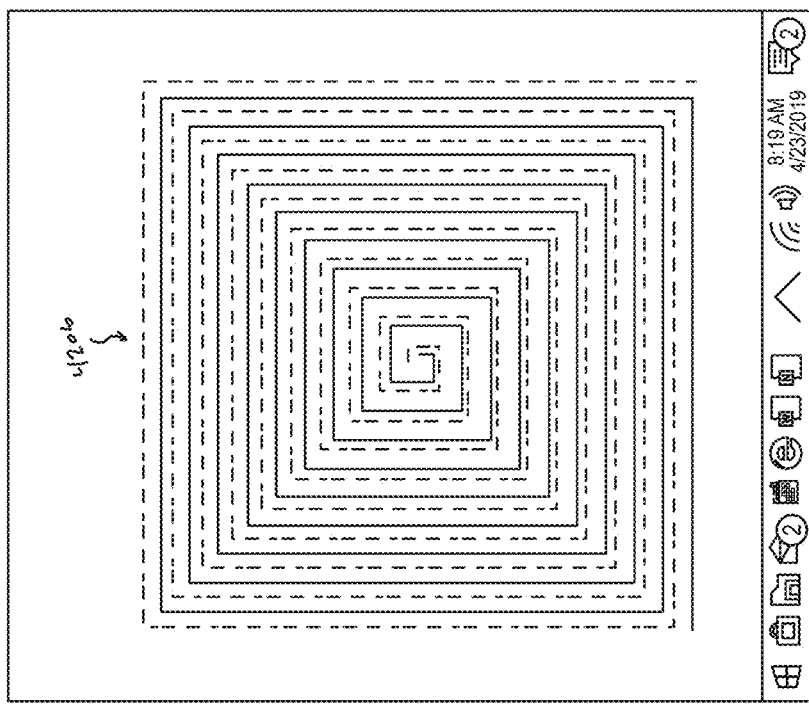

Like the process that is described above in connection with determining the segment fusion pattern 310 for the identified fused segments 220 in step 118, the busbar designer can determine the fusion pattern(s) for the end portions 700 of the busbar 100 in step 150. Specifically, the end fusion pattern 400 may be determined based upon the connector that the designer plans on attaching to the busbar 100. For example, a first end fusion pattern 400a may be used in connection with end portions 700 designed to receive a connector 2000, while a second end fusion pattern 400b may be used for the end portions 700 designed to receive an aperture formed therethrough. After selecting the desired properties, the designer may follow the same steps described above in connection with determining each of the segment fusion pattern(s) 310. Specifically, the top, bottom, left, right and/or face end fusion patterns 402, 404, 406, 408, 410 are determined in step 154 by: (i) selecting the number of waveforms in step 156, (ii) the waveform types are selected in step 158, (iii) the amplitude of the waveforms is selected in step 160, and (iv) the frequency of the waveforms is elected in step 162. Next, in step 164, the top, bottom, left, right and/or face fusion patterns 402, 404, 406, 408, 410 are arranged in a manner that minimizes overlap between the top and bottom fusion patterns 402, 404 in step 166 to from the end fusion pattern 400. As shown in FIGS. 26A-28B, the end fusion pattern 400 may take the form of: (i) overlapping rectangles 420, as shown in FIG. 27, (ii) spiraling rectangles 420b, as shown in FIG. 28A, or (iii) spiraling circles 420c, as shown in FIG. 28B. It should be understood that the spiraling circles or rectangles 420b, 420c may be desirable because there is no overlap between the top and bottom end fusion patterns 402, 404.

Once the intermediate fusion pattern 300 and end fusion pattern(s) 400 are determined, the designer can replace the general properties (e.g., 250a, 254a, 258a) of the busbar model 100 with these fusion patterns 300, 400. Specifically, the general properties that were determined in connection with the exemplary 250, 254, 258, 262 busbar models 100 in FIGS. 13-18 are replaced by the fusion patterns 300, 400 that meet these general properties. An example of the engineering models 100 that include these fusion patterns 300, 400 is shown in FIGS. 29A-29D. As discussed above in connection with FIG. 16, the model 100 includes: (i) an intermediate portion 200 and (ii) two end portions 700 (i.e., first end portion 702a and a second end portion 702b). The intermediate portion 200 has: (i) six fused segments 220, which include: (a) first fused segment 254a with a first set of general properties 255a, (b) second fused segment 254b with a second set of general properties 255b, (c) third fused segment 254c with a third set of general properties 255c, (d) fourth fused segment 254d with a fourth set of general properties 255d, (e) fifth fused segment 254e with a fifth set of general properties 255e, (f) sixth fused segment 254f with a sixth set of general properties 255f, and (ii) one unfused segment 210 with a seventh set of general properties 255g. The first, second, fourth, and sixth set of general properties 255a, 255b, 255d, 255f are designed to undergo bends and thus they are designed to form bend sections 1580. The third and seventh set of general properties 255c, 255g are designed to form a flexible section 1500. Finally, while the fifth segment 254e is not bent, the designer determined that the installation environment required a stiffer configuration in this region and thus selected a set of general properties 255e that will form a handling section 1540.

Each fused segment 254a-254f includes a segment fusion pattern 310a-310f, respectively. In particular, the first fused segment 254a will undergo a first out-of-plane bend 760 and therefor has a first fusion pattern 310a with a first length $L_{1FS}$. Said first fusion pattern 310a includes: a top fusion pattern 330a, a right fusion pattern 350a, left fusion pattern 352a. The second fused segment 254b will undergo a first in-of-plane bend 750 and therefor has a second fusion pattern 310b with a second length $L_{2FS}$. Said second fusion pattern 310b includes: a top fusion pattern 330b, a right fusion pattern 350b, left fusion pattern 350b. The third fused segment 254c will not be bend and instead will provide a flexible section 1500 and therefor has a third fusion pattern 310c with a third length $L_{3FS}$. Said third fusion pattern 310c includes: a right fusion pattern 350c, left fusion pattern 352c. The fourth fused segment 254d will undergo a second in-of-plane bend 750 and therefor has a fourth fusion pattern 310d with a fourth length $L_{3FS}$. Said fourth fusion pattern 310d includes: a top fusion pattern 330d, and a right fusion pattern 350d. Due to the similarity in the in-of-plane bend 750, the second length $L_{2FS}$ and fourth length $L_{3FS}$ are nearly identical. While the second fusion pattern 310b is different from the fourth fusion pattern 310d, said fusion patterns 310b, 310d will provide similar rigidity values because the cold forming process that is included to the second fusion pattern 310b (and is not included in the fourth fusion pattern 310d) does not significantly (e.g., more than 25%) alter the rigidity of the fused segment 220.

The fifth fused segment 254a will not be bend, but do to the system requirements it has a fifth fusion pattern 310e with a fifth length $L_{5FS}$. Said fifth fusion pattern 310e includes: a right fusion pattern 350e, and a left fusion pattern 352e. The sixth fused segment 254f will undergo a second out-of-plane bend 760 and therefor has a sixth fusion pattern 310f with a sixth length $L_{1FS}$. Said sixth fusion pattern 310f includes: a top fusion pattern 330f, and a bottom fusion pattern 332f. Due to the similarity in the out-of-plane bend 760, the first length $L_{1FS}$ and sixth length $L_{6FS}$ are nearly identical. The second and fourth lengths $L_{2FS}$, $L_{4FS}$ are longer than the first and sixth lengths $L_{1FS}$, $L_{6FS}$, which is due to the in-plane vs out-of-plane bend lengths. The flexible section 1500 does not include a fusion pattern, but has a length of $L_{1US}$ that substantially matches the length of the fifth length $L_{5FS}$. Finally, the first end portion 702a has a first end fusion pattern 400a with a first end length LIES and the second end portion 702b has a first end fusion pattern 400b with a second end length $L_{2ES}$. Said first end fusion pattern 400a includes a top, bottom, left, right and/or face end fusion patterns 402a, 404a, 406a, 408a, 410a, while the second end fusion pattern 400a includes a top, bottom, left, right and/or face end fusion patterns 402b, 404b, 406b, 408b, 410b. It should be understood that the lengths of these segments may change depending on the type of bend that is utilized. For example, the outermost edge of an in-plain bend 750 will stretch the length of that edge. Therefore, the above lengths are determined when the busbar 1000 is in a flat or substantially flat shape and is not in a bent configuration. As described above, it should be understood that at least the lengths of each segment, positional relationship of each segment, frequency of the segments can be altered to generate the desired configuration.

After the engineering models 100 are created, the designer can then digitally test these models 100 to determine if a busbar manufactured based upon the model 100 will meet the customer specifications 50. Here, the model 100 is bent using a digital bending machine 179 and the electrical properties of the model 100 are tested using a voltage testing system 181. Such testing can be accomplished using a finite element (FE) busbar model 100. If the busbar model 100 passes these tests then the designer can proceed to the next step of the process. However, if the busbar model 100 fails these tests 179, 181, then the designer can start the designing process all over again.

B. Fabricating the Inventive Busbar

Returning to FIG. 4, once the engineering model 100 has passed the digital tests set forth in step 180, the designer can start the fabrication process in step 182. The fabrication process 182 is a multiple step process that is described in greater detail in FIG. 32. At a high level, this process 182 includes: (i) obtaining a plurality of conductors 1090, (ii) fusing the end portion(s) 1700 of the busbar 1000 according to the engineering model 100 in step 184, (iii) fusing the identified segments 1220 of the intermediate portion 1200 of the busbar 1000 according to the engineering model 100 in steps 186, 188, and (iv) performing optional fabrication steps such as: (a) adding in connectors 2000 in step 190, (c) insulating the busbar 1000 in step 192, and/or (d) plating an extent of the busbar 1000 in step 194.

The first step in the multiple step fabrication process 182 is obtaining a plurality of conductors 1090 and then end portion(s) 1700 of the busbar 1000 according to the engineering model 100 in step 184. To perform this step 186, the busbar designer/manufacture obtains the conductors 1090 and then utilizes a machine 798 that is capable of performing the fusion method that was selected when creating the engineering model 100. For example, if the designer decided to use a laser welding fusion method 1605, then the designer would utilize the laser welding machine 850 that is shown in at least FIGS. 32A-32C. As shown therein, the laser welding machine 850 may include two separate lasers 852, 854 that can simultaneously weld the busbar 1000 from two opposite directs. The two separate lasers 852, 854 are preferably aligned in a vertical plane. However, it should be understood that the laser welding machine 850 may have other configurations, which include: (i) only one laser 852 that can interact with only one side of the busbar 1000 at a time, (ii) only one laser 852, but the light output from the laser is modified, using optics and mirrors, such that the laser can interact with both sides of the busbar 1000 at the same time, or (iii) two lasers 852, 854 that are not aligned.

Figure 32A:
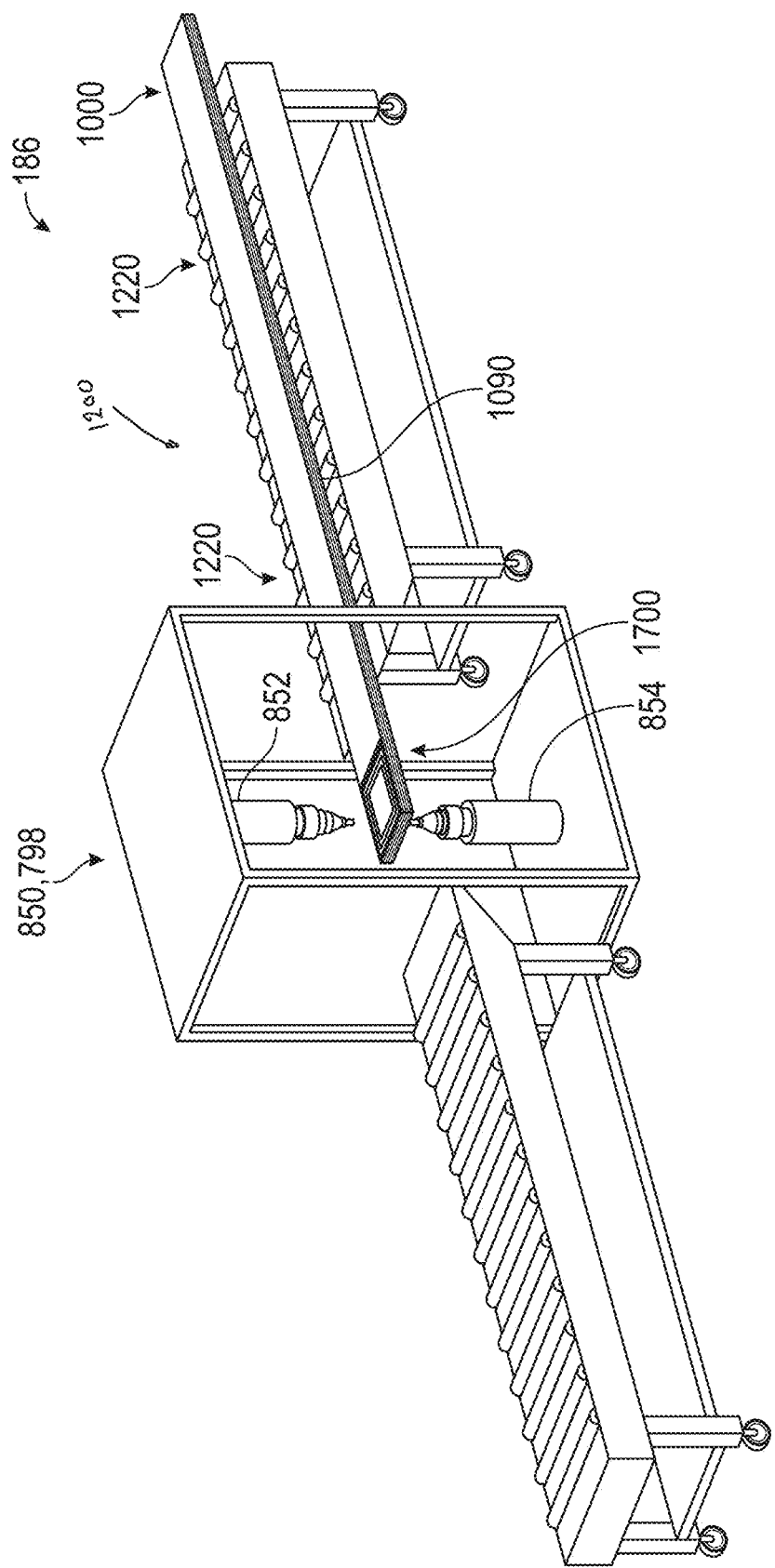
FIG. 32A shows laser welding machines welding an end of the busbar based upon the combined fusion patterns associated with the selected design.
Figure 32B:
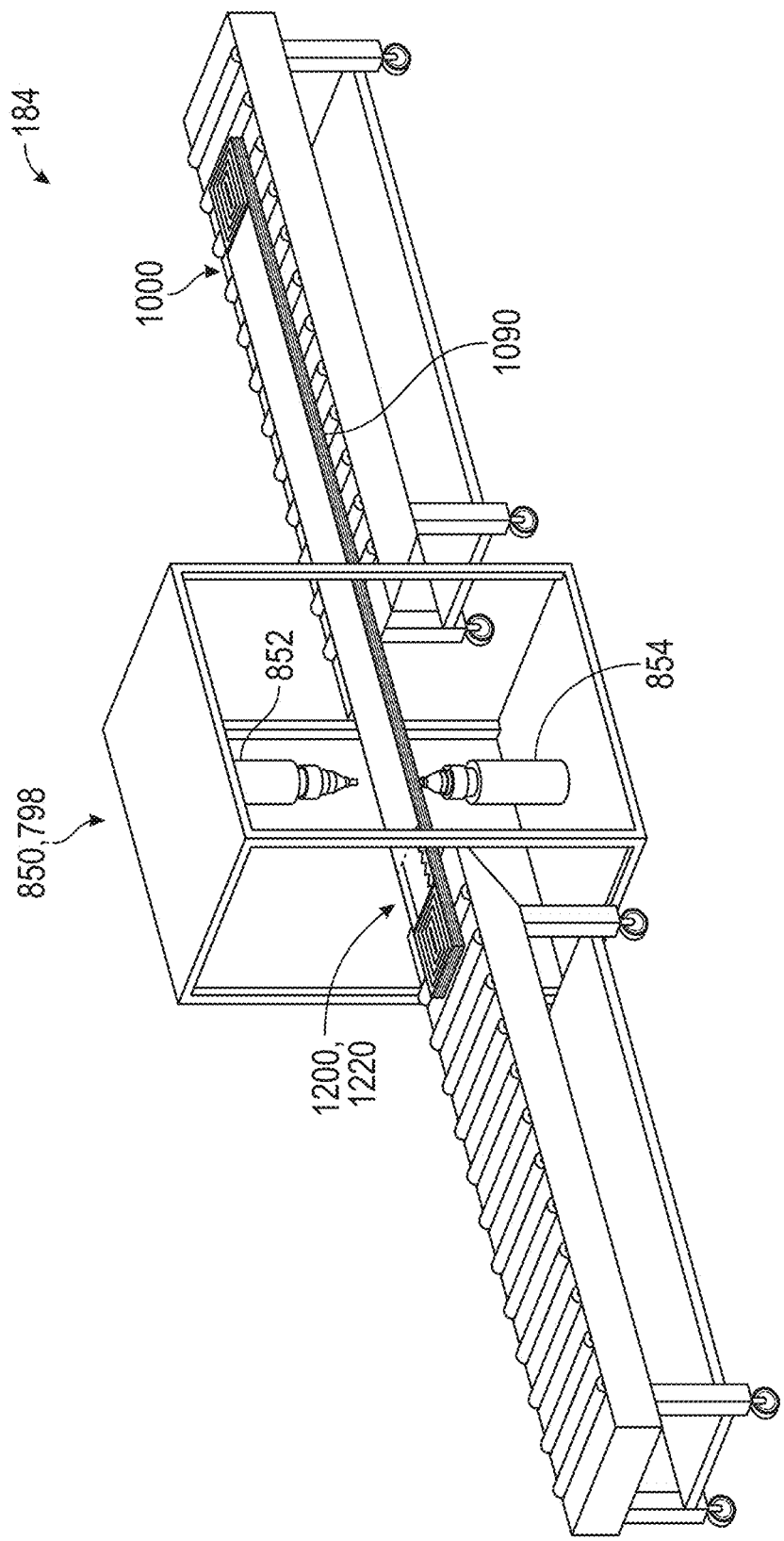
FIG. 32B shows a laser welding machine welding the intermediate portion of the busbar based upon the combined fusion pattern associated with the selected design.
Figure 32C:
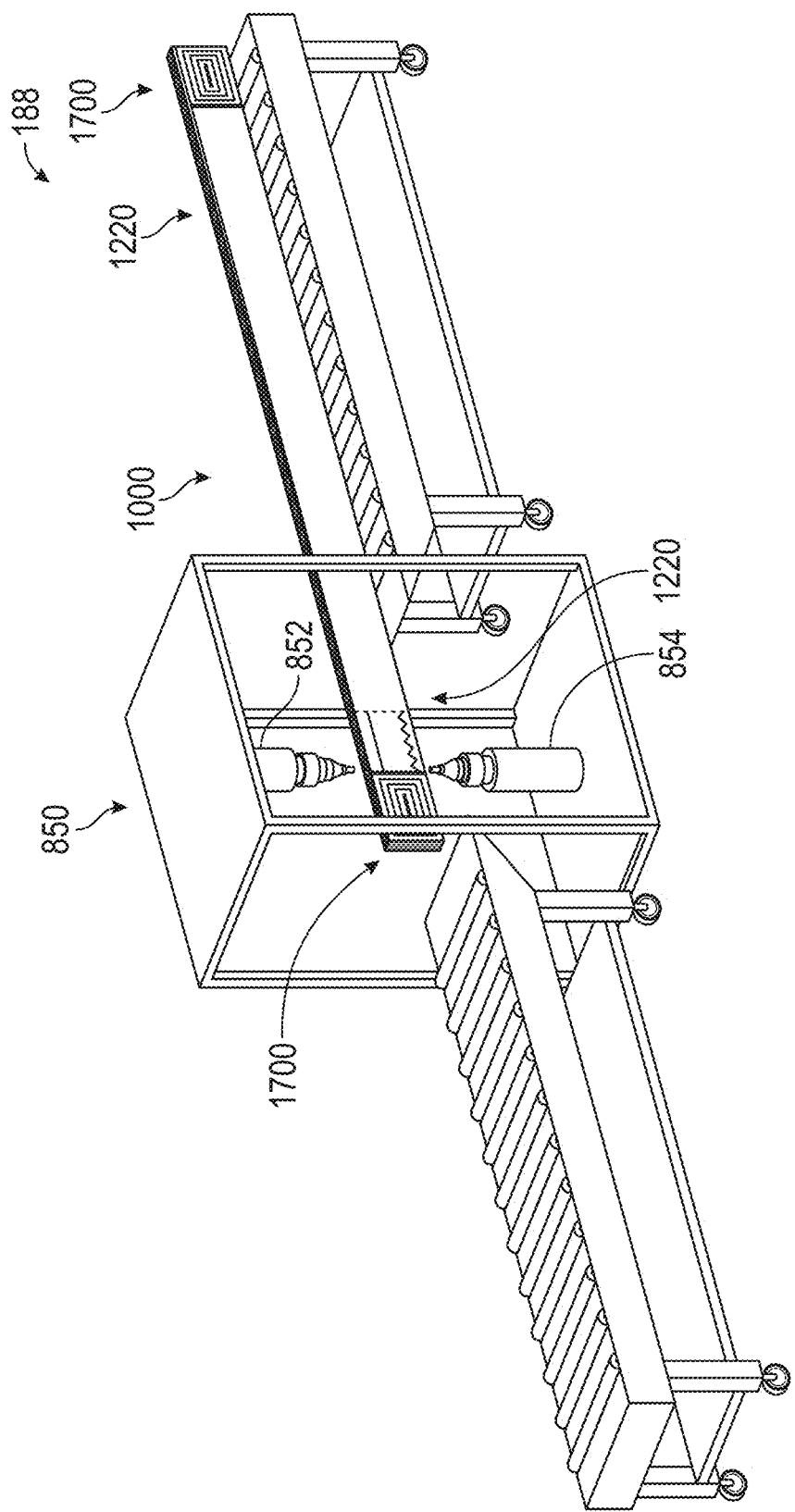
FIG. 32C shows a laser welding machine welding the edges of the busbar based upon the combined fusion pattern associated with the selected design.
Figure 33:
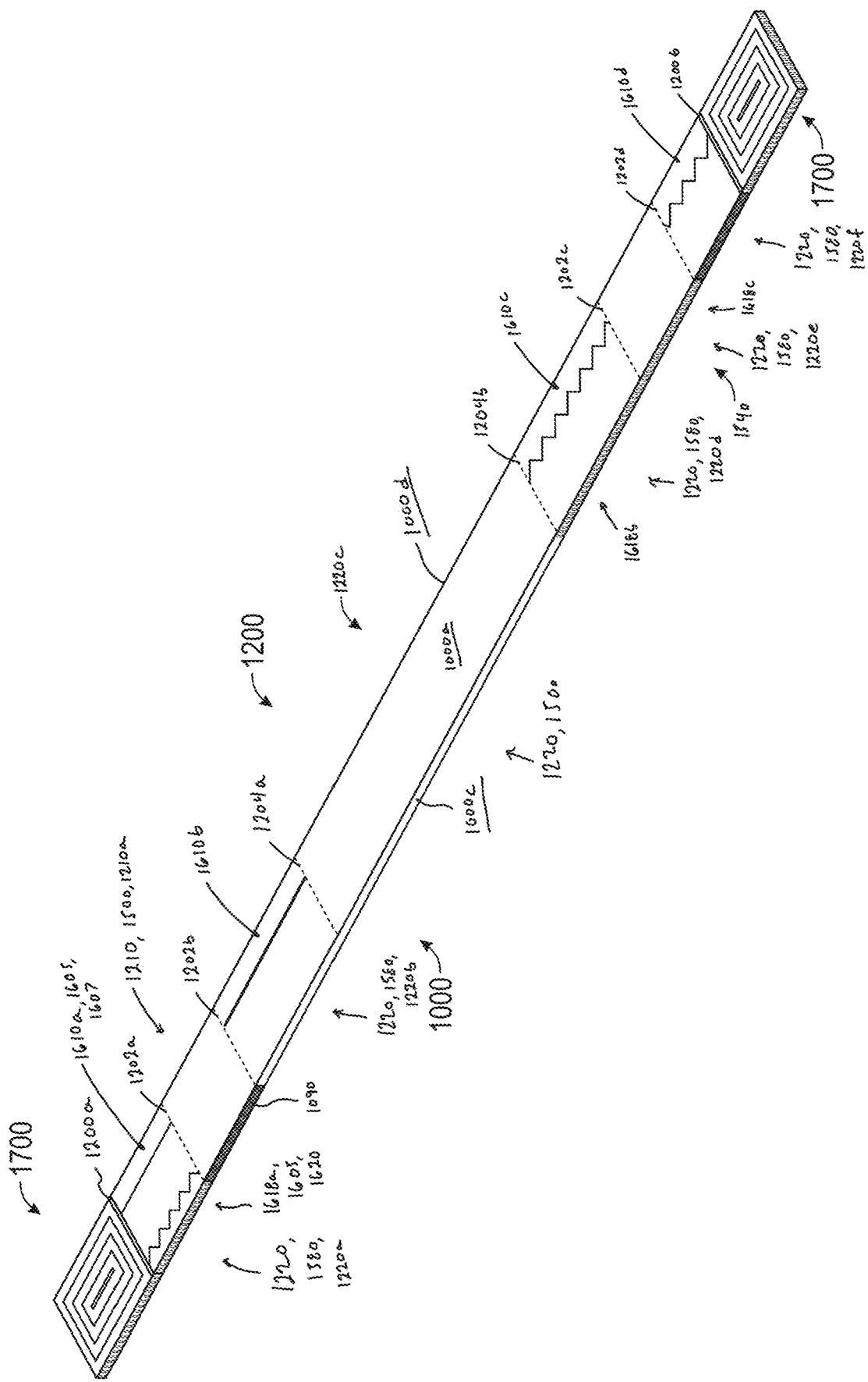
FIG. 33 is a perspective view of the busbar with fused segments and unfused segments.

As shown in FIGS. 32A-32C, after the designer acquires or obtains access to the laser welding machine 850, the designer will: (i) insert the conductors 1090 that have been arranged according to the engineering model 100 into the machine and (ii) load in the engineering model 100. The laser welding machine 850 will then perform the weldment process that is described in the engineering model 100. For example, FIG. 33A shows the busbar 1000 positioned "flat" where its width resides in a plane that is oriented substantially perpendicular to the lasers 852, 854 and the end portions 1700 of the busbar 1000 are welded 1600 according to fusion pattern 400a, 400b shown in FIG. 29A-29D. After the laser welding machine 850 performs the weldment process in step 184, the machine 850 may fuse the intermediate portion 1200 of the busbar 1000 according to the engineering model 100 in step 186. In particular, this step is shown in FIG. 33C, the busbar 1000 remains flat and the intermediate portions 1200 of the busbar 1000 is surface welded 1607 according to the fusion patterns 310a-310f including in the intermediate fusion pattern 300. Next, as shown in FIG. 33C, the busbar 1000 is positioned "on an edge" where its width resides in a plane that is generally aligned with the lasers 852, 854 whereupon the laser welding machine 850 creates edge welds 1620 based upon the fusion patterns 310a-310f including in the intermediate fusion pattern 300. In creating this fused segment 1220, the designer/manufacture has increased the rigidity or stiffness of the segment 1220 as compared to prior to the welding process 1600 being performed on that segment 1220.

The fabrication steps 184, 186, 188 lead to the formation of the busbar 1000 shown in FIGS. 33-54 and 64-70 based on the engineering model 100 shown in FIGS. 29A-29D. It should be understood that busbar 1000 is an exemplary embodiment of the inventive busbar and that other embodiments are disclosed in this application and are contemplated by this disclosure. FIGS. 33-54 and 64-70 show that the busbar 1000 includes: (i) an intermediate portion 1200 and (ii) two end portions 1700. The intermediate portion 1200 extends between end boundary lines 1200a, 1200b, while the end portions 1700 extends outward from end boundary lines 1200a, 1200b. The intermediate portion includes: (i) one unfused segment 1210, and (ii) six fused segments 1220. The fused segments 1220 extend between: (i) the left and right edges 1000c, 1000d of the conductors 1090, and (ii) the following lines, which include (a) a first end boundary line 1200a and a first intermediate boundary line 1202a, (b) a second intermediate boundary line 1202b and a first central boundary line 1204a, (c) the first central boundary line 1204a and a second central boundary line 1204b, (d) the second central boundary line 1204b and a third intermediate boundary line 1202c, (e) the third intermediate boundary line 1202c and a fourth intermediate boundary line 1202d, and (f) the fourth intermediate boundary line 1202d and a second end boundary line 1200b. Meanwhile, the unfused segment 1210 extend between the first intermediate boundary line 1202a and the second intermediate boundary line 1202b. As shown in the Figures, the unfused segment 1210 does not include a fusion process 1600 (e.g., weld 1605 or cold form 1640) and as such the individual conductors 1090 are visible from the edge of the busbar 1000.

Figure 19:
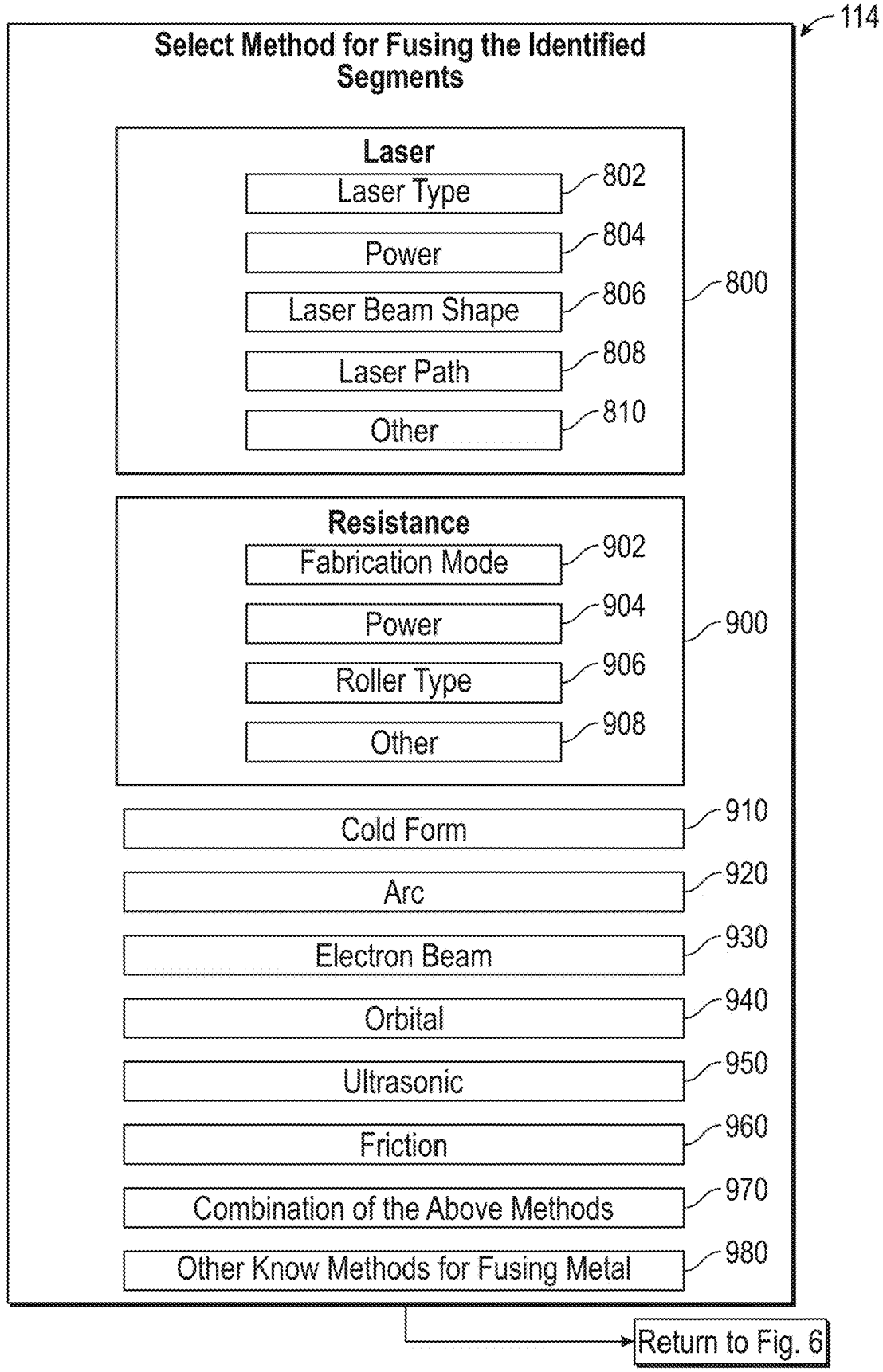
FIG. 19 is a flowchart showing different methods that can be used to fuse the identified segments of the busbar.

As shown in the Figures, each of the fused segments 1220 is processed using a fusion process 1600. Exemplary disclosure of said fusion process 1600 includes: (i) weldments 1605 (e.g., surface weldments 1607 or edge weldments 1620), (ii) cold forming process 1640, and (iii) other processes disclosed in FIG. 19. The surface weldments 1607 are based upon the intermediate fusion pattern 300, more specifically the segment fusion patterns 310a, 310b, 310d, 310f, and most specifically the top, bottom, left, and/or right fusion patterns 330a, 330b, 330d, 330f, 332f (shown in FIGS. 29C-29D), while the edge weldments 1620 are based upon the intermediate fusion pattern 300, more specifically the segment fusion patterns 310a, 310b, 310d, 310e, and most specifically the left and/or right fusion patterns 350a, 350d, 350e, 352a, 352b, and 352e (shown in FIGS. 29C-29D). Additionally, the cold formed edges are based upon the intermediate fusion pattern 300, more specifically the segment fusion patterns 310b, 310c and most specifically the left and/or right fusion patterns 350b, 350c, 352c (shown in FIGS. 29C-29D). Said edge welds 1620 and cold forming 1640 make the individual conductors 1090 un-viewable from the edge of the busbar 1000.

Figure 24:
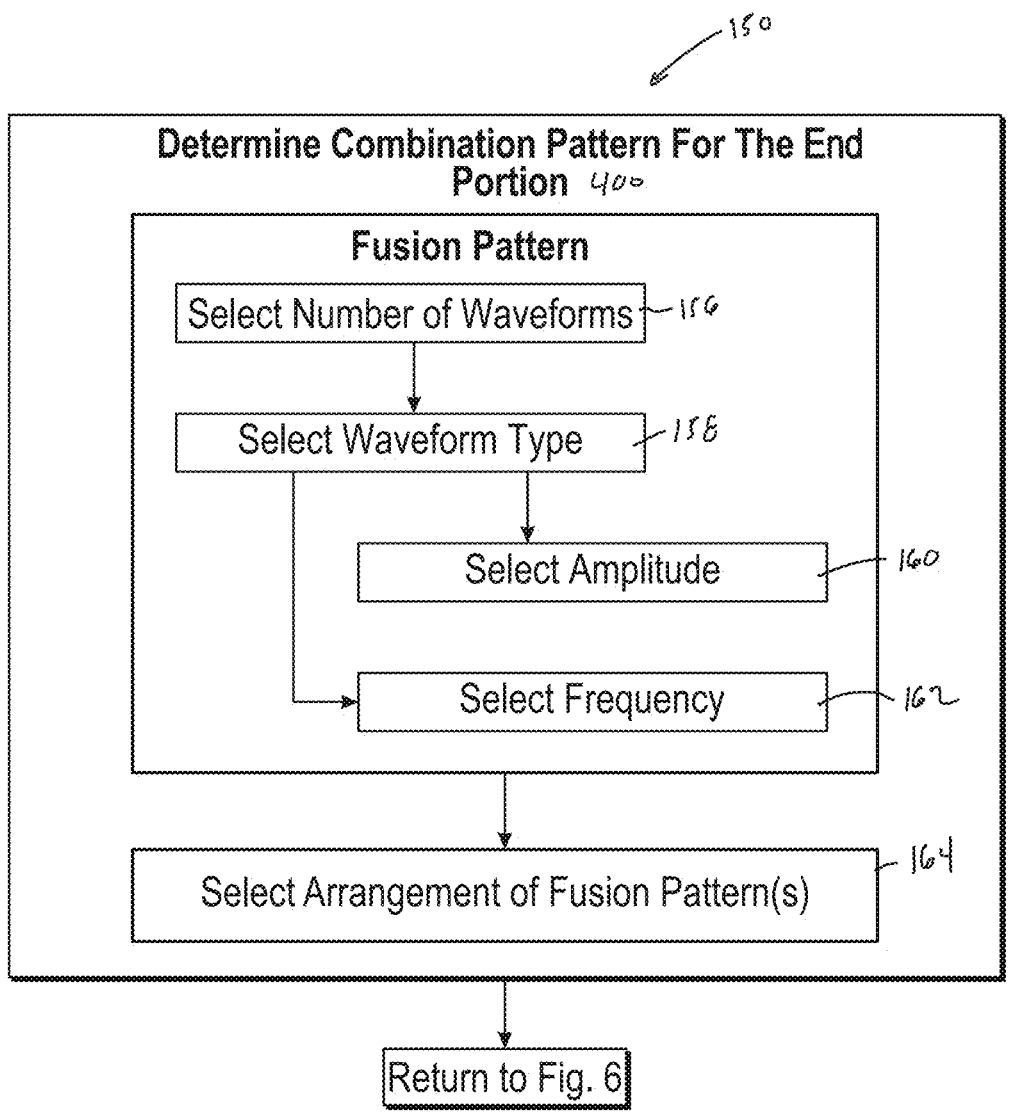
FIG. 24 is a flowchart for creating the combined fusion pattern for the end portion(s) of the busbar.

As identified above, each of the top fusion patterns 330a, 330b, 330d, 330f include at least a single waveform 370 (e.g., 372, 374) that is used to generate the top or upper surface partial penetration weldment 1610a, 1610b, 1610c, 1610d that extend downward from an upper surface 1000a of the busbar 1000. Likewise, the bottom fusion pattern 332f include at least a single waveform 370 (e.g., 374) that is used to generate the bottom or lower surface partial penetration weldment 1614a that extend upward from a lower surface 1000b of the busbar 1000. Additionally, each of the right fusion patterns 350a, 350d, 350e include at least a single waveform 370 (e.g., 372) that is used to generate the right lateral partial penetration weldment 1618a, 1618b, 1618c that extend inward from a right edge 1000c of the busbar 1000. Furthermore, each of the left fusion patterns 352a, 352b, and 352e include at least a single waveform 370 (e.g., 372) that is used to generate the left lateral partial penetration weldment 1622a, 1622b, 1622c that extend inward from a left edge 1000d of the busbar 1000. Also, each of the right fusion patterns 350b, 350c include at least a single waveform 370 that is used to generate the right cold form fusion 1644a, 1644b that extends inward from a right edge 1000c of the busbar 1000. Finally, the left fusion pattern 352c include at least a single waveform 370 that is used to generate the left cold form fusion 1648a that extends inward from a left edge 1000d of the busbar 1000. While the waveforms 372, 374 in this embodiment are angular and straight lines, the selected laser path included the oscillating circular path 832 (see FIG. 24A).

As shown in the Figures, the segment fusion patterns 310a-310f selectively include the top, bottom, left and/or right edge fusion patterns 330, 332, 350, 352. This selective inclusion creates fused segments 1220 that may not include fusion 1600 (e.g., weldments 1605 or cold formed 1640) on: (i) one, two, three, or four sides 1000a, 1000b, 1000c, 1000d of the busbar 1000. The weldments process 1605 or cold formed process 1640 solidifies some but not all of the linear extents of the conductors 1090 contained in the zone 1300, 1400. Finally, the unfused regions 1210 have not undergone a weldment process and thus none of the busbar 1000 is solidified into a single conduction. Further, the end portions 700 were created using a weldment process 1605 generated based on the top fusion pattern 402a, 402b and bottom fusion pattern 404a, 404b of the end fusion pattern 400a, 400b (see FIGS. 30A-30D). Here, the top fusion pattern 402a, 402b and bottom fusion pattern 404a, 404b include concentric rectangles.

FIGS. 40-53 show cross-sectional views of the busbar 1000. Cross-sectioning this busbar 1000 along lines 41-41, 43-43, 45-45, 47-47, 49-49, 51-51, and 53-53 shows that: (i) welds 1600—namely, surface welds 1607 and specifically upper surface welds 1610a, 1610b, 1610c, 1610d and lower surface welds 1614a—create partially solidified regions 1320 in the fused segments 1220 of the intermediate portion 1200 of the busbar 1000, (ii) welds 1600—namely, edge welds 1620 and specifically right edge welds 1618a, 1618b, 1618c and left edge welds 1622a, 1622b, 1622c—create laterally solidified regions 1420 in the fused segments 1220 of the intermediate portion 1200 of the busbar 1000, (iii) cold forming 1640—namely, edge cold forming 1642 and specifically right edge cold forming 1644a, 1644b and left edge cold forming 1648a—create laterally solidified regions 1420 in the fused segments 1220 of the intermediate portion 1200 of the busbar 1000, and (iv) areas that did not undergo a fusion process 1600 (e.g., weldment 1605 or cold forming 1640) remain unsolidified 1215. Additionally, welds 1600—namely, surface welds 1607 and specifically upper surface welds 1610e, 1610f and lower surface welds 1614b, 1614c—create the fully solidified regions or densified regions 1225 in the end portion 1700 of the busbar 1000.

The partially solidified region 1320 is formed within the fused segment 1220 of the intermediate portion 200 because the weldment process 1605, 1607, 1610, 1614 combines some, but not all, of the conductors 1090 contained within partial solidification zone 1300 into a single consolidated conductor. Referring to FIG. 41, a partially solidified region 1320 extends from a first surface 1000a, 1000b of the busbar 1000 to a peak 1330 of the weld 1605, 1607, 1610, 1614. Wherein the weld peak 1330 is positioned at a point that is located: (i) laterally between outermost edges 1000c, 1000d of the fused segment 1220, and (ii) vertically between the first and second surfaces 1000a, 1000b of the busbar 1000 and preferably an appreciable distance inward from the first and second surfaces 1000a, 1000b. As such, the partially solidified region 1320 has an area defined by a height $H_{PSR}$ and a width $W_{PSR}$. In an exemplary embodiment, the height $H_{PSR}$ may be between 0.5 mm to 2.25 mm, preferably between 1 mm to 2 mm, and most preferably between 1.5 mm and 2 mm. As shown in the Figures, the surface weld height or height of the partially solidified region $W_{PSR}$ varies between the plurality of fused segments 1220. However, in other embodiments the surface weld height or height of the partially solidified region $W_{PSR}$ may: (i) remain constant in a fused segment 1220, (ii) may vary in a fused segment 1220, (iii) remain constant across a plurality of fused segments 1220, and/or (iv) may vary across a plurality of fused segments 1220.

The partial solidification zone 1300 is an extent of the busbar 1000 that extends between the top surface 1000a and the bottom surface 1000b that has undergone a vertical partial penetration weldment process 1607, 1610, 1614. The partial solidification zone 1300 has a height $H_{PSZ}$ that extends between the first and second surfaces 1000a, 1000b. Stated another way, the partial solidification zone 1300 has a height $H_{PSZ}$ that is equal to height $H_F$ of the fused segment 1220 and is greater than a weld depth or partially solidified height $H_P$. The partial solidification zone 1300 has a width $W_{PSZ}$ that is equal to at least the diameter or cross-sectional width $W_{PSR}$ of the partially solidified region 1320. In an exemplary embodiment, the height $H_{PSZ}$ is 2.5 mm. The partially solidified height $H_{PSR}$ is less than both partial solidification zone 1300 height $H_{PSZ}$ and fused segment 1220 height $H_F$. Because partially solidified height $H_{PSR}$ is less than the fused segment height $H_F$, an unsolidified region 1215 is formed between the weld peak 1330 and the second surface 1000a, 1000b of the busbar 1000. This unsolidified region 1215 has an unsolidified height Hu, which extends between the second surface 1000a, 1000b and the peak 1330 of the weld 1605, 1607. The unsolidified height Hu is typically at least 10% of fused segment height $H_F$ and is preferably between 20% and 60% of fused segment height $H_F$. On the other hand, partially solidified height $H_{PSR}$ is equal to at least 10% of the fused segment height $H_F$, is preferably between 35% and 80% of the fused segment height $H_F$, and is most preferably between 45% and 70% of the fused segment height $H_F$.

In this exemplary embodiment, a partially solidified region 1320 may be created by solidifying between two and nine conductors 1090 into a single conductor. Here, FIG. 41 shows that approximately seven of the ten conductors 1090 are solidified in the partially solidified region 1320. In other words, not all—approximately three—of the conductors 1090 are not solidified and thus these conductors 1090 are in the unsolidified region 1215. Stated another way, the intermediate portion 1200 of the busbar 1000 includes a plurality of conductors 1090 that traverse or spans the intermediate portion 1200 of the busbar 1200. The fused segment 1220 of the intermediate portion 1200 contains a partial solidification zone 1300 that extends between the upper most surface 1000a of the plurality of conductors 1090 and the lowermost surface 1000b of the plurality of conductors 1090. A majority of the extents of the conductors 1090 contained within this partial solidification zone 1300 have been solidified into a single consolidated conductor to form a partially solidified region 1320. Likewise, a minority of the extents of the conductors 1090 contained within this partial solidification zone 1300 are unsolidified and form an unsolidified region 1215.

Based on the above described heights and widths, the busbar 1000 includes the following relationships: (i) width $W_{PSR}$ of the partially solidified region 1320 is substantially equal to the width $W_{PSZ}$ of the partially solidification zone 1300, and (ii) the height $H_{PSR}$ of the partially solidified region 1320 is less than to the height $H_{PSZ}$ of the partially solidification zone 1300, wherein the height $H_{PSR}$ is at typically less than 80% of the height $H_{PSZ}$ and preferably the height $H_{PSR}$ is between 20% (i.e., (1−(2 mm/2.5 mm))*100) and 90% (i.e., (1−(0.25 mm/2.5 mm))*100) of the width $W_{PSZ}$. Additionally, the width of the surface weld 1607 is substantially equal to the width $W_{LSR}$ of the partially solidification region 1320, and the height of the surface weld 1607 is substantially equal to height $H_{PSR}$ of the partially solidified region 1320. As such, the width of the surface weld 1607 is substantially equal to the width $W_{PSZ}$ of the partially solidification zone 1300, and the height of the surface weld 1607 is less than to the height $H_{PSZ}$ of the partially solidification zone 1300.

As best shown in FIGS. 41, 45, 49, and 53, the partially solidified region 1320 contains varying fusing density, wherein a first or inner zone 1630 has a first fusing density and the second or outer zone 1632 has a fusing second density that is less than the first fusing density. The differences in density result from the configuration and operating conductions of the laser welding machine 850, where the laser beam loses strength as it penetrates into the busbar 1000. The less dense zone 1632 is created at a certain distance outward of the center of the weld 1600 or beyond the more dense zone 1630. It should be understood that this second zone 1632 may have a fusing density gradient, where it has a higher fusing density closest to the first zone 1630 and the lowest fusing density at a furthest point away from the first zone 1630. It also should be understood that the fusing density may be consistent or substantially consistent within this first zone 1630. Additional aspects of the partially solidified region 1320 and unsolidified region 1215 are presented in the definitions section at the outset of the detailed description.

In a first non-limiting example, the settings that may be used in connection with the laser welding machine 850, for a busbar 1000 that includes 10 copper conductors 1090 having a height or thickness $H_C$ that is equal to 0.01 inches or 0.254 mms, are: (i) laser type is a fiber laser, (ii) power of the laser is 2000 W, (iii) laser beam shape is a central core, (iv) there is no laser path, and (v) cycle time is set to 0.116 seconds. These settings for the machine 850 form a partially solidified region that extends approximately 56% of the way into the busbar 1000 and has a diameter of approximately 0.24 mm at its widest point. In another example, the settings that may be used in connection with the machine 850 for a busbar 1000 that includes 10 copper conductors 1090 having a height $H_C$ that is equal to 0.01 inches or 0.254 mm, are: (i) laser type is a fiber laser, (ii) power of the laser is 5000 W, (iii) laser beam shape is a central core with a ring, wherein the core has a power of 1500 W and the ring has a power of 3500 W, (iv) there is no laser path, and (v) cycle time was set to 0.079 seconds. These settings for the machine 850 form a partially solidified region 1320 that extends approximately 77% of the way into the busbar 1000 and has a diameter of approximately 0.732 mm at its widest point. In another example, the settings that may be used in connection with the machine 850, for a busbar 1000 that includes 10 copper conductors 1090 having a height $H_C$ that is equal to 0.01 inches or 0.254 mms, are: (i) laser type is a fiber laser, (ii) power of the laser is 5000 W, (iii) laser beam shape is a central core with a ring, wherein the core has a power of 1500 W and the ring has a power of 3500 W, (iv) there is no laser path, and (v) cycle time was set to 0.158 seconds. These settings for the machine 850 form a partially solidified region that extends approximately 79% of the way into the busbar 1000 and has a diameter of approximately 0.732 mm at its widest point.

In addition to containing the partially solidified regions 1320, the fused segment 1220 within the intermediate portion 1200 of the busbar 1000 contains unsolidified region(s) 1215. As shown in the Figures, a majority of the volume $V_{FS}$ contained within the fused segment 1220 contains unsolidified region(s) 1215. The substantial volume $V_U$ of the unsolidified region(s) 1215 ensures that the busbar 1000 has properties that include attributes of rigid busbars 10 and flexible busbars 20. It should be understood that FIGS. 40-53 only show partially solidified regions 1320 because the designer has not utilized: (i) a weldment process 1605 in connection with top and bottom fusion patterns 330, 332 that include waveforms 370 that overlap one another, (ii) a weldment process 1605 in connection with top and bottom fusion patterns 330, 332 that include waveforms 370 that are positioned proximate to one another to cause the top and bottom weldment processes 1610, 1614 to merge with one another, nor (iii) a weldment process 1605 that causes all conductors 1090 to be fused to one another. Avoiding fully solidified regions 1225 in the intermediate portion 1200 or the busbar 1000 is desirable due to the possible introduction of failure points into the busbar 1000 (e.g., the domeing on these areas may causes hot spots that may causes failures in the insolation). Nevertheless, the designer may desire to form certain fully solidified regions in the intermediate portion 1200 or the busbar 1000 and they may do such by altering the fusion patterns, fusion method, and/or fusion settings.

Unlike the intermediate portion 1200, the end portions 1700 are intended to receive a connector and as such it is desirable for these areas to be fully solidified as a single consolidated conductor. All extents of the conductors 1090 contained in the fully solidified regions 1225 are solidified into a single conductor because a significant extent of the conductors 1090 are solidified downward from the top surface 1000a and a significant extent of the conductors 1090 are solidified upward from the bottom surface 1000b. Accordingly, these significant extents of the conductors 1090 meet between the top and bottom surfaces 1000a, 1000b, typically in the midpoint region between the two surfaces 100a, 100b, and form a fully solidified region 1225. The weld depth or fully solidification region 1225 height $H_{FSR}$ is at least substantially equal to the fused segment height $H_F$ of the busbar 1000. In certain exemplary embodiments, the fully solidified height $H_{FSR}$ may be greater than the fused segment height $H_F$ when weldment material is deposited onto one of the two surfaces 1000a, 1000b creating a "dome-effect". Because fully solidification region 1225 height $H_{FSR}$ is equal or greater than the fused segment height $H_F$, an unsolidified region 1215 is not formed between weldment 1605 and the second surface 1000a, 1000b of the busbar 1000. In other words, all of the intermediate extents of the conductors 1090 that are positioned within the full solidification zone are solidified into a single consolidated conductor. Additional aspects of the fully solidified region 1225 disclosed in PCT/US20/50016, wherein is hereby incorporated by reference. Like the partially solidified zone 1300, the fully solidified zone is an area of the busbar 1000, where the zone extends between the top surface 1000a and the bottom surface 1000b that has undergone a full weldment process. The full solidification zone has a height that extends between the first and second surfaces 1000a, 1000b. Stated another way, the full solidification zone has a height that is equal to fused segment height $H_F$ and may be equal to the fully solidified height $H_{FSR}$. Based on the disclosed weldments 1605, the end portions 1700 are welded in manner that causes these portions 1700 to be densified (enough solidified surface area to equal 120% of the busbar's 100 cross sectional area) such that they can be coupled to a connector.

As shown in FIGS. 40-53, the busbar 1000 includes multiple fused segments 1220, wherein each segment 1220 has a length, width, and height. The length extends between the boundary lines 1200a-1200b, 1202a-1202d, 1204a-1204b, the width extends between the edges of the busbar 1000c, 1000d, and the height extends between the top surface 1000a and bottom surface 100b. The length, width, and height dimensions of each segment 1220 collectedly define a fused segment volume $V_{FS}$ for that segment 1220. Said fused segment volume $V_{FS}$ for each segment 1220 can be summed together to determine the total fused segment volume $V_T$ for the intermediate portion 1200 of the busbar 1000. Each of the fused segment volumes $V_{FS}$: (i) contain a solidified volume $V_S$ (e.g., volume of the conductors 1090 that have been consolidated into a single conductor), and (ii) unsolidified volume $V_U$ (e.g., volume of the conductors 1090 that have not been consolidated into a single conductor), wherein the unsolidified volume $V_U$ typically surrounds the solidified volume $V_S$. In the busbar 1000 that is shown in FIGS. 40-53, the unsolidified region 1215 occupies a majority of each fused segment volume $V_{FS}$, while the combination of the partially solidified regions 1320 and the fully solidified regions 1225 occupy a minority of each fused segment volume $V_{FS}$. Additionally, the partially solidified regions 1320 occupies more of each fused segment volume $V_{FS}$ than the fused segment volume $V_{FS}$ (e.g., zero) that is occupied by the fully solidified regions 1225. Stated another way, the fully solidified region 1225 occupies less of each fused segment volume $V_{FS}$ than the fused segment volume $V_{FS}$ that is occupied by either of the partially solidified regions 1320 or unsolidified region 1215.

Further referring to the busbar 1000 that is shown in FIGS. 40-54, it should be understood that increasing the volume of the partially solidified regions 1320 within the fused segment 310 volume: (i) will increase at least the localized stiffness in the fused segment 1220, (ii) tends to increase the stiffness of the intermediate portion 1200 of the busbar 1000, and (iii) tends to increase the overall stiffness of the busbar 1000. For example, creating these partially solidified regions 1320 will increase the modulus Young's modulus of the busbar above 115 gigapascals (GPa) at room temperature. It should also be understood that increasing the volume of the fully solidified regions 1225 within the fused segment 310 volume: (i) will increase at least the localized stiffness in the fused segment 1220, (ii) tends to increase the stiffness of the intermediate portion 1200 of the busbar 1000, and (iii) tends to increase the overall stiffness of the busbar 1000. Increasing the volume of the fully solidified regions 1225 within the fused segment 310 volume should have a greater effect on these stiffness parameters, as compared as solely increasing the volume of the partially solidified regions 1320. Further, adding a partially solidified regions 1320 and/or fully solidified regions 1225 to fused segment 1220 having only an unsolidified region 1215 will increase the localized and overall stiffness of the fused segment 1220. Moreover, it should further be understood that increasing the volume of both the partially solidified regions 1320 and the fully solidified regions 1225 within the fused segment volume: (i) will increase at least the localized stiffness in the fused segment 1220, (ii) tends to increase the stiffness of the intermediate portion 1200 of the busbar 1000, and (iii) tends to increase the overall stiffness of the busbar 1000. Finally, it should be understood that increasing the volume of unsolidified region 1215 within the fused segment volume: (i) will increase at least the localized flexibility in the fused segment 1220, (ii) tends to increase the flexibility of the intermediate portion 1200 of the busbar 1000, and (iii) tends to increase the overall flexibility of the busbar 1000.

The laterally solidified regions 1420 are formed within the fused segment 1220 of the intermediate portion 200 because the fusion process 1600 (weldment process 1605, 1620, 1618, 1622 or cold forming process 1640, 1644, 1648) combines some, but not all, of the conductors 1090 contained within limited solidification zone 1400 into a single consolidated conductor. Referring to FIG. 41, a laterally solidified regions 1420 extends from a first edge 1000c, 1000d of the busbar 1000 to a peak 1430 of the fusion process 1600. Wherein the fused peak 1430 is positioned at a point that is located: (i) laterally between (a) midpoint 1000g between the outermost edges 1000c, 1000d of the fused segment 1220, and (b) the outermost edges 1000c, 1000d of the fused segment 1220, and (ii) vertically between (a) first surface 1000a and (b) a second surface 1000b of the busbar 1000. As such, the laterally solidified region 1420 has an area defined by a height $H_{LSR}$ and a width $W_{LSR}$. In an exemplary embodiment, the edge fusion width or width of the laterally solidified region $W_{LSR}$ is less than 0.4 mm, and most preferably between 0.01 mm and 0.35 mm. Attempting to increase the edge fusion width or width of the laterally solidified region $W_{LSR}$ beyond 0.4 mm for the disclosed embodiment may cause undesirable puddling near the edges 1000c, 1000d, as the busbar 1000 includes copper and ten conductors 1090 that have thicknesses of 0.25 mm. However, it should be understood that busbars 1000 that have other configurations or are made from other materials, said puddling may not occur until deeper weldments or may occur at a shallower weldment. As such, edge fusion width or width of the laterally solidified region $W_{LSR}$ for other embodiment may be between 0.05 mm to 5 mm, preferably between 0.1 mm to 2.5 mm, and most preferably between 0.1 mm and 0.75 mm.

The limited solidification zone 1400 is an extent of the busbar 1000 that: (i) extends from a midpoint 1000g between the outermost edges 1000c, 1000d of the fused segment 1220 to one of the outermost edges 1000c, 1000d, and (ii) has undergone a lateral fusion process 1600, which may be a lateral partial penetration weldment process 1607, 1610, 1614 or a lateral cold forming process 1640, 1644, 1648. The limited solidification zone 1400 has a height $H_{LSZ}$ that extends between the first and second surfaces 1000a, 1000b, and width $W_{LSZ}$ that extends between the midpoint 1000g between the outermost edges 1000c, 1000d of the conductors 1090. Stated another way, the limited solidification zone 1400 has: (i) a height $H_{LSZ}$ that is: (a) equal to height $H_F$ of the fused segment 1220, and (b) equal to or greater than a fusion depth or laterally solidified height $H_{LSR}$, and (ii) a width $W_{LSZ}$ that is: (a) equal to half (e.g., 10 mm) the width (e.g., 20 mm) of the busbar 1000, and (b) is greater that the lateral cross-sectional width $W_{LSR}$ of the laterally solidified region 1420.

As shown in FIG. 47, the edge fusion width or width of the laterally solidified region $W_{LSR}$ are: (i) consistent in each in each of the fused segments 1220 and (ii) consistent between the plurality of fused segments 1220. However, in other embodiments the edge fusion width or width of the laterally solidified region $W_{LSR}$ may: (i) remain constant in a fused segment 1220, (ii) may vary in a fused segment 1220, (iii) remain constant across a plurality of fused segments 1220, and/or (iv) may vary across a plurality of fused segments 1220. In particular, the edge fusion width or width of the laterally solidified region $W_{LSR}$ is between 0.05 mm and 0.4 mm and preferable 0.2 mm. Accordingly, the total fusion depth $W_T$ which is calculated by summing up the width of the laterally solidified region $W_{LSR}$ associated with the right and left edges, varies between the each of the plurality of fused segments 1220. As such, the first total fusion depth associated with fused section 1220 that extend between 1200a and 1202a is between 0.1 mm (i.e., 0.05 mm+0.05 mm) and 0.8 mm (i.e., 0.4 mm+0.4 mm) and preferable 0.4 mm. As such, the total fusion depth $W_T$ is between 0.5% and 4% of the busbar width (i.e., 20 mm).

Based on the above described heights and widths, the busbar 1000 includes the following relationships: (i) height $H_{LSR}$ of the laterally solidified region 1420 is substantially equal to the height $H_{LSZ}$ of the limited solidification zone 1400, and (ii) the width $W_{LSR}$ of the laterally solidified region 1420 is less than to the width $W_{LSZ}$ of the limited solidification zone 1400, wherein the width $W_{LSR}$ is at typically 50% less than the width $W_{LSZ}$ and is most preferably between 0.5% (i.e., (1−(9.95 mm/10 mm))*100) and 4% (i.e., (1−(9.6 mm/10 mm))*100) of the width $W_{LSZ}$ of the limited solidification zone 1400. Additionally, the height of the edge weld 1620 is substantially equal to the height $H_{LSR}$ of the limited solidification region 1420, and the width of the edge weld 1620 is substantially equal to width $W_{LSR}$ of the laterally solidified region 1420. As such, the height of the edge weld 1620 is substantially equal to the height $H_{LSZ}$ of the limited solidification zone 1400, and the width of the edge weld 1620 is less than to the width $W_{LSZ}$ of the limited solidification zone 1400.

The laterally solidified region width $W_{LSR}$ is less than both the limited solidification zone 1400 width $W_{LSZ}$ and half the width of the busbar 1000. Because laterally solidified region width $W_{LSR}$ is less than half the width of the busbar 1000, an unsolidified region 1215 is formed between the fused peak 1430 and the midpoint 1000g of the busbar 1000. This unsolidified region 1215 has an unsolidified width $W_U$, which extends between the midpoint 1000g of the busbar 1000 and the fused peak 1430. The unsolidified width $W_U$ is typically at least 10% of fused segment height $H_F$ and is preferably between 50% and 99.9% of limited solidification zone 1400 width $W_{LSZ}$. On the other hand, laterally solidified region width $W_{LSR}$ is equal to at least 0.1% of the limited solidification zone 1400 width $W_{LSZ}$, is preferably between 1% and 10% of the limited solidification zone 1400 width $W_{LSZ}$, and is most preferably between 3% and 8% of the limited solidification zone 1400 width $W_{LSZ}$.

As shown in the Figures, a majority of the volume contained in the fused segment 1220 contains unsolidified region(s) 1215. The substantial volume of 1670 ensures that the busbar 1000 has properties that include attributes of rigid busbars 10 and flexible busbars 20. This unsolidified region 1215 has an unsolidified width $W_U$, which extends between the fusion peak 1430 and the middle 1000g of the busbar 1000. The unsolidified width $W_U$ is typically at least 10% of width $W_{LSZ}$ of the limited solidification zone 1400, is preferably 50% of the width $W_{LSZ}$ of the limited solidification zone 1400, and preferably the width $W_{LSR}$ is between 99.5% (i.e., (1−(0.05 mm/10 mm))*100) and 87.5% (i.e., (1−(0.4 mm/10 mm))*100) of the width $W_{LSZ}$ of the limited solidification zone 1400. It should be understood that in alternative embodiments, width $W_{LSR}$ of the laterally solidified region 1420 may be substantially equal to the width $W_{LSZ}$ of the limited solidification zone 1400, the height $H_{LSR}$ laterally solidified region 1420 may less than the height $H_{LSR}$ of the limited solidification zone 1400 (e.g., the edge weld 1618, 1622 may not extend to all conductors 1090 contained in the busbar 1000), and/or the unsolidified width $W_U$ may be zero.

In this exemplary embodiment, a laterally solidified regions 1420 may be created by solidifying a lateral extent of ten conductors 1090 into a single conductor. Stated another way, the intermediate portion 1200 of the busbar 1000 includes a plurality of conductors 1090 that traverse or spans the intermediate portion 1200 of the busbar 1200. The fused segment 1220 of the intermediate portion 1200 contains a limited solidification zone 1400 that extends between a midpoint 1000g between the outermost edges 1000c, 1000d of the conductors 1090, and (b) the outermost edges 1000c, 1000d of the conductors 1090. A minority of the extents of the conductors 1090 contained within this limited solidification zone 1400 have been solidified into a single consolidated conductor to form a laterally solidified regions 1420. Likewise, a majority of the extents of the conductors 1090 contained within this limited solidification zone 1400 are unsolidified and form an unsolidified region 1215.

As best shown in FIGS. 41, 45, 49, and 51, the laterally solidified regions 1420 contains varying fusing density when a lateral partial weldment process 1620 is used, wherein a first or exterior zone 1634 has a first fusing density and the second or interior zone 1636 has a fusing second density that is less than the first fusing density. The differences in density result from the configuration and operating conductions of the laser welding machine 850, where the laser beam loses strength as it penetrates into the busbar 1000. The less dense zone 1636 is created at a certain distance inward from edge of the weld 1600 or inward of the more dense zone 1634. It should be understood that this second zone 1636 may have a fusing density gradient, where it has a higher fusing density closest to the first zone 1634 and the lowest fusing density at a furthest point away from the first zone 1634. It also should be understood that the fusing density may be consistent or substantially consistent within this first zone 1634. In addition to solidifying the edges 1000c, 1000d of the busbar 1000, the lateral partial weldment process 1620 rounds off the corners of the busbar 1000. These rounded corners help reduce the probability that the conductors 1090 wear into or tear the insulation 1780. Additional aspects of the laterally solidified regions 1420 and unsolidified region 1215 are presented in the definitions section at the outset of the detailed description.

Figure 45:
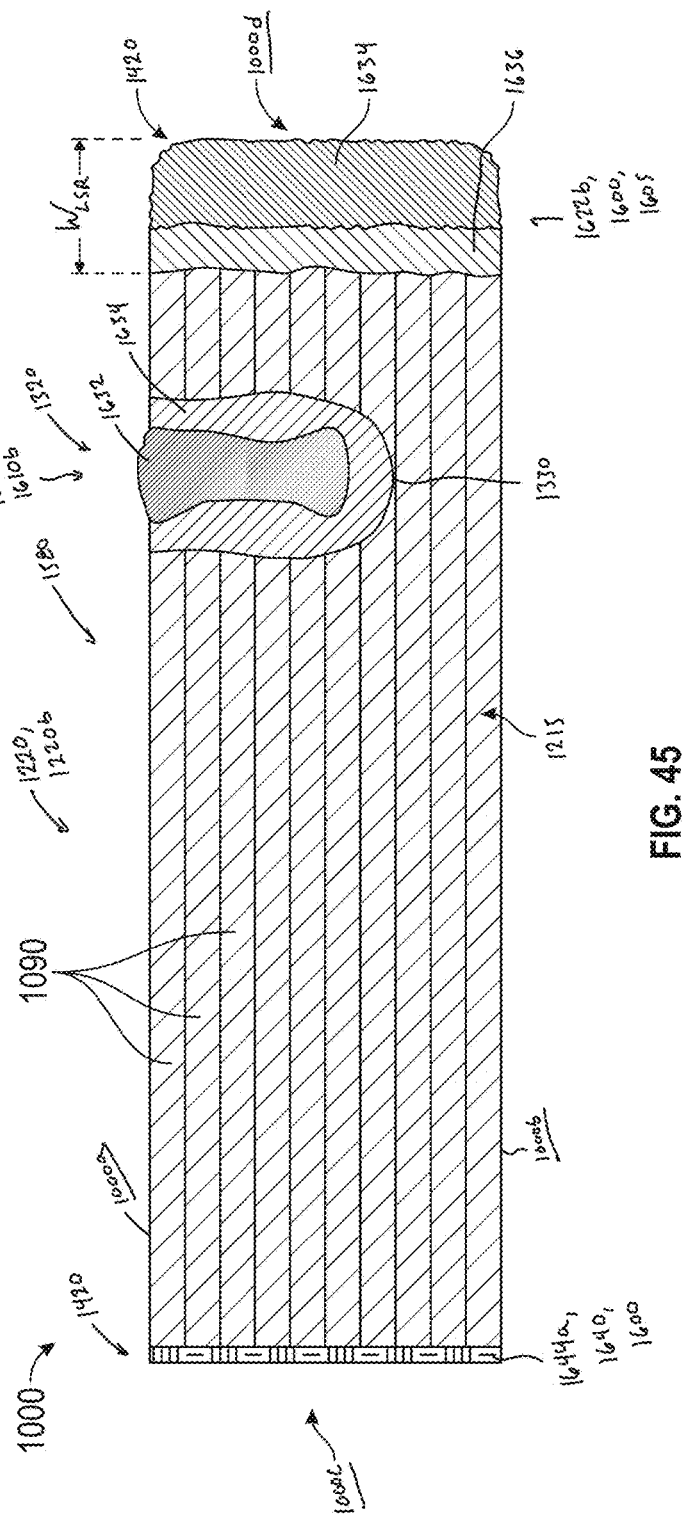
FIG. 45 is a cross-sectional view of the busbar taken along line 45-45 of FIG. 44 showing a fused segment including: (i) two laterally solidified regions, each being formed from a different fusion process, (ii) one partially solidified region, and (iii) an unsolidified region.

As best shown in FIGS. 45 and 47, the laterally solidified regions 1420 has a consistent fusing density because a cold forming process 1640 is utilized to form these regions 1420. Unlike the partial weldment processes 1605 that utilize a laser to fuse the conductors 1090 to one another, the cold forming process 1640 applies pressure to the conductors via a cylinder or press. However, unlike resistive welding, the cold forming process 1640 does not apply additional heat or electricity (e.g., over what is generated by the pressure from the forming process) to the busbar 1000. As such, the width $W_{LSR}$ of the laterally solidified regions 1420 that are formed using this cold forming process 1640 are substantially smaller than the width $W_{LSR}$ of the laterally solidified regions 1420 that are formed using the lateral partial weldment process 1620. For example, the width $W_{LSR}$ of the cold formed region may be between 0.01 mm and 0.1 mm, while the width $W_{LSR}$ of the lateral partial weldment region may be between 0.1 mm and 0.4 mm. As such, the busbar segments who's laterally solidified regions 1420 that are formed using this cold forming process 1640 are more flexible in comparison to the same busbar segment who's laterally solidified regions 1420 that are formed using the lateral partial weldment process 1620. Likewise, the busbar segments who's laterally solidified region 1420 is formed using the lateral partial weldment process 1620 is more rigid than the same busbar segment who's laterally solidified region 1420 is formed using the cold forming process 1640. Additionally, like the lateral partial weldment process 1620, it should be understood that the width $W_{LSR}$ of the laterally solidified regions 1420 that are formed using this cold forming process 1640 can: (i) remain constant in a fused segment 1220, (ii) may vary in a fused segment 1220, (iii) remain constant across a plurality of fused segments 1220, and/or (iv) may vary across a plurality of fused segments 1220. Varying the width $W_{LSR}$ of the laterally solidified regions 1420 that are formed using this cold forming process 1640 can be done by altering the pressure or amount of time that the pressure is applied to the busbar 1000.

In addition to containing the laterally solidified regions 1420, the fused segment 1220 within the intermediate portion 1200 of the busbar 1000 contains unsolidified region(s) 1215. As shown in the Figures, a majority of the volume $V_{FS}$ contained within the fused segment 1220 contains unsolidified region(s) 1215. The substantial volume $V_U$ of the unsolidified region(s) 1215 ensures that the busbar 1000 has properties that include attributes of rigid busbars 10 and flexible busbars 20. Further referring to the busbar 1000 that is shown in FIGS. 40-54, it should be understood that increasing the volume of the laterally solidified regions 1420 within the fused segment 310 volume: (i) will increase at least the localized stiffness in the fused segment 1220, (ii) tends to increase the stiffness of the intermediate portion 1200 of the busbar 1000, and (iii) tends to increase the overall stiffness of the busbar 1000. For example, creating these laterally solidified regions 1420 will increase the modulus Young's modulus of the busbar above 115 gigapascals (GPa) at room temperature. Further, adding a laterally solidified regions 1420 to fused segment 1220 having only an unsolidified region 1215 will increase the localized and overall stiffness of the fused segment 1220. Finally, it should be understood that increasing the volume of unsolidified region 1215 within the fused segment volume: (i) will increase at least the localized flexibility in the fused segment 1220, (ii) tends to increase the flexibility of the intermediate portion 1200 of the busbar 1000, and (iii) tends to increase the overall flexibility of the busbar 1000.

Figure 40:
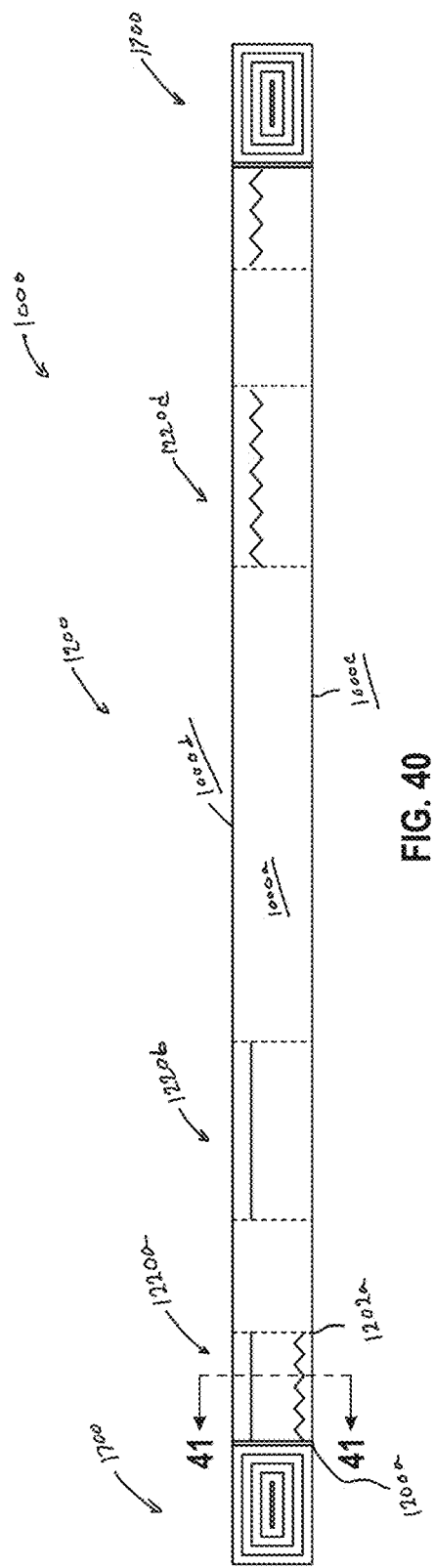
FIG. 40 is a top view of the busbar of FIG. 33.
Figure 64:
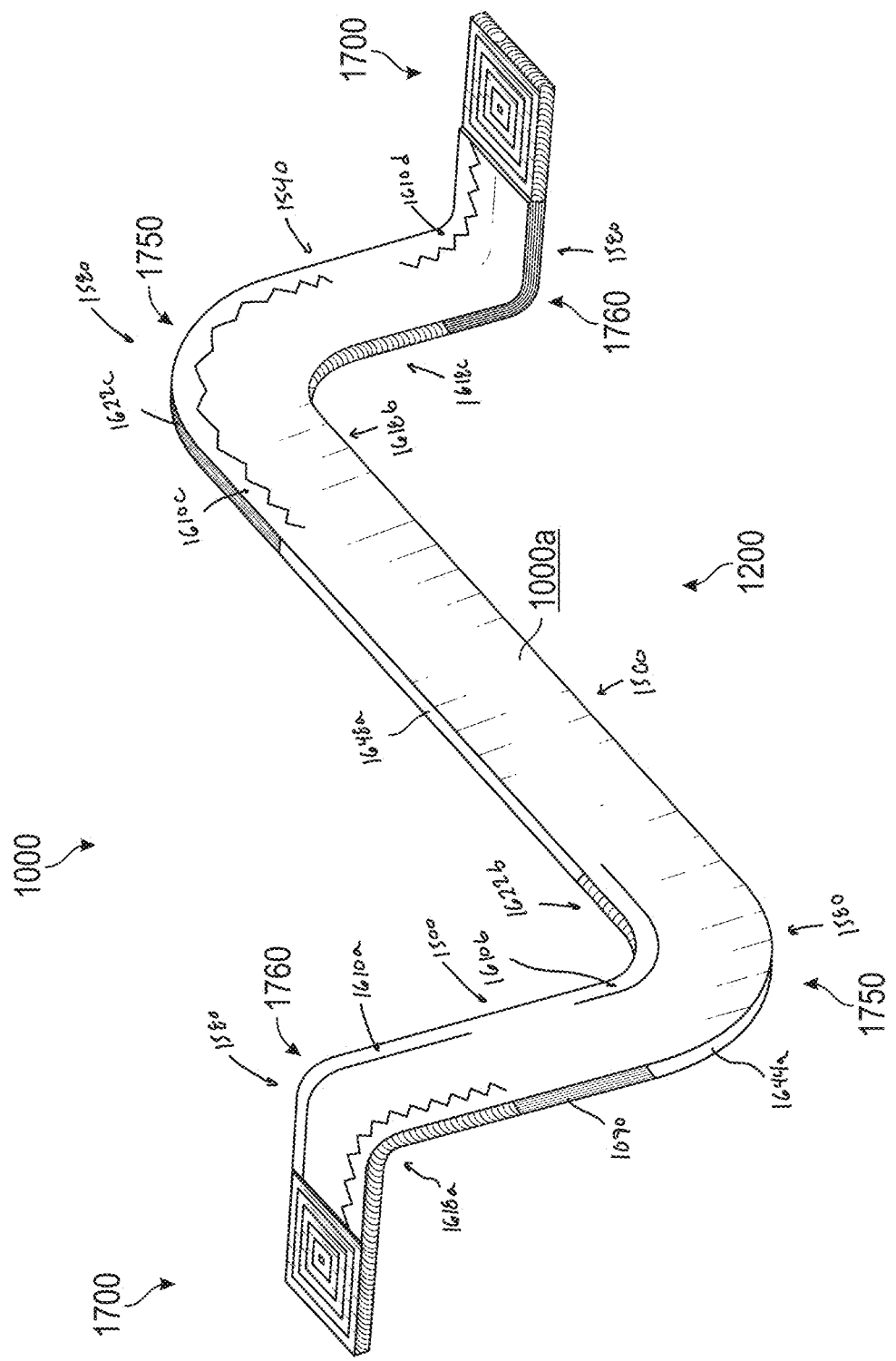
FIG. 64 is a perspective view of the busbar with fused segments and unfused segments, the busbar being in a bent configuration and the insulation removed.
Figure 65:
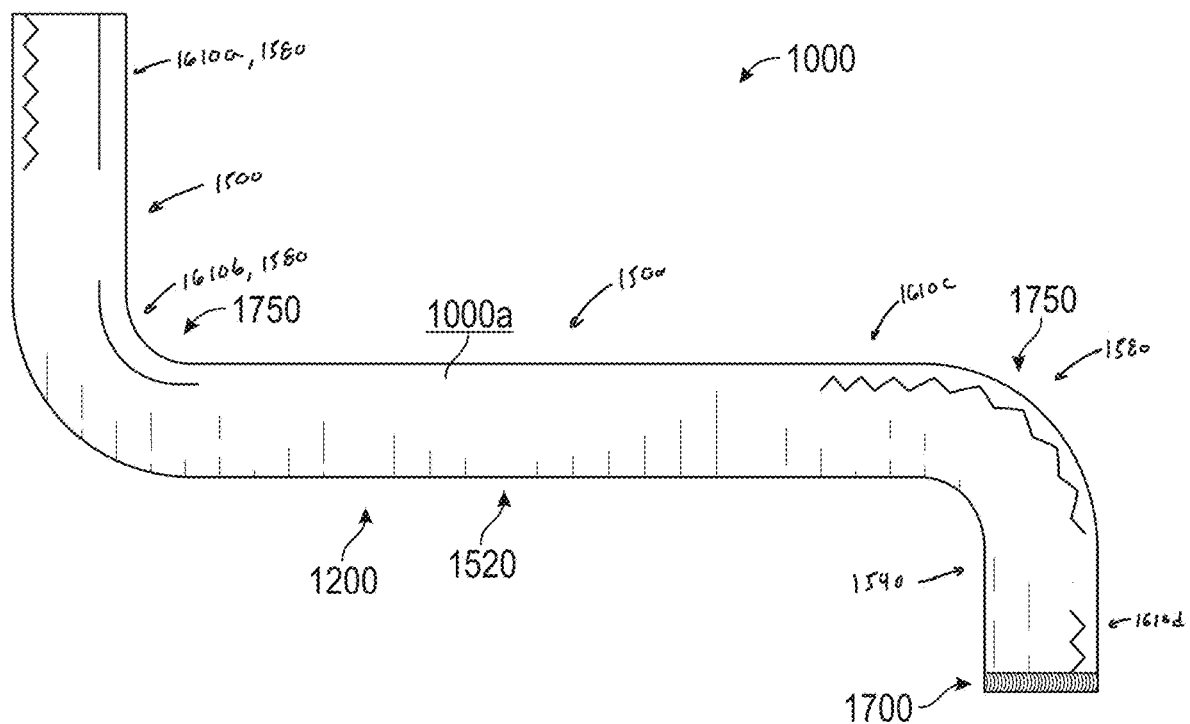
FIG. 65 is a first end view of the busbar of FIG. 64.
Figure 66:
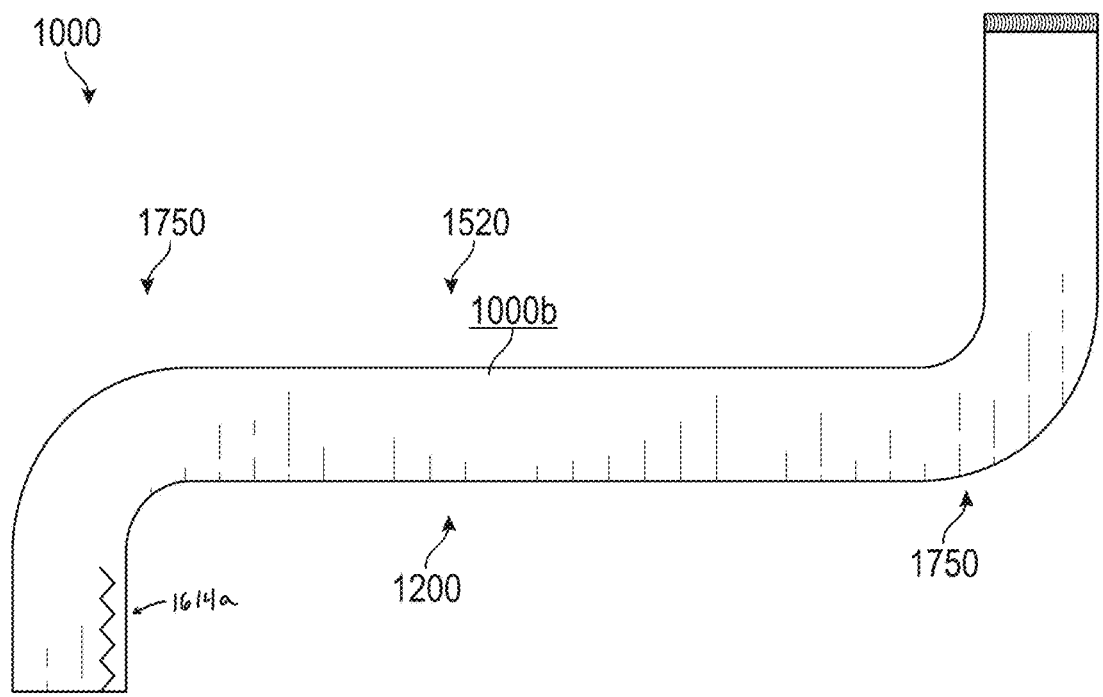
FIG. 66 is a second end view of the busbar of FIG. 64.

FIGS. 40-41 show a cross-sectional view of the busbar 1000 taken along section plane defined by line 41-41 of FIG. 40 and revealing multiple regions that have been partially solidified. In particular, FIGS. 40-41 focus on a first fused segment 1220a that extends between the first end boundary line 1200a and the first intermediate boundary line 1202a. This first fused segment 1220a includes: (i) two partially solidified regions 1320 that are formed using the upper surface partial penetration weldment 1610a that extend downward from an upper surface 1000a of the busbar 1000, (ii) two laterally solidified regions 1420 that are formed using the right and left lateral partial penetration weldment 1618a, 1622a that extend inward from the edges 1000c, 1000d of the busbar 1000, and (iii) an unsolidified region 1215 that surrounds the two partially solidified regions 1320 and two laterally solidified regions 1420. As such, this fused segment 1220a forms a bend section 1580 and in fact is bent out-of-plane 1760, as shown in FIG. 64.

FIGS. 42-43 show a cross-sectional view of the busbar 1000 taken along section plane defined by line 43-43 of FIG. 42 and revealing a plurality of conductors 1090 that do not include a solidified region. In particular, FIGS. 42-43 focus on a first unfused segment 1210a that extends between the first intermediate boundary line 1202a and the second intermediate boundary line 1202b. This first unfused segment 1210a only includes an unsolidified region 1215. As such, this unfused segment 1210a forms a flexible section 1500 and is not bent and is not designed to withstand harsh handling forces, as shown in FIG. 64.

Figure 44:
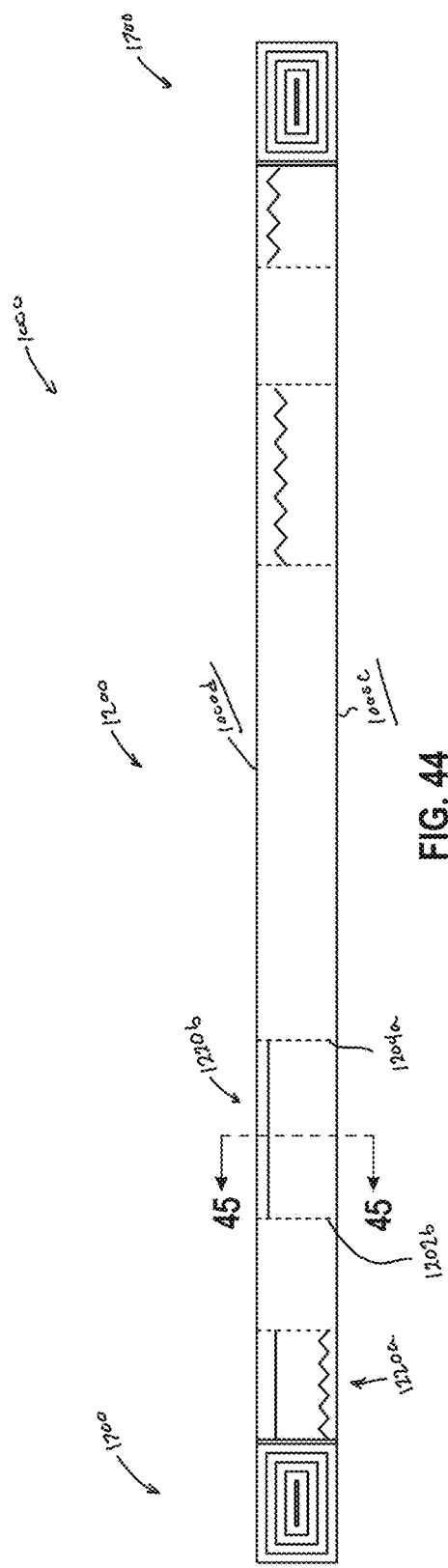
FIG. 44 is a top view of the busbar of FIG. 33.

FIGS. 44-45 show a cross-sectional view of the busbar 1000 taken along section plane defined by line 45-45 of FIG. 44 and revealing multiple regions that have been partially solidified. In particular, FIGS. 44-45 focus on a second fused segment 1220a that extends between the second intermediate boundary line 1202b and the first central boundary line 1204a. This second fused segment 1220b includes: (i) one partially solidified region 1320 that is formed using the upper surface partial penetration weldment 1610b that extend downward from an upper surface 1000a of the busbar 1000, (ii) two laterally solidified regions 1420, wherein one is formed using a left lateral partial penetration weldment 1622b that extend inward from the left edge 1000c of the busbar 1000 and the other is formed using a right cold formed fusion process 1644a that solidifies extends of the busbar 1000 right edge 1000c, and (iii) an unsolidified region 1215 that surrounds the partially solidified region 1320 and two laterally solidified regions 1420. As such, this second fused segment 1220b forms a bend section 1580 and in fact is bent in-plane 1750, as shown in FIG. 64.

FIGS. 46-47 show a cross-sectional view of the busbar 1000 taken along section plane defined by line 47-47 of FIG.

46 and revealing multiple regions that have been partially solidified. In particular, FIGS. 46-47 focus on a third fused segment 1220c that extends between the first central boundary line 1204a and the second central boundary line 1204b. This third fused segment 1220b includes: (i) two laterally solidified regions 1420 that are formed using the right and left cold formed fusion process 1644b, 1648a that solidifies extends of the busbar 1000 edges 1000c, 1000d, and (ii) an unsolidified region 1215 that extends between the two laterally solidified regions 1420. As such, this third fused segment 1220c forms a flexibility section 1500 and is not bent, as shown in FIG. 64.

Figure 48:
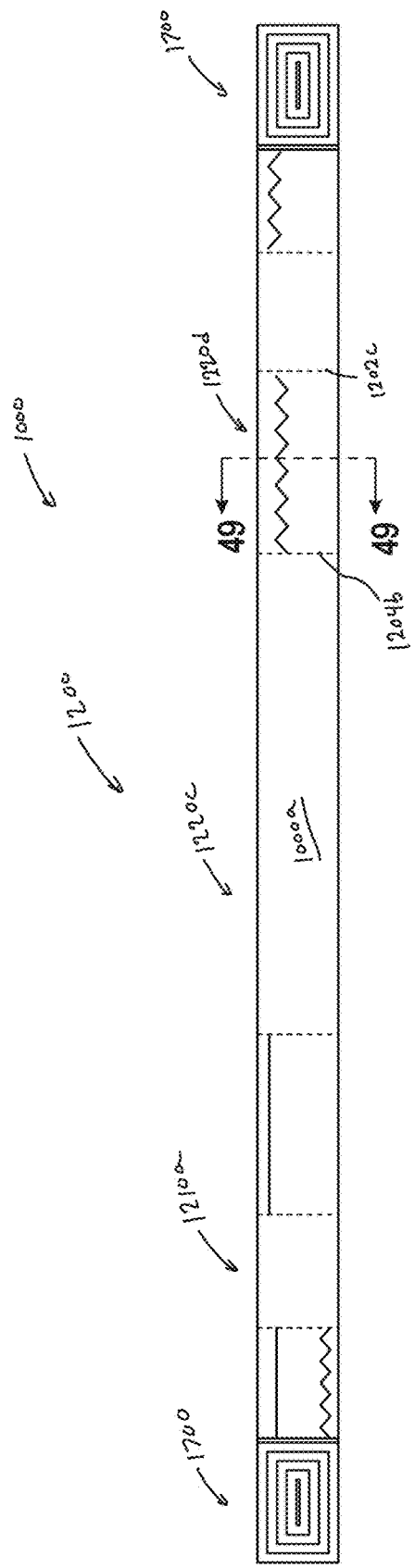
FIG. 48 is a top view of the busbar of FIG. 33.
Figure 49:
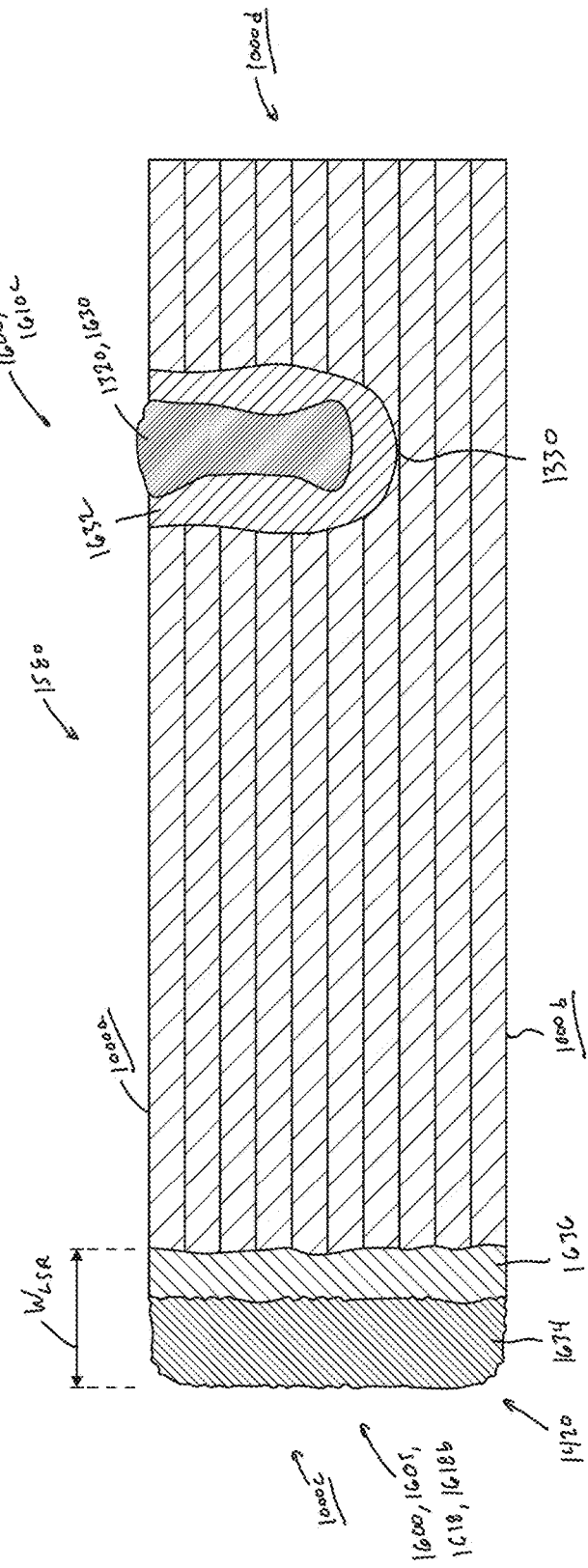
FIG. 49 is a cross-sectional view of the busbar taken along line 49-49 of FIG. 48 showing a fused segment including: (i) one laterally solidified region, (ii) one partially solidified region, and (iii) an unsolidified region.

FIGS. 48-49 show a cross-sectional view of the busbar 1000 taken along section plane defined by line 49-49 of FIG. 48 and revealing multiple regions that have been partially solidified. In particular, FIGS. 48-49 focus on a fourth fused segment 1220d that extends between the second central boundary line 1204b and a third intermediate boundary line 1202c. This fourth fused segment 1220d includes: (i) one partially solidified region 1320 that is formed using the upper surface partial penetration weldment 1610c that extend downward from an upper surface 1000a of the busbar 1000, (ii) one laterally solidified regions 1420 that is formed using a right lateral partial penetration weldment 1618b that extend inward from the right edge 1000d of the busbar 1000, and (iii) an unsolidified region 1215 that surrounds the partially solidified region 1320 and laterally solidified region 1420. As such, this fourth fused segment 1220d forms a bend section 1580 and in fact is bent in-plane 1750, as shown in FIG. 64.

FIGS. 50-51 show a cross-sectional view of the busbar 1000 taken along section plane defined by line 51-51 of FIG. 50 and revealing multiple regions that have been partially solidified. In particular, FIGS. 50-51 focus on a fifth fused segment 1220e that extends between the third intermediate boundary line 1202c and the fourth intermediate boundary line 1202d. This fifth fused segment 1220e includes: (i) two laterally solidified regions 1420 that are formed using right and left lateral partial penetration weldment 1618c, 1622d that extend inward from the left and right edges 1000c, 1000d of the busbar 1000, and (ii) an unsolidified region 1215 that extends between the two laterally solidified regions 1420. As such, this fifth fused segment 1220e forms a handling section 1540. While this segment is not bent, as shown in FIG. 64, this handling section 1540 is necessary because of the requirements of the system or installation procedures.

FIGS. 52-53 show a cross-sectional view of the busbar 1000 taken along section plane defined by line 53-53 of FIG. 52 and revealing multiple regions that have been partially solidified. In particular, FIGS. 52-53 focus on a sixth fused segment 1220f that extends between the fourth intermediate boundary line 1202d and the second end boundary line 1200b. This sixth fused segment 1220f includes: (i) two partially solidified regions 1320 that are formed using: (a) an upper surface partial penetration weldment 1610d that extend downward from an upper surface 1000a of the busbar 1000, and (b) an lower surface partial penetration weldment 1614a that extend upward from a lower surface 1000b of the busbar 1000, and (ii) an unsolidified region 1215 that surrounds the two partially solidified regions 1320. As such, this sixth fused segment 1220f forms a bend section 1580 and in fact is bent out-of-plane 1760, as shown in FIG. 64. As shown in this sixth fused segment 1220f, the top and bottom weldments 1610d, 1622a are formed using laser beams that are offset by at least a thickness of 2 laminates (e.g., 0.5 mm) and as such the weldments do not intermingle.

Figure 74:
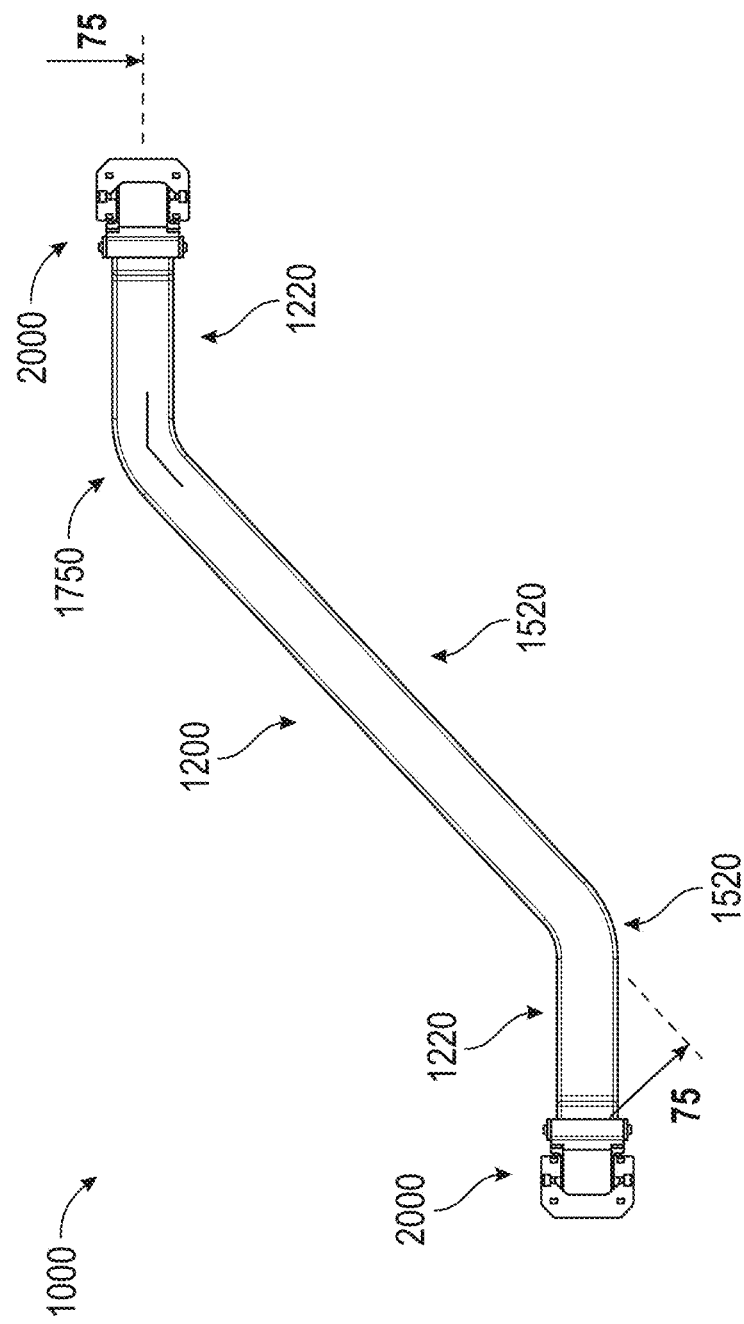
FIG. 74 is a top view of the busbar of FIG. 73.

FIGS. 74-75 show a cross-sectional view of the busbar 1000 taken along section plane defined by line 75-75 of FIG. 74 and revealing a region that has been fully solidified. In particular, FIGS. 74-75 focus on an end portion 1700 fused segment 1220f that extends beyond an end boundary line. This end portion 1700 includes a solidified region 1225 that is formed using upper and lower surface partial penetration weldments. As such, this end portion 1700 forms a densification weldment that is sufficiently solid to receive a connector 2000. Finally, FIG. 54 is a top schematic view of the busbar of FIG. 34, wherein the fully solidified regions 1225, partially solidified regions 1320, laterally solidified regions 1420, and unsolidified regions 1215 are outlined.

As discussed above, the intermediate portion 1200 may contain any number (e.g., 0-1000) of fused regions 1220 and any number (e.g., 0-1000) of unfused regions 1210. For example, the intermediate portion 1200 may only contain a single fused region 1220 or may only contain an unfused region 1210. Additionally, the fused segment 1220 may contain number of waveforms (e.g., 0-100), is preferably between 1-6, and most preferably is two 1610, 1612. As such, the fused segment 1220 may contain any number of laterally solidified regions 1420. For example, the fused segment 1220 may be substantially solid due to the fact it contains a high number of laterally solidified regions 1420 that have substantial depth or may almost be unsolidified because the fused segment only contains a single weld 1600 in a small volume (e.g., single laser dot). Further, any waveform type, frequency, and amplitude may be utilized in order to meet the customer specifications. Overall, the unfused segments 1210 may perform in a manner that is similar to a conventional flexible busbar 20 and the fused segment 1220 may perform in a manner that is similar to a conventional rigid busbar 10. These integrally formed segments 1220, 1210 provide significant benefits over conventional busbars 10, 20.

An optional step of forming the inventive busbar 1000 includes encasing the conductors 1090 in a protective material or insulation 1780 that encases a subset of the busbar 1000. The insulation 1780 may be a heat-shrunk material (e.g., CPX 100 EV from Shawcor). In alternative embodiments, the insulation 1780 may be formed using: (i) spray power coating method (e.g., a spray gun charges a powder as it exits the gun towards a grounded, room temperature, hot busbar 1000. The powder clings to the surface of the busbar 1000 because of the static electrical charge as it enters a curing oven. With the addition of heat, the coating creates a cross linked polymer), (ii) liquefied dipping power coating (e.g., electrically charging the busbar 1000 is dipped it into a vat of liquefied substance), (iii) fluid bed power coating method (e.g., immersing the hot (e.g., preheated to 400-430° F.) busbar 1000 into a bed of powder for 4-8 seconds, which causes the material to melt and bond to the busbar 1000), (iv) Halar coating process (e.g., dipping the busbar 1000 in a vat of ethylene chlorotrifluoroethylene or ECTFE), or any other known method. The substance that may be sprayed, suspended in a fluid, or include in a power bed may contain polyethylene (e.g., IFS Puroplaz PE20), polyvinyl chloride, nylon 12, polyethylene terephthalate, epoxy, or any other similar thermoplastic insulator. In further alternative embodiments, the insulation 1780 may be tape or any other type of material that may be used to coat the busbar 1000.

In a further alternative embodiment, the insulation 1780 may be formed around the busbar 1000 using an insulation machine 1782 that utilizes centering process 1784 that are shown in FIG. 55-57. Specifically, the use of this process 1784 helps prevent high scrap rate or marginally passing HI Pot parts, which are formed because the busbar 1000 can move in the cavity during the injection of the material that will act as an insulator 1780. The machine 1782 shown in FIGS. 56A-56C utilize biased pins 1786a, 1786b that hold the busbar 1000 in the center of the mold 1788. The pins 1786a, 1786b may be biased using a spring, magnet, or any other biasing mechanism. As shown in the transition from FIG. 48B to 48C, the pressure from the insertion of the insulation material 1790 will force the pins 1786a, 1786b outward from the center, which allows the busbar 1000 to be fully encapsulated by the insulator 1780 and substantially centered in the insulator 1780. Thus, reducing hot spots or scrap busbars. Finally, FIG. 57 shows finished busbar 1000 that has been removed from the mold 1788 and wherein the conductors 1090 of the busbar 1000 are surrounded by the insulator 1780.

The insulation 1780 may include an identification device, symbol, logo, or indicia (e.g., names, QR codes, or radio frequency identification devices ("RFID")) that is formed in the insulation 1780. These identification device, symbol, logo, or indicia may help manufacture ensure the busbars are installed in the right locations and aid in the track/inventory of the busbars 1000. It should be understood the insulation 1780 may include shielding properties that reduce the electromagnetic noise that is generated by these busbars 1000.

After the busbar 1000 is formed, connectors and/or other attachment means may be added to the busbar 1000. Examples of such are shown in FIGS. 58A-59B, wherein said attachment means may be either an opening that is configured to receive a conventions coupler 24 or a boltless connector system 2000 that includes a spring member 2440a, or any other attachment mechanism for use with a busbar. The boltless connector system 2000 is described in a number of applications that are owned by the assignee of this application and are incorporated herein by reference. These applications include PCT/US18/19787, PCT/US19/36010, PCT/US19/36070, PCT/US19/36127, PCT/US21/43788, PCT/US21/47180, PCT/US20/13757, PCT/US21/43686, PCT/US20/49870, PCT/US21/33446, PCT/US20/14484, and PCT/US21/57959, all of which are incorporated herein by reference. At a high level, an extent of the system 2000 is shown in FIGS. 8A-8E, 59B, 71-75, which provide various views of the male connector assembly 2200. The male connector assembly 2200 includes: (i) a male terminal receiver 2260, (ii) a male terminal assembly 2430. The male terminal receiver 2260 is formed from an arrangement of terminal receiver side walls 2262a-2262d. The side walls 2262a-2262d form a bowl shaped receiver 2266. The receiver 2266 is configured to snugly receive a majority of the male terminal assembly 2430. This configuration provides additional rigidity to the male terminal assembly 2430 and limits the exposed amount of the male terminal assembly 2430. However, the entire male terminal assembly 2430 is not enclosed in the male terminal receiver 2260 or the body 2226 because then the male terminal assembly 2430 would then be prevented from contacting the female terminal assembly 2800. Thus, to facilitate the coupling of the male terminal assembly 2430 to the female terminal assembly 2800, the side walls 2262a-2262d each have male terminal openings 2268a-2268d there through. The male terminal openings 2268a-2268d are disposed through an intermediate portion of the side walls 2262a-2262d and are configured to permit an extent of the male terminal assembly 2430 to extend through the side walls 2262a-2262d to enable the male terminal assembly 2430 to contact the female terminal assembly 2800.

FIGS. 8A-8E, 59B, 71-75 provide various views of the male terminal assembly 2430. Specifically, the male terminal assembly 2430 includes a spring member 2440a and a male terminal 2470. The male terminal 2470 includes a male terminal body 2472 and a male terminal connection member or plate 2474. The male terminal connection plate 2474 is coupled to the male terminal body 2472 and is configured to receive an extent of the busbar 1000 that connects the male terminal assembly 2430 to a device (e.g., an alternator) outside of the connector system 2000. The male terminal body 2472 includes: (i) an arrangement of male terminal side walls 2482a-2482d and (ii) a rear terminal wall 2480. The arrangement of male terminal side walls 2482a-2482d are coupled to one another and generally form a rectangular prism. The male terminal side walls 2482a-2482d include: (i) a side wall portion 2492a, 2492c, which generally has a "U-shaped" configuration and (ii) contact arms 2494a-2494h. The side wall portions 2492a-2492d are substantially planar and have a U-shaped configuration with an intermediate segment. The contact arms 2494a-2494h extend: (i) from an extent of the intermediate segment of the side wall portion 2492a-2492d, (ii) away from the rear male terminal wall 2480, and (iii) across an extent of the contact arm openings.

The contact arms 2494a-2494h extend away from the rear male terminal wall 2480 at an outward angle. This configuration allows the contact arms 2494a-2494h to be deflected or displaced inward and towards the center of the male terminal 2470 by the female terminal assembly 800, when the male terminal assembly 2430 is inserted into the female terminal assembly 2800. This inward deflection is best shown in figures contained in PCT/US2019/036010. This inward deflection helps ensure that a proper mechanical and electrical connection is created by ensuring that the contact arms 2494a-2494h are placed in contact with the female terminal assembly 2800. The male terminal 2470 is typically formed from a single piece of material (e.g., metal). Therefore, the male terminal 2470 is a one-piece male terminal 2470 and has integrally formed features. To integrally form these features, the male terminal 2470 is typically formed using a die cutting process. However, it should be understood that other types of forming the male terminal 2470 may be utilized, such as casting or using an additive manufacturing process (e.g., 3D printing). In other embodiments, the features of the male terminal 2470 may not be formed from one-piece or be integrally formed, but instead formed from separate pieces that are welded together.

FIG. 75 show views of the spring member 2440a that is configured to function with the first embodiment of the male terminal 2470. The spring member 2440a generally includes: (i) arched spring sections 2448a-448d and (ii) spring arms 2452a-2452h. The arched spring sections 2448a-448d extend between the rear extent of the spring member wall 2444 and the spring arms 2452a-2452h. The spring arms 2452a-2452h are not connected to one another. This configuration allows for omnidirectional of the spring arms 2452a-2452h, which facilitates in the mechanical coupling between the male terminal 2470 and the female terminal assembly 2800. The spring member 2440a is typically formed from a single piece of material (e.g., metal). To integrally form these features, the spring member 2440a is typically formed using a die forming process. As discussed in greater detail below and in PCT/US2019/036010, when the spring member 2440a is formed from a flat sheet of metal, installed in the male terminal 2470 and connected to the female terminal assembly 800, and is subjected to elevated temperatures, the spring member 440a applies an outwardly directed spring thermal force, $S_{TF}$, on the contact arms 2494a-2494h due in part to the fact that the spring member 2440a attempts to return to a flat sheet. However, it should be understood that other types of forming the spring member 2440a may be utilized, such as casting or using an additive manufacturing process (e.g., 3D printing). In other embodiments, the features of the spring member 2440a may not be formed from a one-piece or be integrally formed, but instead formed from separate pieces that are welded together.

Additionally, it should be understood that the connector system 2000 is T4/V4/S3/D2/M2, wherein the system 2000 meets and exceeds: (i) T4 is exposure of the system 100 to 150° C., (ii) V4 is severe vibration, (iii) S1 is sealed high-pressure spray, (iv) D2 is 200 k mile durability, and (v) M2 is less than 45 Newtons of force is required to connect the male connector assembly 2200 to the female connector assembly 2600. In addition, it should be understood that the male terminal assembly 2430 and the female terminal assemblies 2800 disclosed in this application may be replaced with the male terminal assemblies and the female terminal assemblies disclosed in PCT/US2018/019787 or PCT/US2019/36010. In addition, the de-rating of some of these connectors is disclosed in PCT/US2020/14484.

Further, it should be understood that alternative configurations for connector systems 2000 are possible. For example, any number of male terminal assemblies 2430 may be positioned in a single male housing assembly 2220. For example, the male housing assembly 2220 may be configured to contain multiple (e.g., between 2-30, preferably between 2-8, and most preferably between 2-4) male terminal assemblies 2430. The female connector assembly 2600 may be reconfigured to accept these multiple male terminal assemblies into a single female terminal assembly 2800. Alternatively, the female connector assembly 2600 may be reconfigured to include multiple female terminal assemblies 2800, where each female terminal assembly 2800 receives a single male terminal assemblies 2430. Moreover, it should also be understood that the male terminal assemblies 2430 may have any number of contact arms 2494 (e.g., between 2-100, preferably between 2-50, and most preferably between 2-8) and any number of spring arms 2452 (e.g., between 2-100, preferably between 2-50, and most preferably between 2-8). As discussed above, the number of contact arms 2494 may not equal the number of spring arms. For example, there may be more contact arms 2494 then spring arms 2452. Alternatively, there may be less contact arms 2494 then spring arms 2452.

Instead of bending the busbar 1000 in-plane 750, two busbars 1000a, 1000b may be joined together to form a single busbar. This may be beneficial when the customer's application does not allow for the space required for an in-plane bend 750. Here, the two busbars 1002, 1004 are joined together at a defined angle (e.g., 90 degrees) use a "densification weld." A densification weld is designed to create enough comingled surface area to equal 120% of the busbar's 1000 cross sectional area. This helps ensure that this area does not become a current restrictor and a heat generator. In the exemplary embodiment that is shown in FIGS. 76-81, this 90 degree weld is negligible to 10% less resistive that a straight busbar 1000 of equal length. This is extremely beneficial due to the fact that 90 bends cannot be achieved in conventional busbars without creating a resistive extent in the busbar.

Figures 67, 68:
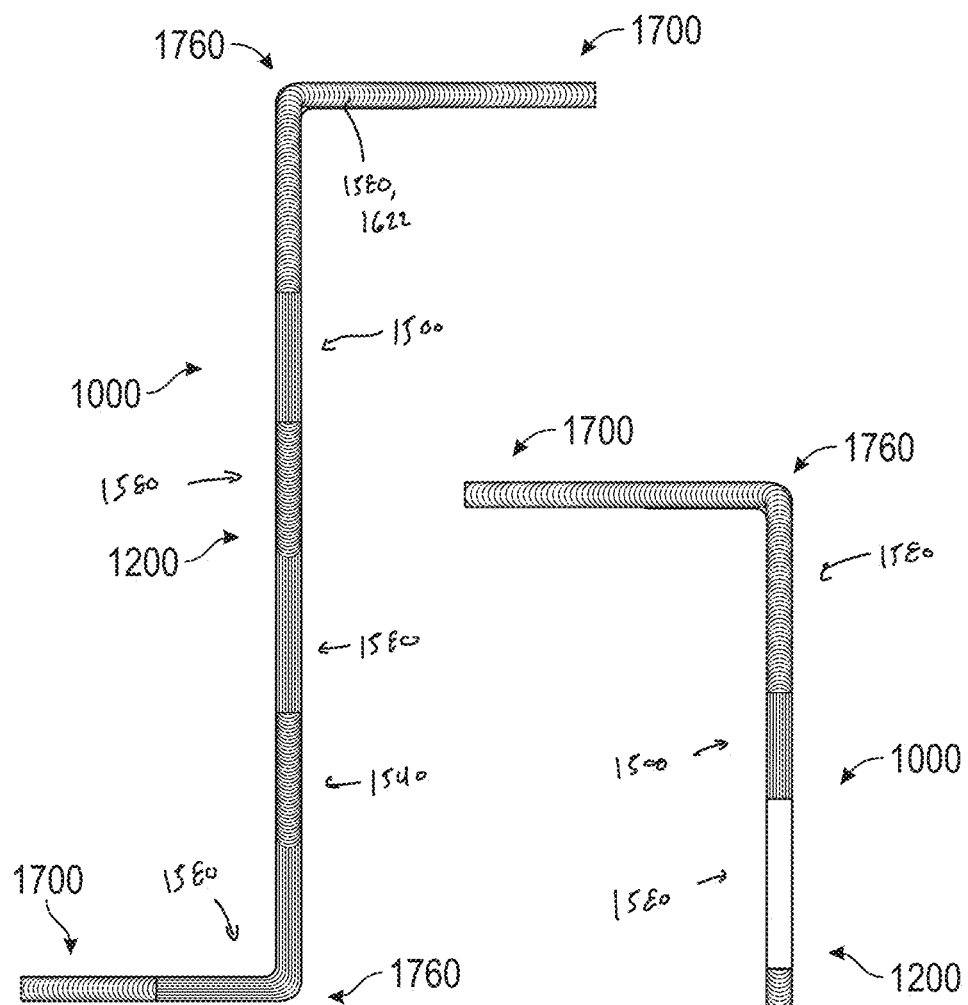
FIG. 67 is a first side view of the busbar of FIG. 64.
FIG. 68 is a second side view of the busbar of FIG. 64.
Figure 71:
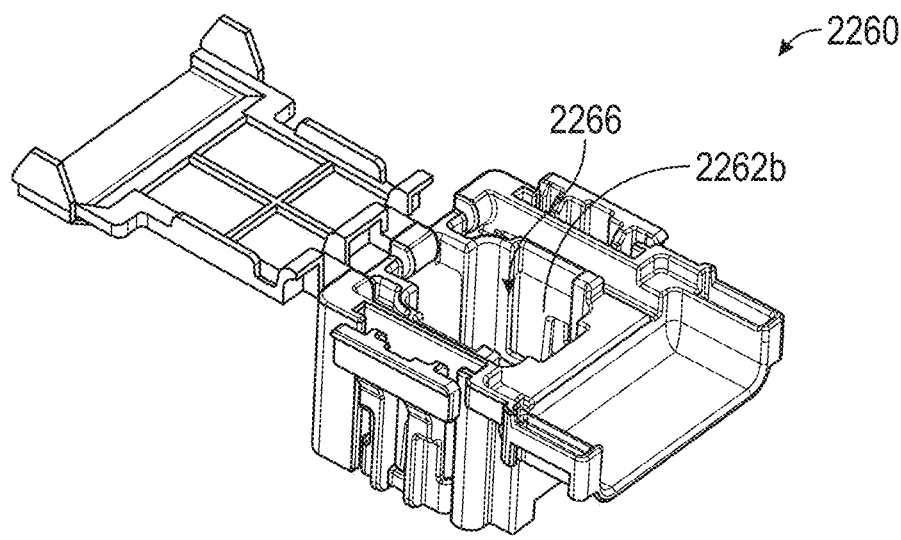
FIG. 71 is a perspective view of a housing for the electrical connector assembly with an internal spring component prior to coupling to the busbar.
Figure 72:
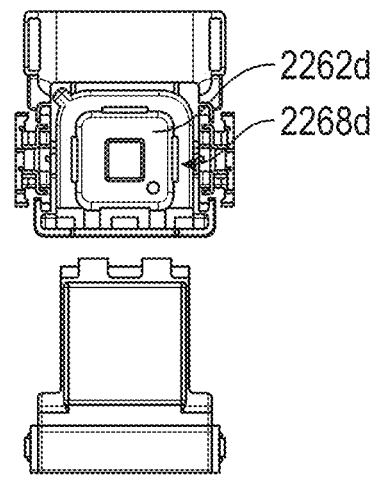
FIG. 72 is a bottom view of the housing shown in FIG. 71.
Figure 73:
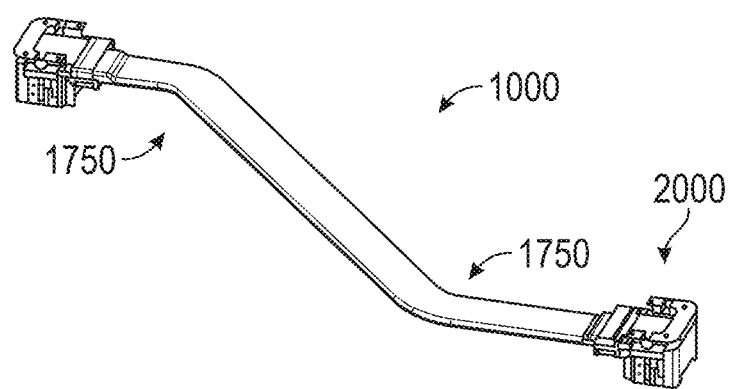
FIG. 73 is a perspective view of the inventive busbar with insulation, the busbar having two electrical connector assemblies that are partially surrounded by housings.
Figure 76:
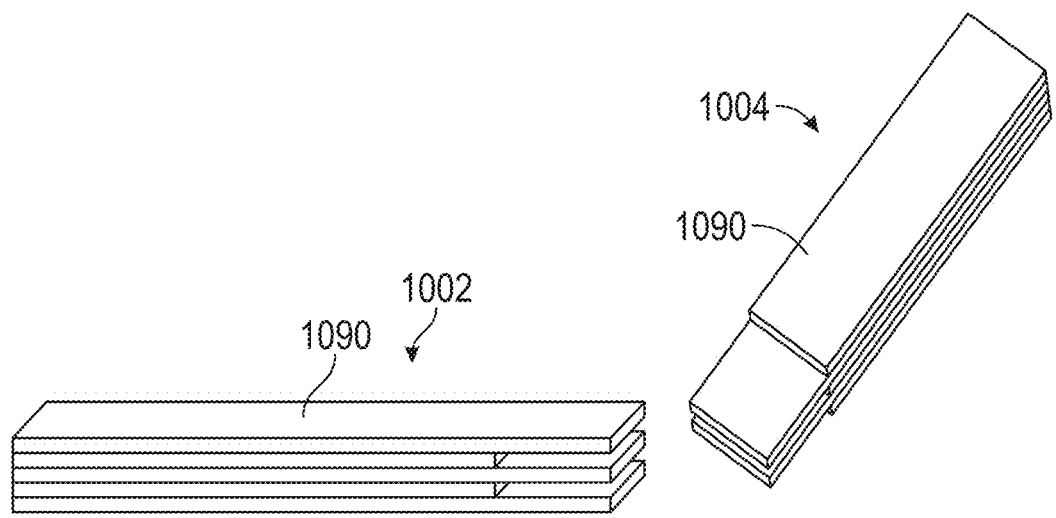
FIG. 76 shows two end portion configurations of busbars that may be utilized when joining the two busbars together in an "interleaved" configuration.
Figure 77:
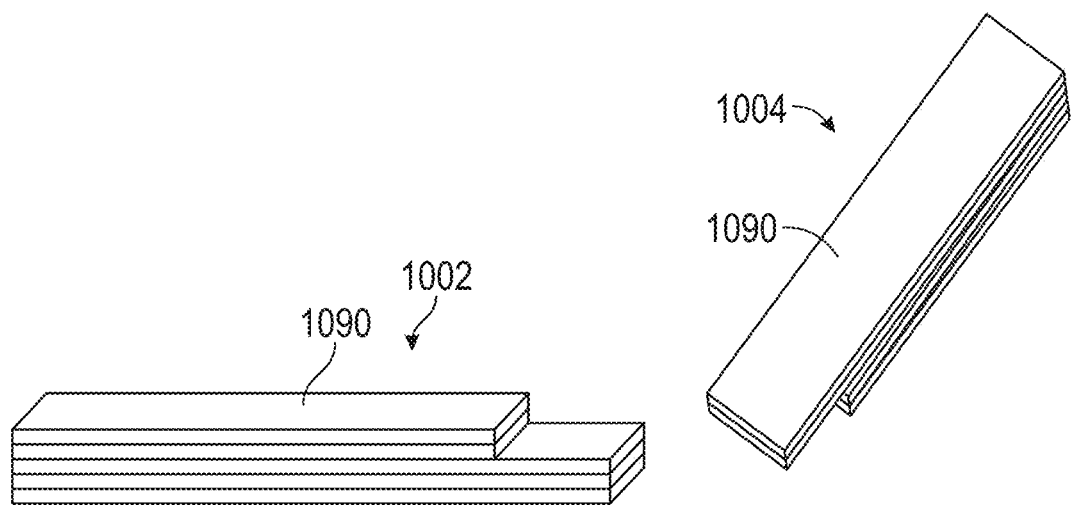
FIG. 77 shows two end portion configurations of busbars that may be utilized when joining the two busbars together in an "offset stack" configuration.
Figure 78:
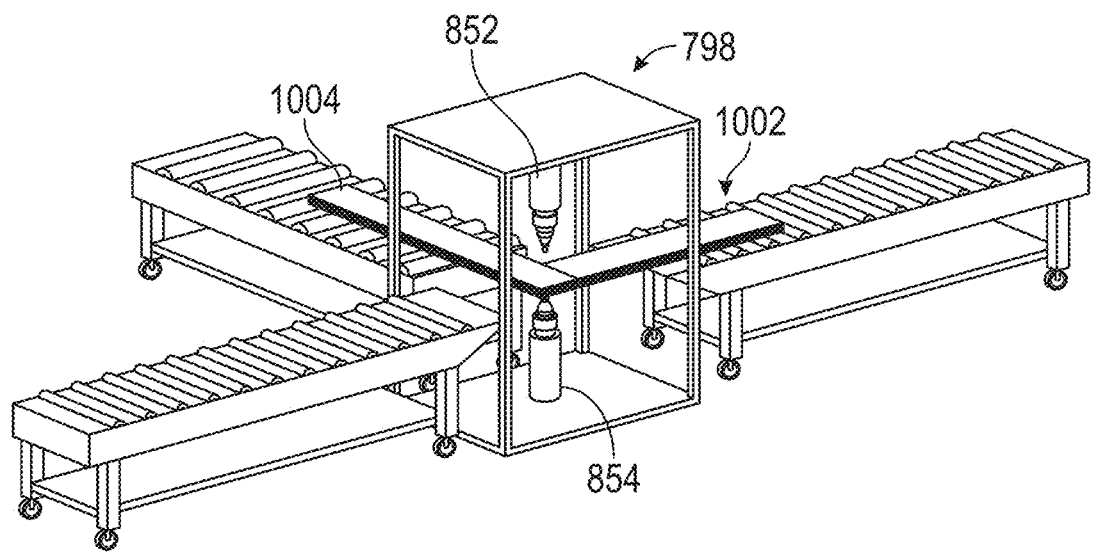
FIGS. 78 and 79 show a laser welding machines welding the end portions of two busbars at a junction region.
Figure 79:
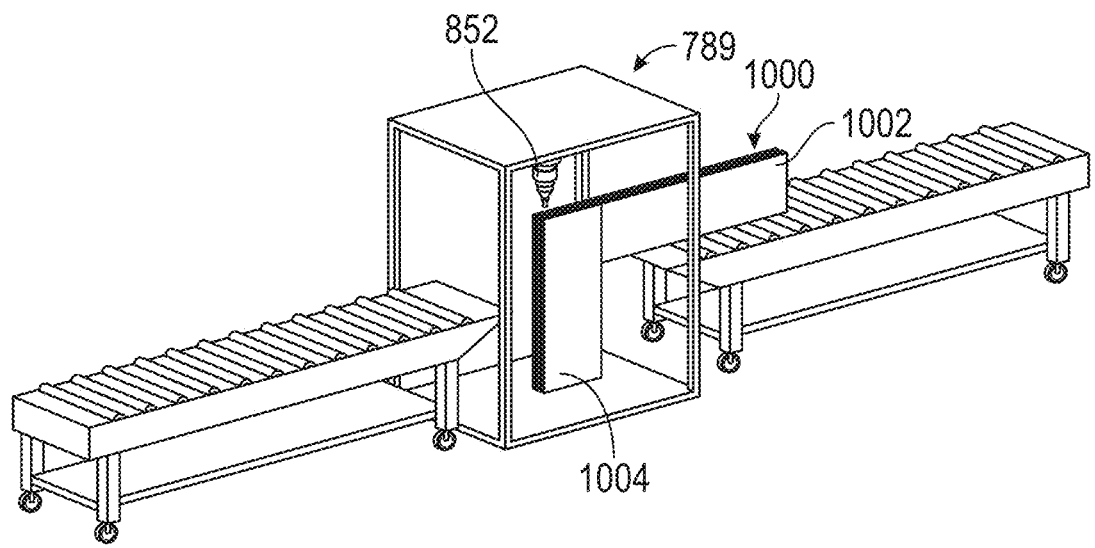
Figure 80:
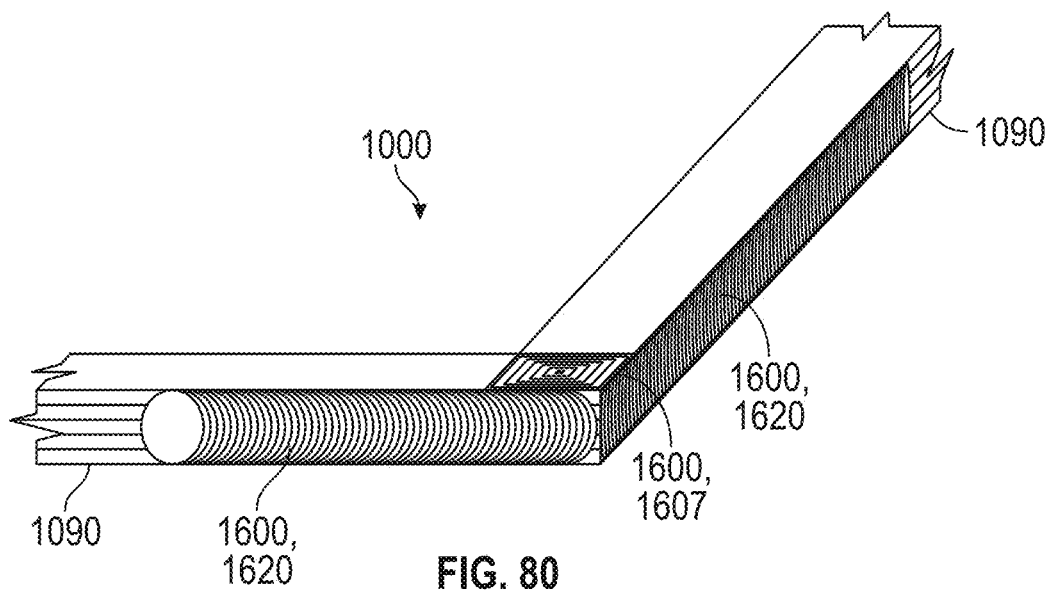
FIG. 80 shows two busbars that have been joined together at a junction region, wherein each busbar includes both a fused segment and an unfused segment.
Figure 81:
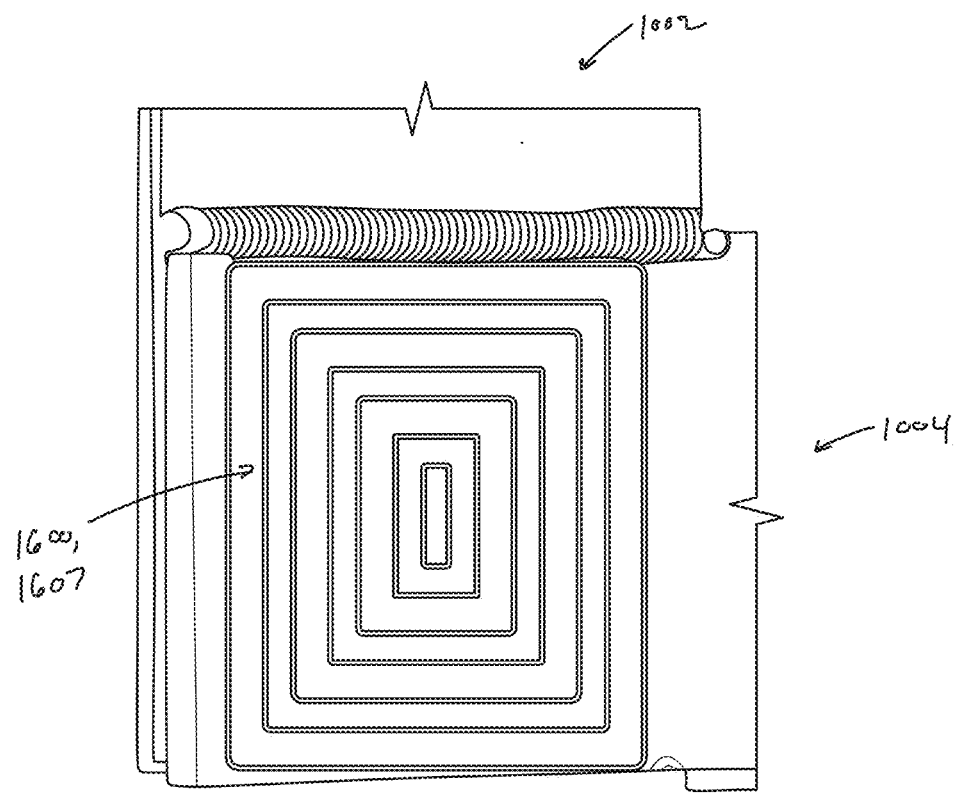
FIG. 81 shows a top view of the busbars shown in FIG. 54, wherein the busbars have been joined together using a "densification" weld and a "butt" weld.

When welding two busbars 1000 together at a defined angle, the conductors 90 contained in each side of the busbar may have an overlapping, dovetailing, or interweaving arrangement. Two examples of this arrangement are shown in FIGS. 76-77. Specifically, FIG. 76 shows two busbars 1002, 1004, where one busbar 1002 has a segment removed from two of the conductors 1090 and the other busbar 1004 has a segment removed from three of the conductors 90. These removed segments are cooperatively dimensioned to fit in one another. Alternatively, FIG. 68 shows two busbars 1002, 1004, where two segments have been removed from the first busbar 1002 and three segments have been removed from the second busbar 1004. It should be understood that other overlapping, dovetailing, or interweaving arrangements are contemplated by this disclosure. Once the busbars have been arranged, the designer can welded to one another using the welding machine 789 that is shown in FIGS. 78-79. The combine fusion pattern that the welding machine 789 may utilize are shown in FIGS. 22C-22E.

C. Deliver and Install Busbar(s)

Figure 60:
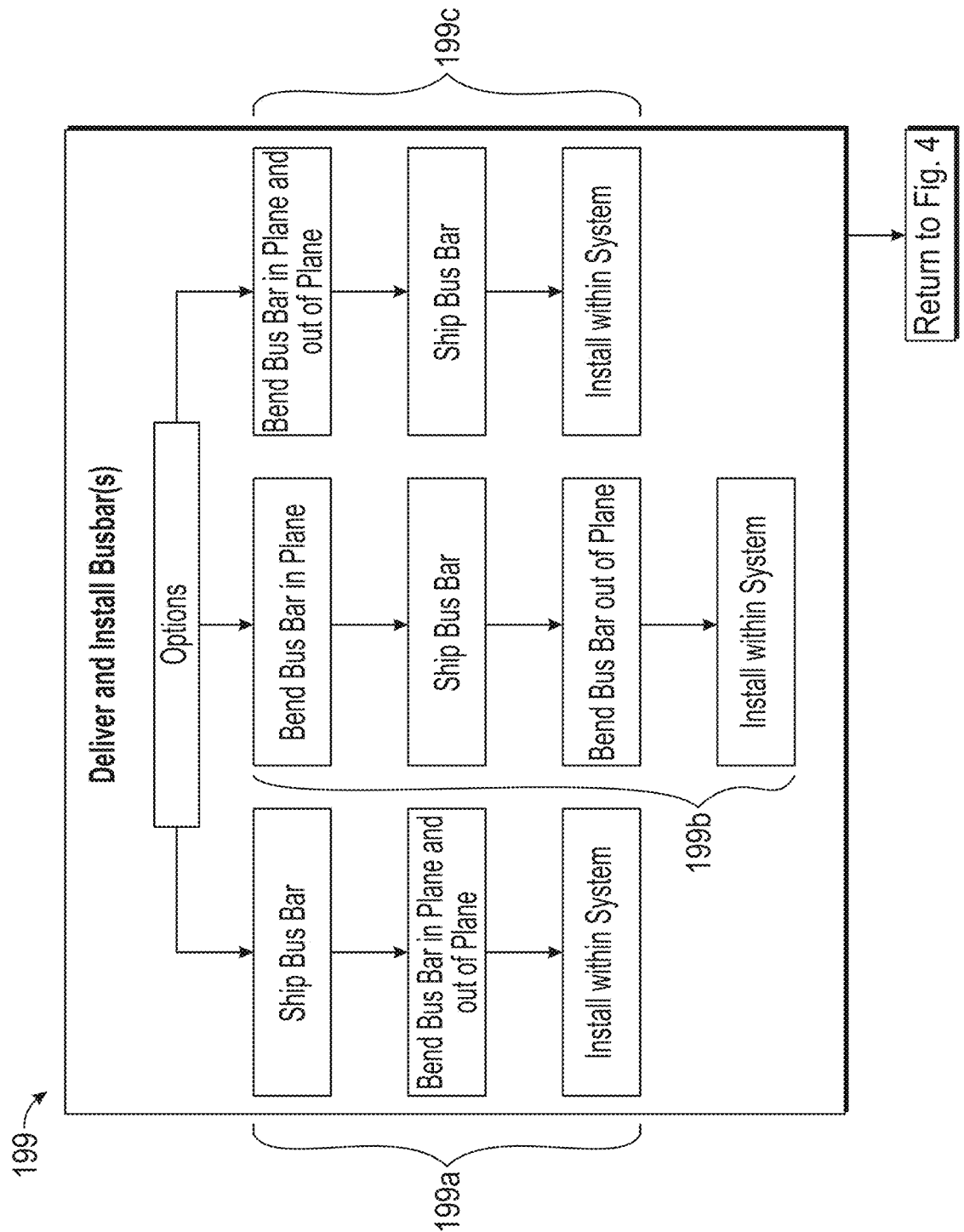
FIG. 60 is a flowchart showing options for delivery of the completed busbar to a customer and installation of the busbar.

Once the busbar 1000 intermediate portion 1200 and end portions 1700 formed, there are a number of options for how the busbar 1000 can be delivered and installed in an environment, application, system, product, component or device. Specifically, FIG. 60 shows three different options 199a, 199b, and 199c. The first option 199a is where the busbar 1000 is shipped to the customer in a strait and flat configuration and the customer bends the bar 1000 to form all desired bends. Once the busbar 1000 contains the necessary bends, the busbar 1000 can be installed in the system (e.g., battery pack in a vehicle). The second option 199b is where the busbar 1000 is bent in-plane 1750 and then shipped to the customer. In this configuration, the busbar 1000 does not contain any bends in the Z direction and thus is substantially flat. Once the customer receives that busbar 1000, the customer can bend the busbar 1000 to form the out-of plane bends 1760. Once the busbar 1000 contains the necessary bends, the busbar 1000 can be installed in the system (e.g., battery pack in a vehicle). Shipping the busbar 1000 in connection with the first or second options 199a, 199b, reduces the probability that the busbar 1000 will be damaged. In addition, the package size of the busbars can drastically be reduced; thus, saving a considerable amount of money that would have been spent on shipping costs. Finally, in the third option 199c, the busbar 1000 can be shipped to the customer in a form that is ready to be installed in requiring the customer to perform additional bends.

To bend the busbar 1000 into the configuration that is desirable, the busbar 1000 may have: (i) one or more in-plane bends 1750, (ii) one or more out-of-plane bends 1760, or (iii) may have a combination of one or more in-plane 1750 and one or more out-of-plane 1760. As shown in the figures and discussed above, the in-plane bends 1750 are only formed in the fused segments 1220 of the busbar 1000. This helps ensure that the individual conductors in the busbar 1000 do not delaminate due to this bend. In other words, the in-plane bends 1750 are not formed in the unfused segments 1210 of the busbar 1000. In contrast, the out-of-plane bends 1760 may be formed in the fused segment 1220 or the unfused segment 1210. This is because the out-of-plane bends 1760 do not cause the same stresses to be placed on the conductors 1090 that the out-of-plane bends 1750 place on the conductors 1090. Thus, when the designer/manufacture is bending the busbar 1000 into its configuration for installation, the designer/manufacture must make sure that they are bending the busbar 1000 in the proper segments 1220, 1210. In addition, the busbar/manufacture must be able to apply the proper amount of force to bend the busbar 1000 in the desired shape. In an exemplary and non-limiting example, the pressure needs to bend an unfused segment 1210 of the busbar may require approximately 250 pounds of force. To bend a fused segment 1220 of the busbar 1000, the designer will need to apply more force than to bend an unfused segment, but less than the force then what would be required to bend a fully solidified busbar. For example, this force need to bend a fused segment 1220 may be between 250 pounds and 500 pounds.

Figure 61A:
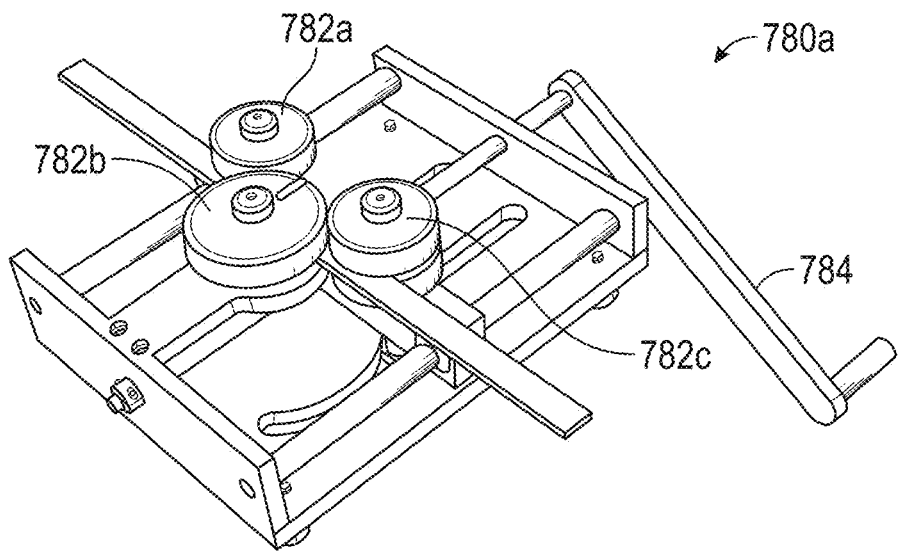
FIGS. 61A and 61B is a first embodiment of a busbar bending machine that may be used during fabrication of busbar prototypes and testing thereof.
Figure 61B:
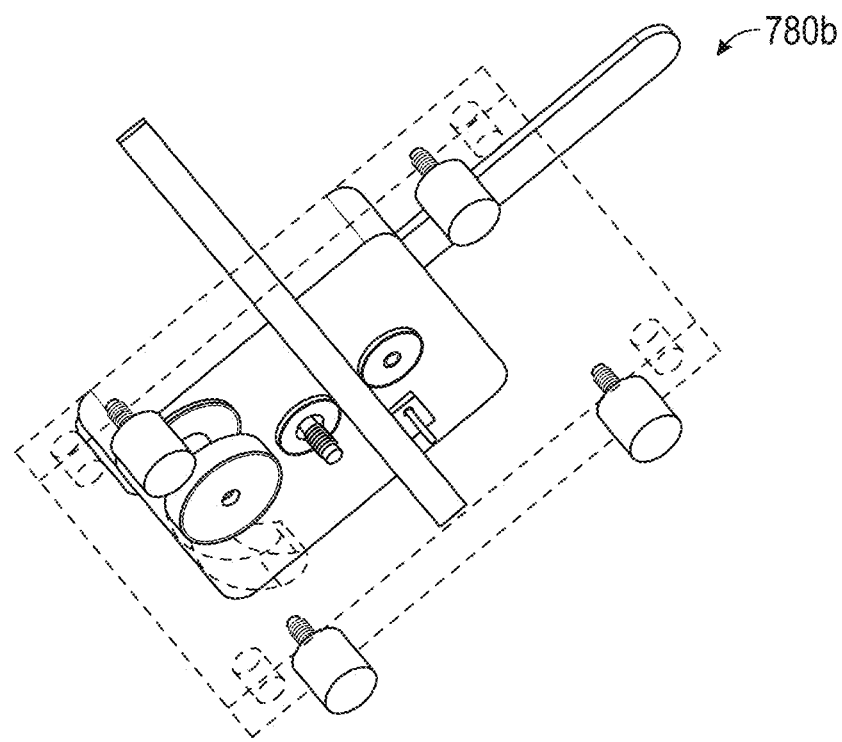
Figure 63A:
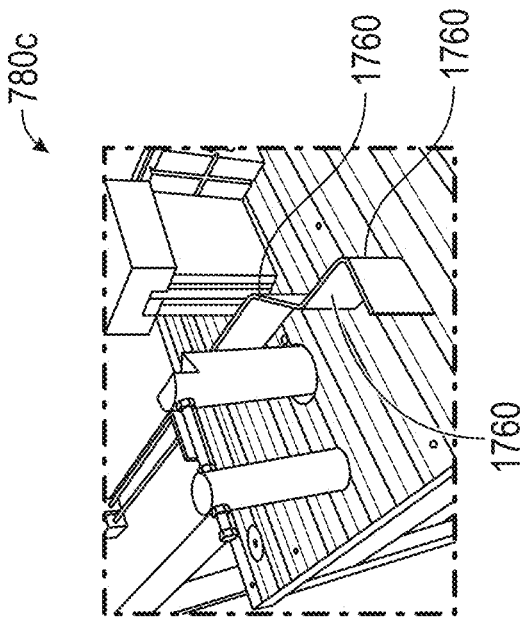
FIGS. 63A and 63B show how the busbar bending machine of FIG. 62 may bend select portions of the busbar.
Figure 63B:
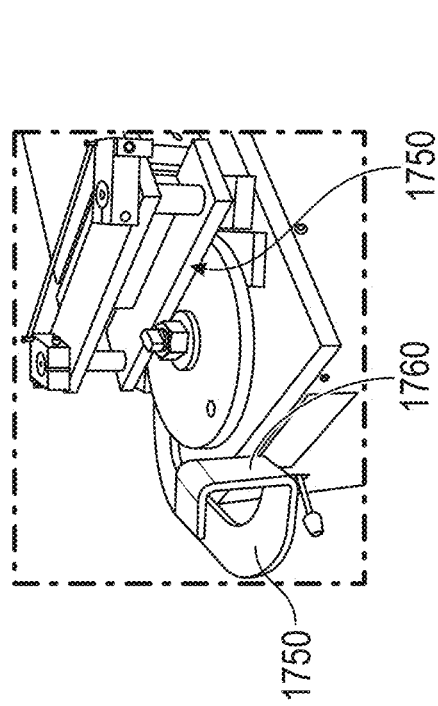
Figure 62:
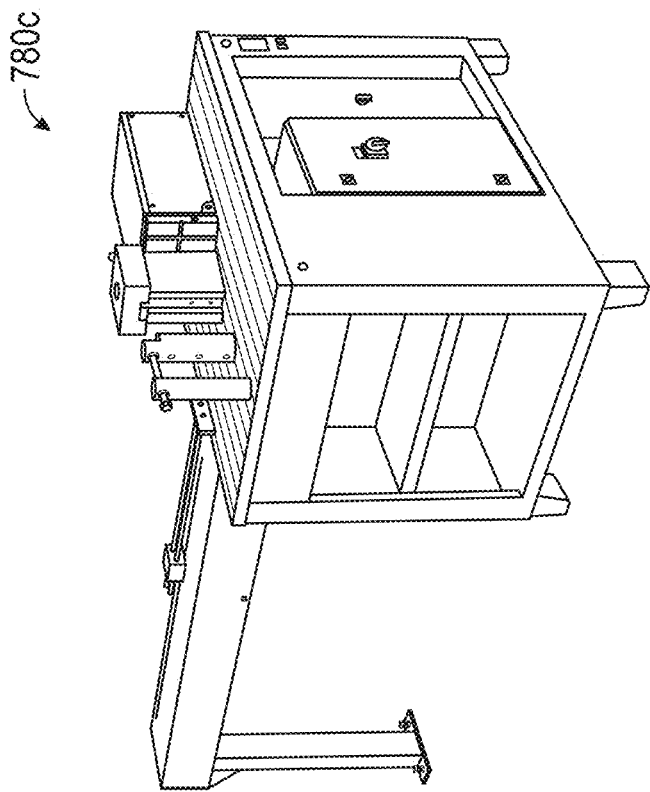
FIG. 62 is an embodiment of a busbar bending machine that may be used during mass production of the busbars.

To form these bends, the designer/manufacture may use any of the following machines 780a, 780b, or 780c that are shown in FIGS. 61A-63B. In particular, FIGS. 61A-61B show bending machines that are used to bend prototype busbars 1000, while FIGS. 62-63B show bending machines that are used to bend busbars 1000 that are manufactured using a mass production assembly. The prototype bending machine 780a include three spools 782a, 782b, 782c that have sides, which are configured to fully encase the busbar 1000 while bending. The middle spool 782b is attached to arm 784, which can be cranked down to apply downward pressure on the busbar 1000 in light of the positional relationship of the two end spools 782a, 782c. In other words, the middle spool 782b acts as a mandrel that bends the busbar 1000 in-plane 1750. The mass production machine 780c automates the functions of the prototype bending machines 780a, 780b. In particular, FIGS. 63A-63B show how this mass production machine 780c can create both in-plane bends 1750 and out-of-plane bends 1760 in the busbar 1000. It should be understood that these are only examples of machines 780a-780c that may be utilized to bend the busbar 1000. For example, certain out-of-plane bends 1760 may not be bent by a machine and instead may be bent by hand.

Figure 82:
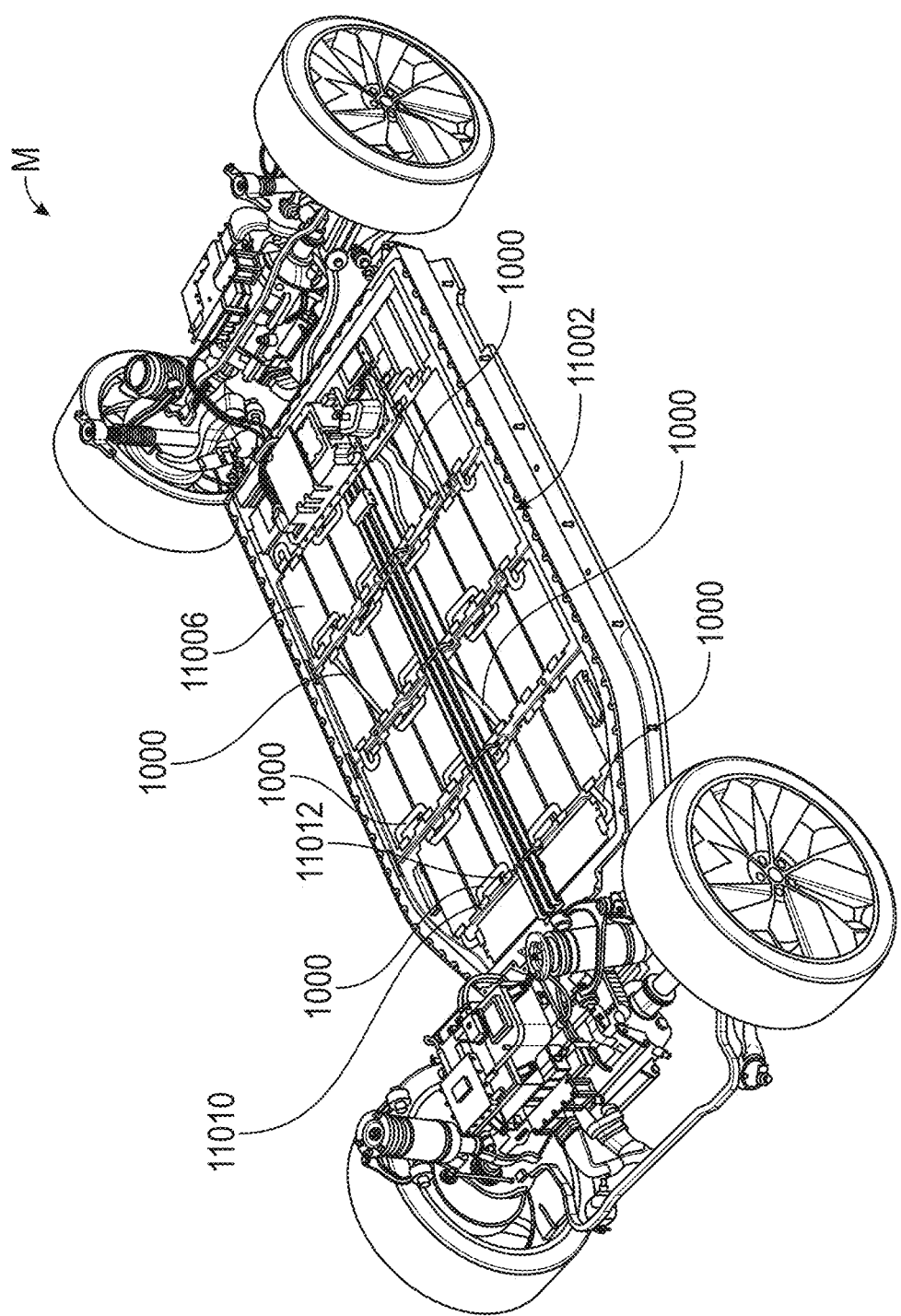
FIG. 82 is a perspective view of a battery pack installed in a skateboard of a vehicle, wherein the battery pack includes multiple inventive busbars electrically and mechanically connected to modules in the battery pack.
Figure 83:
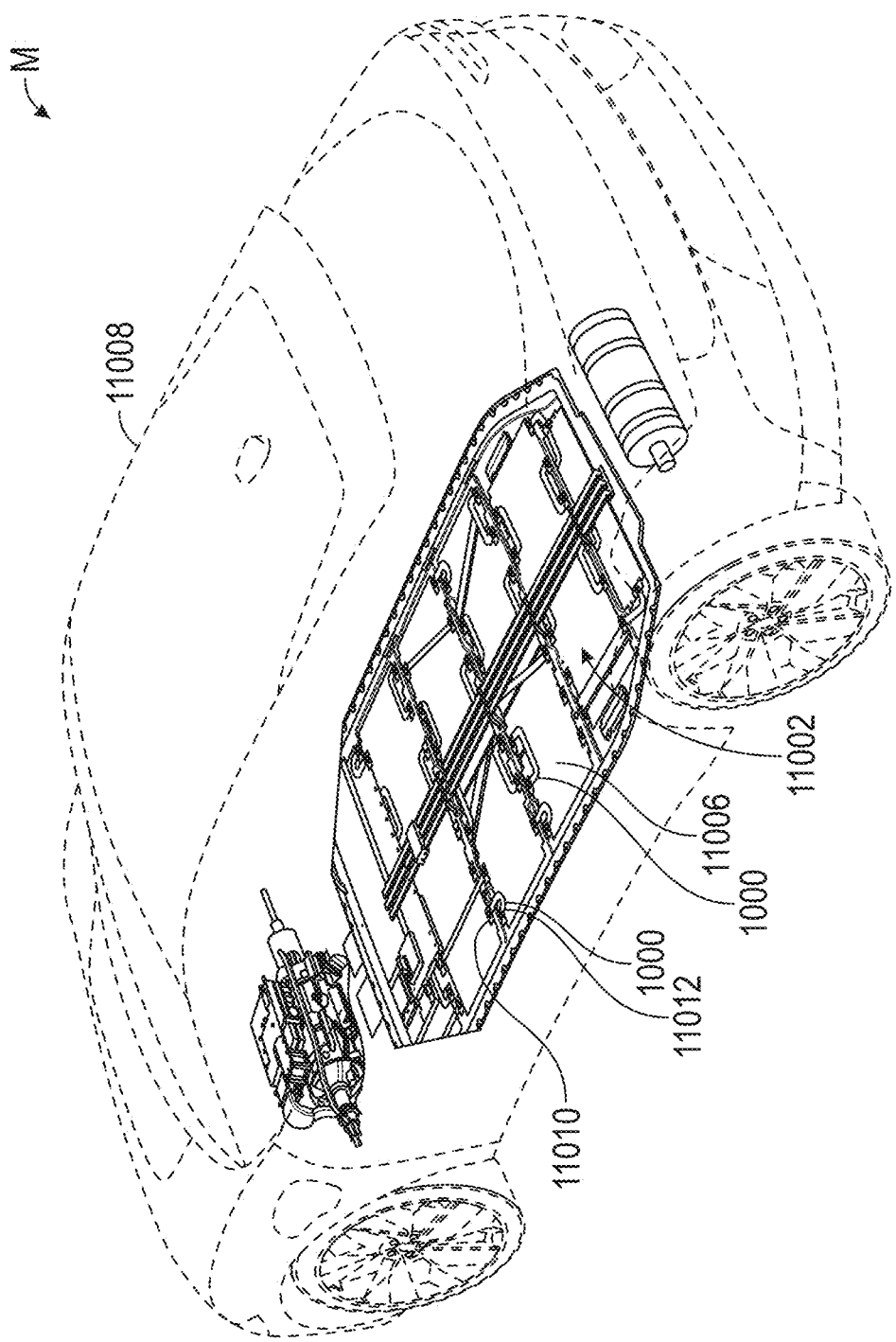
FIG. 83 is a perspective view of a vehicle having a battery pack that includes multiple inventive busbars electrically and mechanically connected to modules in the battery pack.

FIGS. 82-83 show a motor vehicle environment M that includes a power distribution system 11000 that includes a number of components, such as a charger, a battery pack assembly 11002, a DC-DC converter, and an electrical motor. As shown in FIGS. 82-83, the skateboard includes a battery pack assembly 11002 having a plurality (e.g., 36) of battery pack modules 11006 that are arranged in a substantially linear configuration that is positioned at or below vehicle axle level and below a majority of the motor vehicle body 11008, when installed. The battery pack modules 11006 are formed from a plurality (e.g., 12) of cells, wherein the cells are coupled to one another to form a positive terminal 11010 and a negative terminal 11012 for each battery pack module 11006. The positive terminals 11010 of these battery pack modules 11006 are coupled to one another (e.g., in parallel and in series) using busbar 1000 in order to create a battery pack 11002 that supplies proper voltage levels for operation of the motor vehicle M. Like the positive terminals 11010, the negative terminals 11012 are similarly coupled together using busbar 1000. It should be understood that the busbar 1000 may be used in components contained in the motor vehicle environment M that are outside of the battery pack assembly 11002. In addition, the inventive busbar 1000 may be PCTR compliant, which not only reduces the height requirements of the busbars, but also simplifies installation.

It may be desirable to gather the information obtained from fabricating and bending the busbars 1000, which have been made from an engineering model 100. This information can then be fed back into to the overall computer system in order to more accurately transform the non-engineering model 68a-68h into an engineering model 100 and test the engineering model 100. For example, the information that may be fed back into the computer system can include: (i) whether the fusion method caused too may fully solidified regions, (ii) whether the fusion method did not cause the laterally solidified regions to extent to a desirable depth, (iii) bending forces required to bend the fused segments 1220, (iv) electrical properties of the fused segments, (v) whether the fused segment 1220 delaminated during bending, or (vi) other relevant information. The computer system may take this information and alter the FE model used in the testing. As this FE model is able to closely predict how the busbars 1000 will operate when they are fabricated, the designer may utilize this FE model to help transform the non-engineering model 68a-68h into an engineering model 100. It should be understood that the information that is fed back into the computer system may be fitted and/or analyzed with a learning algorithm or a neural network. This analysis can then be used to modify the FE model in order to improve its accuracy, which in turn will allow for more accurate creation of the engineering models 100, which will result in cheaper, better performing, and more durable busbars 1000.

MATERIALS AND DISCLOSURE THAT ARE INCORPORATED BY REFERENCE

PCT Application Nos. PCT/US21/57959, PCT/US21/33446, PCT/US21/43686, PCT/US21/47180, PCT/US21/43788, PCT/US2020/50018, PCT/US2020/50016, PCT/US2020/49870, PCT/US2020/14484, PCT/US2020/13757, PCT/US2019/36127, PCT/US2019/36070, PCT/US2019/36010, and PCT/US2018/019787, U.S. patent application Ser. No. 16/194,891, U.S. Provisional Applications 63/159,689, 63/234,320, 63/222,859, and U.S. Design Patent Applications 29/749,813, and 29/749,790, each of which is fully incorporated herein by reference and made a part hereof.

SAE Specifications, including: J1742_201003 entitled, "Connections for High Voltage On-Board Vehicle Electrical Wiring Harnesses—Test Methods and General Performance Requirements," last revised in March 2010, each of which is fully incorporated herein by reference and made a part hereof.

ASTM Specifications, including: (i) D4935-18, entitled "Standard Test Method for Measuring the Electromagnetic Shielding Effectiveness of Planar Materials," and (ii) ASTM D257, entitled "Standard Test Methods for DC Resistance or Conductance of Insulating Materials," each of which are fully incorporated herein by reference and made a part hereof.

American National Standards Institute and/or EOS/ESD Association, Inc. Specifications, including: ANSI/ESD STM11.11 Surface Resistance Measurements of Static Dissipative Planar Materials, each of which is fully incorporated herein by reference and made a part hereof.

DIN Specification, including Connectors for electronic equipment—Tests and measurements—Part 5-2: Current-carrying capacity tests; Test 5b: Current-temperature derating (IEC 60512-5-2:2002), each of which are fully incorporated herein by reference and made a part hereof.

USCAR Specifications, including: (i) SAE/USCAR-2, Revision 6, which was last revised in February 2013 and has ISBN: 978-0-7680-7998-2, (ii) SAE/USCAR-12, Revision 5, which was last revised in August 2017 and has ISBN: 978-0-7680-8446-7, (iii) SAE/USCAR-21, Revision 3, which was last revised in December 2014, (iv) SAE/USCAR-25, Revision 3, which was revised on March 2016 and has ISBN: 978-0-7680-8319-4, (v) SAE/USCAR-37, which was revised on August 2008 and has ISBN: 978-0-7680-2098-4, (vi) SAE/USCAR-38, Revision 1, which was revised on May 2016 and has ISBN: 978-0-7680-8350-7, each of which are fully incorporated herein by reference and made a part hereof.

Other standards, including Federal Test Standard 101C and 4046, each of which is fully incorporated herein by reference and made a part hereof.

INDUSTRIAL APPLICABILITY

This inventive busbar 1000 described herein includes many advantages over other busbar system that currently exists. Some of these advantages include: (i) using less material, (ii) weighing less, (iii) providing sufficient current paths, which allows the busbars to carry more current without a substantial rise in temperature, (iv) the ability to be shipped in a substantially flat configuration, which reduces shipping costs and reduces the chance the busbar may be deformed, (v) can have bolt or boltless configurations, wherein the boltless configurations reduce labor costs associated with installation, (vi) does not require special molds or fabrication techniques to enable the busbar 1000 to be custom fitted to a specific application, (vii) does not require the combination of multiple different materials, which also increases the amount of current the buss bar 100 can handle without a substantial rise in temperature, (viii) has a low profile configuration, which allows the designer to reduce the height of the battery pack, and (ix) can be formed into complex geometries at or near the place the busbar is installed.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. For example, in the intermediate portion 1200 the busbar 1000 may not contain an unfused segment 1210 and may only contain fused segments 1220. It is intended by the following claims to claim any and all applications, modifications and variations that fall in the true scope of the present teachings. Other implementations are also contemplated.

While some implementations have been illustrated and described, numerous modifications come to mind without significantly departing from the spirit of the disclosure; and the scope of protection is only limited by the scope of the accompanying claims. Headings and subheadings, if any, are used for convenience only and are not limiting. The word exemplary is used to mean serving as an example or illustration. To the extent that the term includes, have, or the like is used, such term is intended to be inclusive in a manner similar to the term comprising as comprising is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations or one or more configurations. A disclosure relating to such phrase(s) may provide one or more examples. A phrase such as an aspect or some aspects may refer to one or more aspects and vice versa, and this applies similarly to other foregoing phrases.

Numerous modifications to the present disclosure will be apparent to those skilled in the art in view of the foregoing description. Preferred embodiments of this disclosure are described herein, including the best mode known to the inventors for carrying out the disclosure. It should be understood that the illustrated embodiments are exemplary only, and should not be taken as limiting the scope of the disclosure.

The invention claimed is:

1. A busbar for electrically connecting components in a power distribution system, the busbar comprising:
   a plurality of conductors with: (i) a first end, (ii) a second end, (iii) an intermediate portion, wherein the first end, the second end, and the intermediate portion are integrally formed with one another, and wherein the plurality of conductors are initially stacked to provide an unfused reference rigidity; and
   wherein the intermediate portion is subject to a selective fusion process and includes:
   a first segment having fused conductors that provide a first segment rigidity;
   a second segment having un-fused conductors that provide a second segment rigidity, wherein said second segment rigidity substantially matches the un-fused reference rigidity; and
   a third segment having fused conductors that provide a third segment rigidity that is: (i) greater than the second segment rigidity, and (ii) less than the first segment rigidity.

2. The busbar of claim 1, wherein the first segment is a first handling section with a first limited solidification zone where a minority of the conductors are fused together using a first edge-based fusion process to form a first laterally solidified region with a first width, wherein all conductors in said first laterally solidified region are fused together to form a single consolidated conductor.

3. The busbar of claim 2, wherein the third segment is a second handling section with a second limited solidification zone where a minority of the conductors are fused together using a second edge-based fusion process to form a second laterally solidified region with a second width, wherein all conductors in said second laterally solidified region are fused together to form a single consolidated conductor, and wherein the first width is larger than the second width.

4. The busbar of claim 1, wherein the first, second, or third segments lack a laterally solidified region where all conductors therein are fused together to form a single consolidated conductor.

5. The busbar of claim 1, wherein the first segment is a bend segment with a partial solidification zone where a majority of the conductors are fused together using a surface-based fusion process to form a partially solidified region with a surface-based fusion peak, said surface-based fusion peak is positioned a first distance away from a surface of the busbar, and wherein all conductors between the surface of the busbar and the surface-based fusion peak are fused together to form a single consolidated conductor; and
   the third segment is a handling section with a limited solidification zone where a minority of the conductors are fused together using an edge-based fusion process to form a laterally solidified region with a edge-based fusion peak, said edge-based fusion peak is positioned a second distance away from an edge of the busbar, and wherein all conductors between the edge of the busbar and the surface-based fusion peak are fused together to form a single consolidated conductor.

6. The busbar of claim 5, wherein the first distance is at least five times greater than the second distance.

7. The busbar of claim 1, wherein the first segment is a first bend section with a first partially solidified region where all conductors therein are fused together to form a single consolidated conductor, and the third segment is a second bend section with a second partially solidified region where all conductors therein are fused together to form a single consolidated conductor; and
wherein the first bend section is configured to have an in-plane bend and the second bend section is configured to have an out-of-plane bend.

8. The busbar of claim 1, wherein the plurality of conductors are arranged in a vertical stack having an uppermost conductor and a lowermost conductor, and
wherein the first segment includes a first laterally solidified region that: (i) extends between the uppermost conductor and the lowermost conductor, (ii) extends from an edge of the plurality of conductors to an edge-based fusion peak, and (iii) is formed using an edge weldment process.

9. The busbar of claim 8, wherein the third segment includes a second laterally solidified region that: (i) extends between the uppermost conductor and the lowermost conductor, (ii) extends from an edge of the plurality of conductors to an edge-based fusion peak, and (iii) is formed using an cold forming process.

10. The busbar of claim 1, wherein the intermediate portion lacks a fully solidified region formed using a surface-based fusion process.

11. A busbar for electrically connecting components in a power distribution system, the busbar comprising:
a plurality of conductors that are stacked to form a busbar with an initial un-fused reference rigidity; and
wherein when the busbar is subject to a selective fusion process that fuses together at least a minority of the plurality of conductors contained in a zone of the busbar together to form a single consolidated conductor, the selective fusion process causes a rigidity of the busbar to be greater than the initial un-fused reference rigidity.

12. The busbar of claim 11, where the selective fusion process forms a plurality of segments within the busbar, and wherein each segment has a different rigidity.

13. The busbar of claim 11, where the selective fusion process forms a plurality of segments within the busbar, and wherein each segment is formed using a different fusion pattern.

14. The busbar of claim 11, where the selective fusion process forms a plurality of segments within the busbar, and wherein each segment is formed using a different fusion process.

15. The busbar of claim 11, wherein the selective fusion process forms a handling section with a limited solidification zone where a minority of the conductors are fused together using a edge-based fusion process to form a laterally solidified region with a first width, wherein all conductors in said laterally solidified region are fused together to form a single consolidated conductor.

16. The busbar of claim 11, wherein the selective fusion process forms a bend section with a partial solidification zone where a majority of the conductors are fused together using a surface-based fusion process to form a partially solidified region, wherein all conductors in said partially solidified region are fused together to form a single consolidated conductor.

17. The busbar of claim 16, wherein the bend section lacks a laterally solidified region formed using an edge-based fusion process.

18. The busbar of claim 11, wherein the plurality of conductors are formed from a first material and are stacked to provide the busbar with a first geometry; and
wherein the selective fusion process forms a handling section has a rigidity that is less than a rigidity of a corresponding section of an intermediate portion of a reference busbar, wherein said corresponding section has (a) a geometry that substantially matches the first geometry and (b) a single conductor formed from a material substantially similar to the first material.

19. The busbar of claim 11, wherein the plurality of conductors are formed from a first material and are stacked to provide the busbar with a first geometry; and
wherein the selective fusion process forms a flexible section having a rigidity that is less than a rigidity of a corresponding section of an intermediate portion of a reference busbar, wherein said corresponding section has (a) a geometry that substantially matches the first geometry and (b) a single conductor formed from a material substantially similar to the first material, and said flexible section is formed using an edge-based fusion process that fuses a portion of the conductors in the flexible section together to form a single consolidated conductor.

20. The busbar of claim 11, wherein the plurality of conductors are formed from a first material and are stacked to provide the busbar with a first geometry; and
wherein the selective fusion process forms a bend section having a rigidity that is less than of a rigidity of a corresponding section of an intermediate portion of a reference busbar, wherein said corresponding section has (a) a geometry that substantially matches the first geometry and (b) a single conductor formed from a material substantially similar to the first material, and said bend section is formed using an surface-based fusion process that fuses a portion of the conductors in the bend section together to form a single consolidated conductor.

21. A busbar for electrically connecting components in a power distribution system, the busbar comprising:
a plurality of conductors that are stacked to form a busbar with an initial un-fused reference width; and
wherein a segment of the busbar is subject to a cold forming fusion process that fuses together at least a minority of the plurality of conductors contained in a limited solidification zone of the busbar together to form a single consolidated conductor, and wherein the segment of the busbar has a width that is larger than the initial un-fused reference width.

22. The busbar of claim 21, wherein the width of the segment of the busbar is at least 1 mm larger than the initial un-fused reference width.

23. The busbar of claim 21, wherein the plurality of conductors are formed from a first material and are stacked to provide the busbar with a first geometry; and
wherein the segment has a rigidity that is less than a rigidity of a corresponding section of an intermediate portion of a reference busbar, wherein said corresponding section has (a) a geometry that substantially matches the first geometry and (b) a single conductor formed from a material substantially similar to the first material.

24. The busbar of claim 21, wherein the plurality of conductors are formed from a first material and are stacked to provide the busbar with a first geometry; and wherein the segment is a flexible section having a rigidity that is less than a rigidity of a corresponding section of an intermediate portion of a reference busbar, wherein said corresponding section has (a) a geometry that substantially matches the first geometry and (b) a single conductor formed from a material substantially similar to the first material.

25. The busbar of claim 21, wherein the plurality of conductors are formed from a first material and are stacked to provide the busbar with a first geometry; and wherein the segment is a bend section having a rigidity that is less than of a rigidity of a corresponding section of an intermediate portion of a reference busbar, wherein said corresponding section has (a) a geometry that substantially matches the first geometry and (b) a single conductor formed from a material substantially similar to the first material.

26. The busbar of claim 25, wherein the intermediate portion of the busbar has a stiffness and the single consolidated conductor occupies a volume; and wherein increasing the volume of the single consolidated conductor increases the stiffness of the intermediate portion of the busbar.

27. The busbar of claim 25, wherein the intermediate portion lacks a fully solidified region formed using a surface-based fusion process.

* * * * *